(12) United States Patent
Epps et al.

(10) Patent No.: US 6,778,546 B1
(45) Date of Patent: Aug. 17, 2004

(54) HIGH-SPEED HARDWARE IMPLEMENTATION OF MDRR ALGORITHM OVER A LARGE NUMBER OF QUEUES

(75) Inventors: Garry P. Epps, Sunnyvale, CA (US); Michael Laor, Zichron-Yaakov (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/503,976

(22) Filed: Feb. 14, 2000

(51) Int. Cl.$^7$ .............................................. H04L 12/56
(52) U.S. Cl. ........................ 370/413; 370/429; 370/389
(58) Field of Search ................................ 370/389, 392, 370/394, 412, 413, 414, 416, 417, 418, 419, 410, 422, 429

(56) References Cited

U.S. PATENT DOCUMENTS

| | | | |
|---|---|---|---|
| 5,790,545 A | 8/1998 | Holt et al. | 370/398 |
| 5,909,686 A | 6/1999 | Muller et al. | 707/104 |
| 6,038,230 A | 3/2000 | Ofek | 370/389 |
| 6,038,607 A | 3/2000 | Hamilton et al. | 709/236 |
| 6,147,996 A | 11/2000 | Laor et al. | 370/394 |
| 6,167,445 A | 12/2000 | Gai et al. | 709/223 |
| 6,226,267 B1 * | 5/2001 | Spinney et al. | 370/235 |
| 6,259,695 B1 | 7/2001 | Ofek | 370/389 |
| 6,259,699 B1 * | 7/2001 | Opalka et al. | 370/398 |
| 6,343,072 B1 | 1/2002 | Bechtolsheim et al. | 370/351 |
| 6,389,506 B1 | 5/2002 | Ross et al. | 711/108 |
| 6,396,809 B1 * | 5/2002 | Holden et al. | 370/236 |
| 6,404,752 B1 * | 6/2002 | Allen et al. | 370/335 |
| 6,424,649 B1 | 7/2002 | Laor et al. | 370/359 |
| 6,424,659 B2 | 7/2002 | Viswanadham et al. | 370/469 |
| 6,463,059 B1 | 10/2002 | Movshovich et al. | 370/389 |

OTHER PUBLICATIONS

Sally Floyd and van Jacobson, *Random Early Detection Gateways for Congestion Avoidance*, IEEE/ACM Transactions on Networking, vol. 1, No. 4, Aug. 1993, pp. 397–413.

M. Shreedhar and George Varghese, *Efficient Fair Queuing Using Deficit Round Robin*, Computer Communication Review, vol. 25, No. 4, Oct. 1995, pp. 231–242.

* cited by examiner

*Primary Examiner*—Alpus H. Hsu
*Assistant Examiner*—Thien Tran
(74) *Attorney, Agent, or Firm*—Campbell Stephenson Ascolese LLP

(57) ABSTRACT

A pipelined linecard architecture for receiving, modifying, switching, buffering, queuing and dequeuing packets for transmission in a communications network. The linecard has two paths: the receive path, which carries packets into the switch device from the network, and the transmit path, which carries packets from the switch to the network. In the receive path, received packets are processed and switched in an asynchronous, multi-stage pipeline utilizing programmable data structures for fast table lookup and linked list traversal. The pipelined switch operates on several packets in parallel while determining each packet's routing destination. Once that determination is made, each packet is modified to contain new routing information as well as additional header data to help speed it through the switch. Each packet is then buffered and enqueued for transmission over the switching fabric to the linecard attached to the proper destination port. The destination linecard may be the same physical linecard as that receiving the inbound packet or a different physical linecard. The transmit path consists of a buffer/queuing circuit similar to that used in the receive path. Both enqueuing and dequeuing of packets is accomplished using CoS-based decision making apparatus and congestion avoidance and dequeue management hardware. The architecture of the present invention has the advantages of high throughput and the ability to rapidly implement new features and capabilities.

23 Claims, 27 Drawing Sheets

HIGH-SPEED HARDWARE IMPLEMENTATION OF MDRR ALGORITHM OVER A LARGE NUMBER OF QUEUES

BACKGROUND OF THE INVENTION

1. Field of the Invention

The present invention relates to communications devices, specifically devices that enable packet forwarding and handling in communications networks.

2. Description of the Related Art

In a communications network, routing devices receive messages at one of a set of input interfaces and forward them on to one of a set of output interfaces. Users typically require that such routing devices operate as quickly as possible in order to keep up with the high rate of incoming messages. In a packet routing network, where information is transmitted in discrete chunks or "packets" of data, each packet includes a header. The header contains information used for routing the packet to an output interface and subsequent forwarding to a destination device. The packet may also be forwarded to another router for further processing and/or forwarding. Header information used for routing may include the destination address and source address for the packet. Additionally, header information such as the destination device port, source device port, protocol, packet length, and packet priority may be used. Header information used by routing devices for administrative tasks may include information about access control, accounting, quality of service (QoS), or class of service (CoS).

FIG. 1 is a generic packet routing/switching system 100 that will be used to describe both the prior art and the invention. A well-known routing device or switch 100 consists of a set of linecards 110 and a switching fabric 120. Each linecard 110 includes an input interface 111, an output interface 112, a fabric interface 170, and a control element 130. Linecards 110 connect to communications network 1, which may be any form of local, enterprise, metropolitan, or wide area network known in the art, through both input interface 111 and output interface 112. More than one input interface 111 may be provided, with each interface carrying a fraction of the full capacity of control element 130.

Control element 130 is configured to receive inbound packets 113 (i.e., packets entering the system from network 1) from input interface 111, process the packet, and transmit it through fabric interface 170 to switching fabric 120 through which it is sent to another (or the same) linecard 110 for further processing. This path is referred to as the "receive" path into the device from the network.

Outbound packets 114 (i.e., those to be transmitted out of the switch device) are received from switching fabric 120 through fabric interface 170, processed in control element 130, and transmitted to network 1 on output interface 112. Accordingly, this path is known as the "transmit" path from the device to the network.

As known in the prior art, control element 130 consists of an inbound packet receiver 140, lookup circuit 145, inbound memory controller 150, first memory 160, outbound memory controller 150, second memory 160, and outbound transmitter 180. Control circuits 190 are also provided to perform configuration, initialization, statistics collection, and accounting functions as well as to process certain exception packets.

In a manner well-known in the art, packets are received from the physical medium of the network at input interface 111. The inbound packet receiver 140 operates in conjunction with lookup circuit 145 to determine routing treatments for inbound packets 113. Lookup circuit 145 includes routing treatment information disposed in a memory data structure. Access and use of this information in response to data in the header of inbound packet 113 is accomplished with means well-known in the router art. These routing treatments can include one or more of the following:

- selection of one or more output interfaces to which to forward inbound packets 113 responsive to the destination device, to the source and destination device, or to information in any other packet header fields (packets may also be dropped, i.e., not forwarded);
- determination of access control list (ACL) treatment for inbound packets 113;
- determination of class of service (CoS) treatment for inbound packets 113;
- determination of one or more accounting records or treatments for inbound packets 113; and
- determination of other administrative treatment for inbound packets 113.

Examples of such systems may be found in U.S. Pat. No. 5,088,032, METHOD AND APPARATUS FOR ROUTING COMMUNICATIONS AMONG COMPUTER NETWORKS to Leonard Bosack; U.S. Pat. No. 5,509,006, APPARATUS AND METHOD FOR SWITCHING PACKETS USING TREE MEMORY to Bruce Wilford et al.; U.S. Pat. No. 5,852,655, COMMUNICATION SERVER APPARATUS HAVING DISTRIBUTED SWITCHING AND METHOD to John McHale et al.; and U.S. Pat. No. 5,872,783, ARRANGEMENT FOR RENDERING FORWARDING DECISIONS FOR PACKETS TRANSFERRED AMONG NETWORK SWITCHES to Hon Wah Chin, incorporated in their entireties herein by reference.

One shortcoming known in the prior art arises from the ever-increasing need for speed in network communications. Attempts to scale prior art routers and switches to gigabit speed have shown that architectures that require a deep packet buffering prior to determining routing treatment suffer from high packet latency. Many distributed routing schemes, such as that described above wherein routing is performed in each linecard on packet receipt, have had only limited success in providing the necessary increase in throughput speed.

A related limitation has been the inability of a general purpose digital computer to perform the necessary lookup and queue management functions using software in real time, i.e., approaching the wire speed (line rate) of the incoming packets. As the need for increased packet throughput has grown, software-based systems have been shown to lack sufficient scaleability to the demands of modern internetworking systems.

A further drawback is the lack of flexibility in prior art systems tuned for speed with hardware implementations of functions once performed by software. As the hardware is less able to be reconfigured without redesign, these prior art designs are often rendered obsolete by the adoption of new standards and communications protocols.

A still further drawback of prior art systems is their relative inability to rapidly provide a range of services based on packet priority, as represented by various fields in the packet header. Such systems are often described as providing type of service (TOS), quality of service (QoS), or class of service (CoS) routing. Prior art systems typically experience additional packet latency and throughput reduction when performing routing based on packet priority.

What is needed is a flexible switch system, preferably distributed on a linecard, that provides ultra-high throughput packet switching based at least in part on packet priority. The system architecture should be able to be reconfigured to handle a variety of network protocols and optimizations. In particular, low latency switching determined by individual packet class of service is desired. Such a linecard should operate as close to line rate as possible, i.e., at or near the maximum speed of transmission over the physical medium and without any appreciable buffering delay.

SUMMARY

A high speed hardware-based dequeuing apparatus and method for switching packets in a communications network is disclosed. The dequeuing apparatus is part of a linecard consisting of two transmission paths: the receive path, which carries packets into the switch device from the network and the transmit path, which carries packets from the switch to the network. While each linecard typically has both a receive and a transmit path, such an arrangement is not essential. Separate transmit and receive linecards employing the architecture of the present invention are also possible.

In the receive path, packets are processed and switched in an asynchronous, multi-stage pipeline that operates on several packets at the same time to determine each packet's routing destination. Once that determination is made, each packet is modified to contain new routing information as well as additional header data to help speed it through the switch. Each packet is then buffered and enqueued for transmission over the switching fabric to the linecard attached to the proper destination port. The destination linecard may be the same physical linecard as that receiving the inbound packet or a different physical linecard. The hardware dequeuing apparatus is employed to rapidly remove packets from the buffer in the process of sending packets over the fabric while providing class of service- (CoS-) based service differentiation.

The transmit path consists of a buffer/queuing circuit similar to that used in the receive path, with the same hardware-based dequeuing apparatus.

The dequeuing apparatus used in both the receive and transmit paths on the linecard implements a variation of the well-known Deficit Round Robin (DRR) software-based dequeuing algorithm in dedicated, special-purpose circuits. In an alternate embodiment of the present invention, an enhanced algorithm called Modified DRR (MDRR) is provided by the hardware apparatus of the present invention. The MDRR apparatus enhances DRR performance by creating a special, high priority queue that services packets showing a higher class of service (CoS) indication. In addition, by implementing the algorithm in dedicated hardware (rather than software), the present invention greatly enhances speed of execution and enables high switch throughput rates.

BRIEF DESCRIPTION OF THE DRAWINGS

The present disclosure may be better understood, and its numerous objects, features, and advantages made apparent to those skilled in the art by referencing the accompanying drawings.

The use of the same reference symbols in different drawings indicates similar or identical items.

DETAILED DESCRIPTION

Overview

The present invention is an architecture for a linecard in a network communications device such as a router or switch. The linecard provides an interface between a routing or switching device and a network that operates bi-directionally, both receiving a data stream (e.g., packets) from the network and transmitting a data stream to the network. Typical devices comprise multiple linecards (and thus multiple network connections) and a single switching interconnect core or "fabric" that provides the physical connection between linecards.

Figure 1:
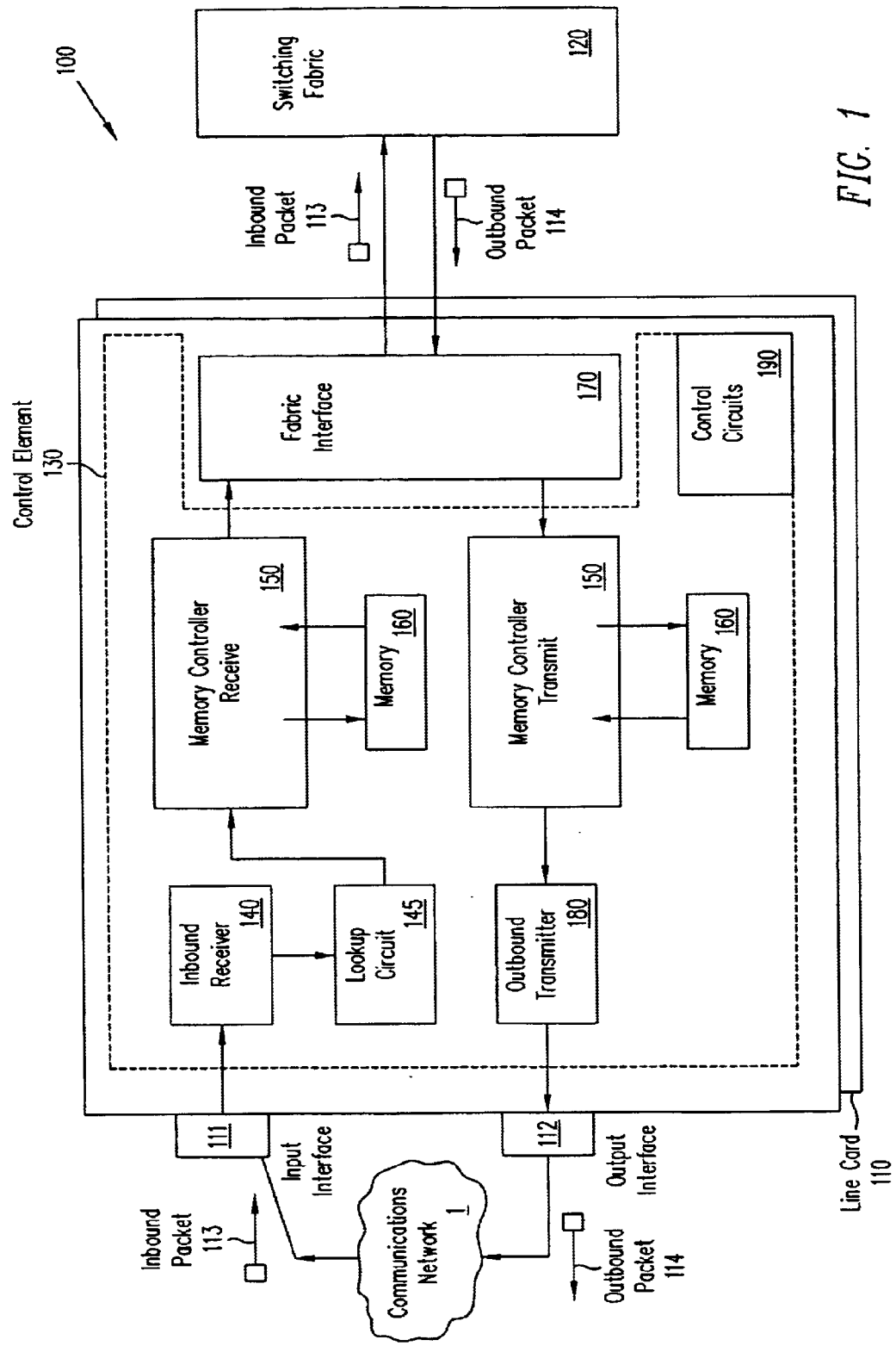
FIG. 1 is a high-level schematic representation of a switch system that contains prior art circuitry or the circuit/process of the present invention.
Figure 2:
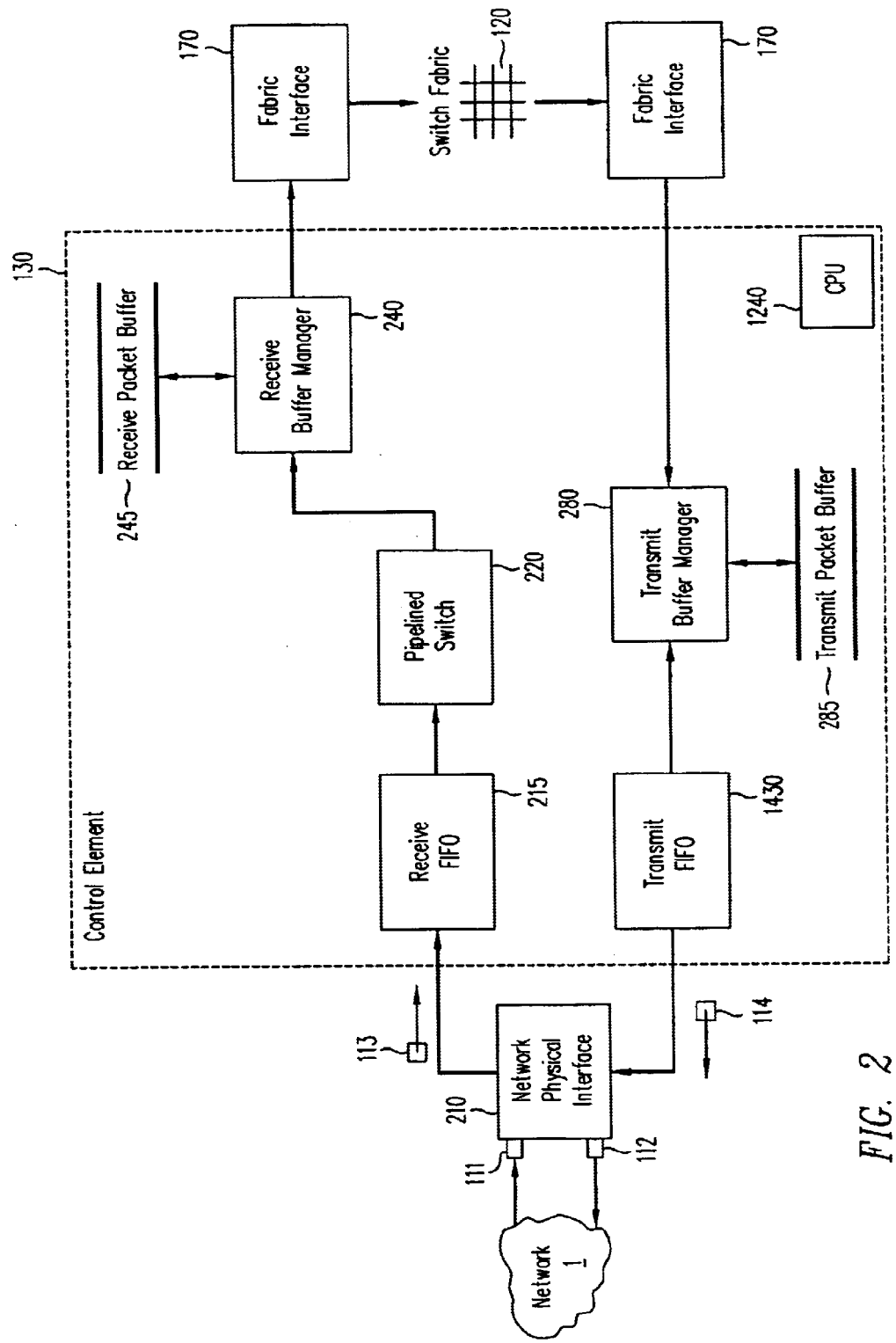
FIG. 2 is a high-level schematic of linecard control element 130 according to one embodiment of the present invention.

The linecard architecture of the present invention consists of distinct receive and transmit datapaths. Each datapath is independent and operates on a stream of packets received from network 1, as shown in FIG. 2. The receive side datapath is defined as the path from network physical media 1 to the router's switch fabric 120. The transmit side datapath is defined as the path from the switch fabric 120 to network 1.

In the present invention, packets 113 are received from the network through network physical interface 210. This interface may take any form, depending on the physical medium of network 1. In one embodiment of the present invention, network 1 reaches the switch on a SONET optical fiber. Hence, network physical interface 210 must provide optical to electrical conversion, clock recovery, serial to parallel conversion, framing, payload extraction, packet delineation, and packet multiplexing by means well-known in the art.

Although subsequent sections describe an optical fiber medium and (in particular) the OC48 medium and encapsulation standard and the IP and TCP transport protocols, those skilled in the art will realize that framing/encapsulation schemes and media other than OC48, including those with higher or lower speeds such as OC12, OC192, SDH, packet over SONET, and ATM framing/encapsulation schemes and copper (wire) or fiber optic media, can be used. Likewise, protocols other than TCP/IP can be used, such as UDP or ATM. Accordingly, the present invention is not limited to any particular type of media or protocol. The present linecard architecture invention is concerned with the processing of the received packets after they are reconstituted from the medium.

Also note that while the specific discussion herein relates to Internet Protocol version 4 (IPv4), nothing in the present invention is limited to an IPv4-only implementation. The present invention can also be practiced in connection with the forthcoming IP version 6 (IPv6). Furthermore, although routing/switching of IPv4 packets is described, the present invention is equally able to do forwarding of Multi-Protocol Label Switching (MPLS) labeled packets (also sometimes referred to as "TAG switching") and other protocols known in the art.

Figure 3:
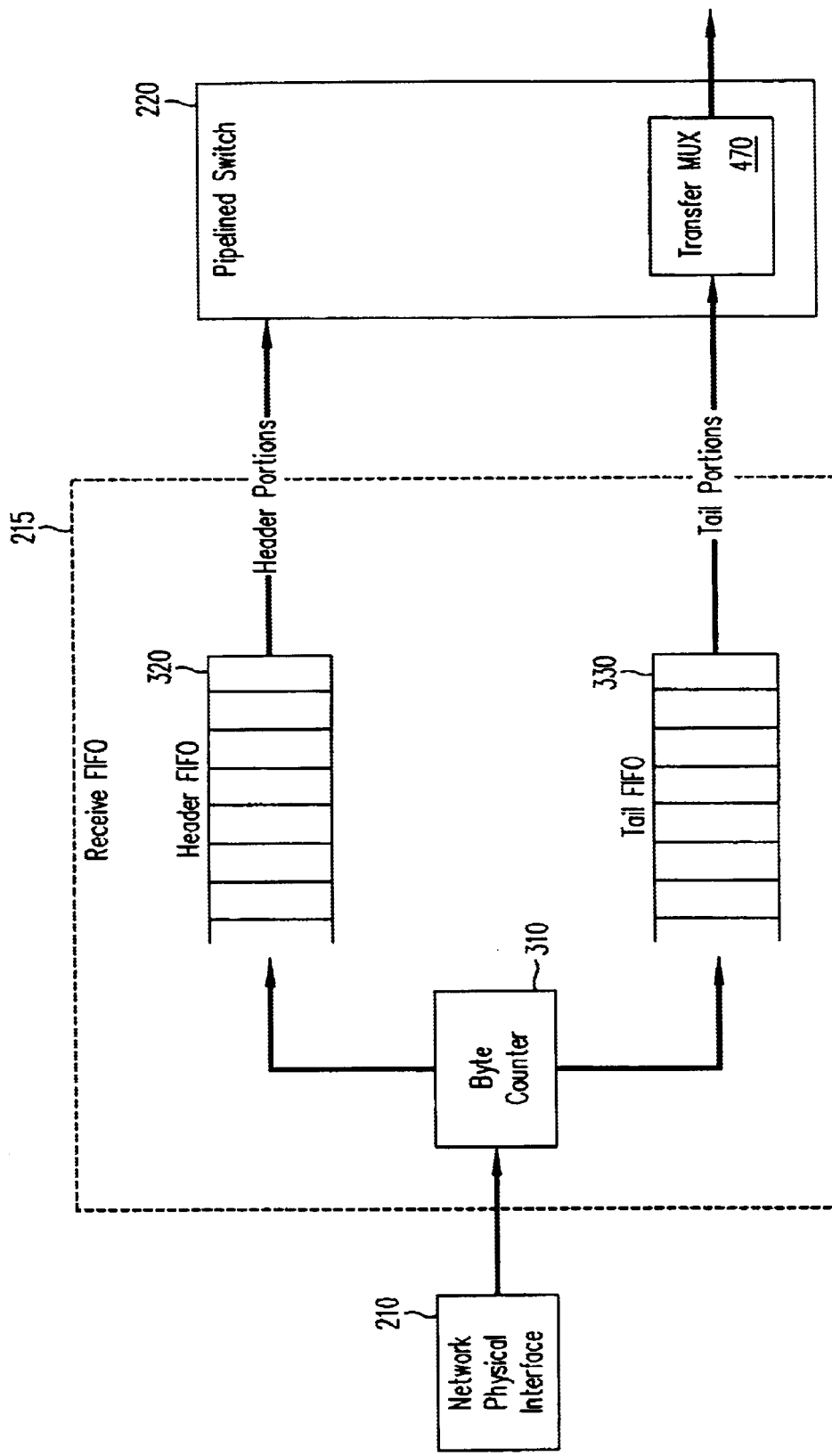
FIG. 3 is a high-level schematic of receive FIFO 215 according to one embodiment of the present invention.

The packet initially enters linecard control element 130 at receive FIFO 215. This FIFO buffer is employed to absorb bursts of small packets which arrive while the pipeline isn't moving fast enough to keep up. Additionally, receive FIFO 215 allows control element 130 to process packets from multiple input interfaces 111. Referring to FIG. 3, incoming packets 113 are then separated into a header portion and a tail portion by byte counter 310, a part of receive FIFO 215. Receive FIFO 215 comprises two logically distinct FIFOs. Header portions, here simply defined as the first n bytes of the received packet, are placed in header FIFO 320. The balance of the packet, i.e., bytes n+1 through the end of the packet, are placed in tail FIFO 330. Here the term "header portion" refers only to the first n bytes of the packet; it is not synonymous with the packet header defined as part of a packet protocol. The length of the header portion n is selected so that it includes the entire protocol header for the types of packets expected in the device.

The receive datapath is pipelined in pipelined switch 220 (FIG. 2) by breaking the processing down into small components of the overall processing task for each packet. Each pipeline stage works on a different packet header portion. When the operations of all stages are complete, each stage passes its results on to the next stage at the same time. In the receive path, for example, the first stage reads in a new header portion from receive FIFO 215; once that header portion has passed through all pipeline stages, the last stage sends the now modified header portion on to the receive buffer manager 240. At the same time, of course other earlier- and later-received packets are simultaneously working through the pipeline stage by stage.

There is no feedback from one pipeline stage to the previous, except for the handshake of passing packets forward from stage to stage. In one embodiment of the present invention, this is a self-adjusting system where there is no fixed packet shift clock. Instead, stages shift in synchronization with each other when all stages have completed their respective work. In an alternate embodiment, synchronization is provided by a common packet shift clock. The speed at which packets are passed from one stage to the next is the net forwarding rate that is achievable for the linecard.

Figure 4:
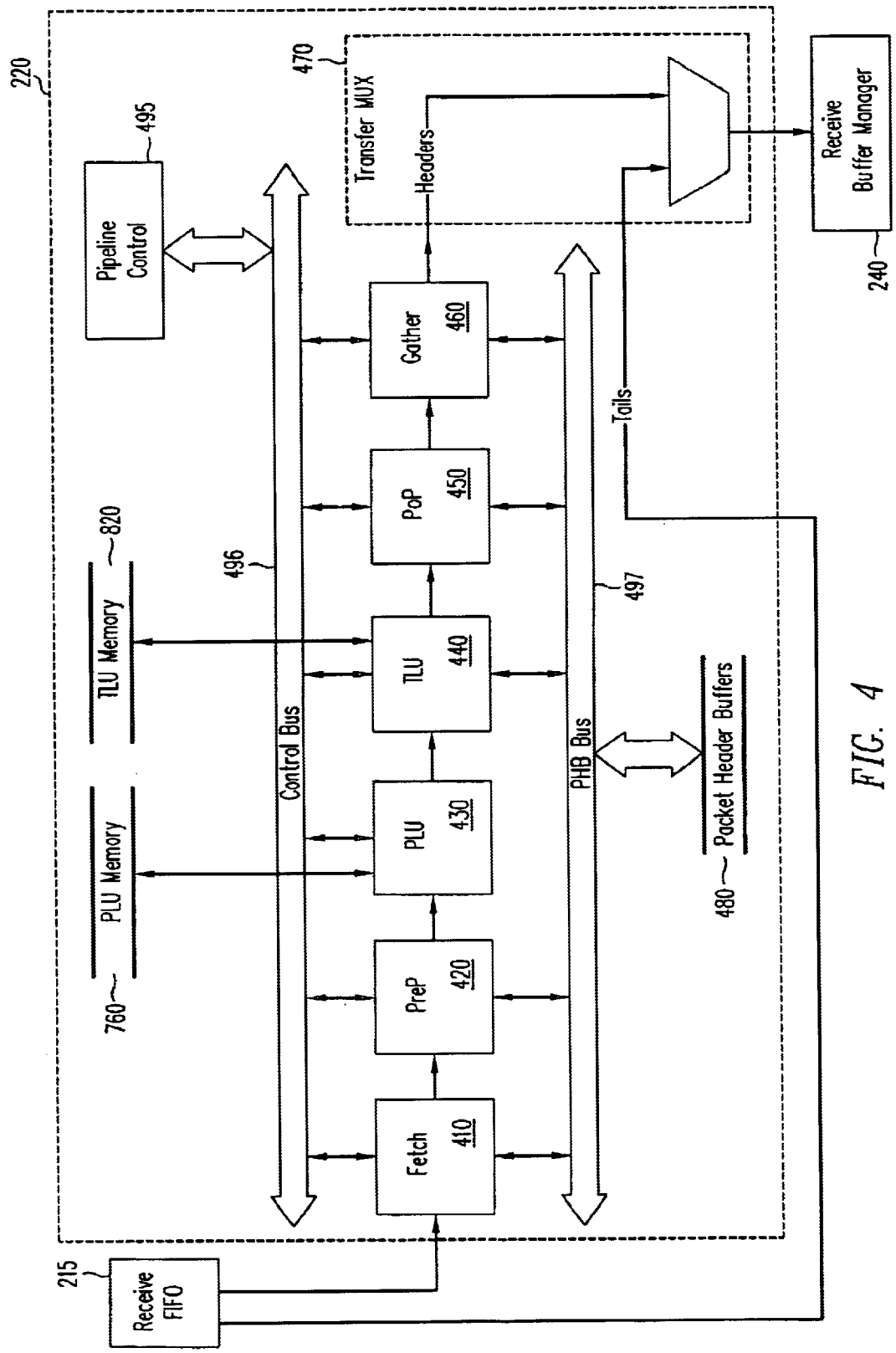
FIG. 4 is a high-level schematic of pipelined switch 220 according to one embodiment of the present invention.
Figure 5:
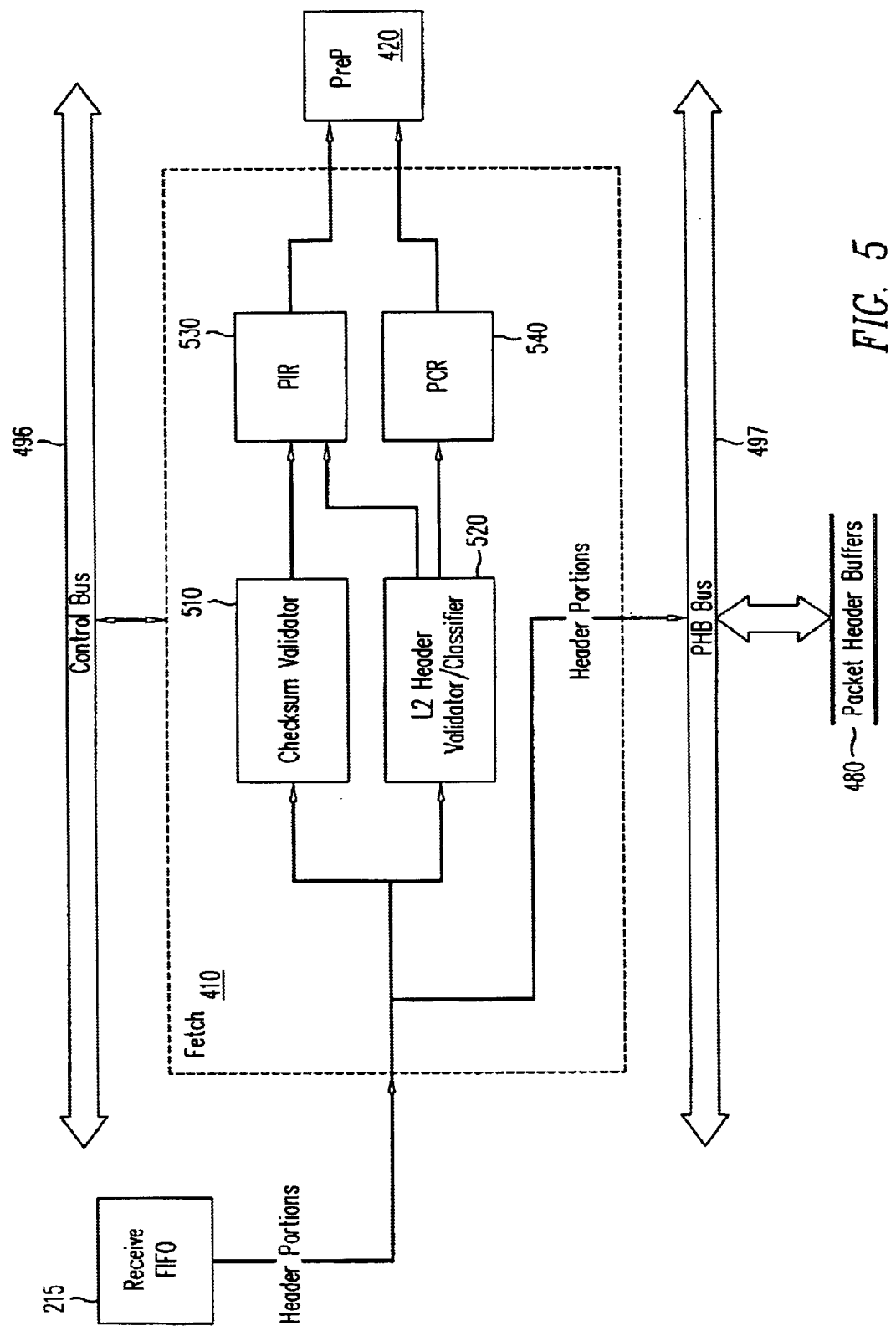
FIG. 5 is a high-level schematic of fetch pipeline stage 410 according to one embodiment of the present invention.
Figure 6:
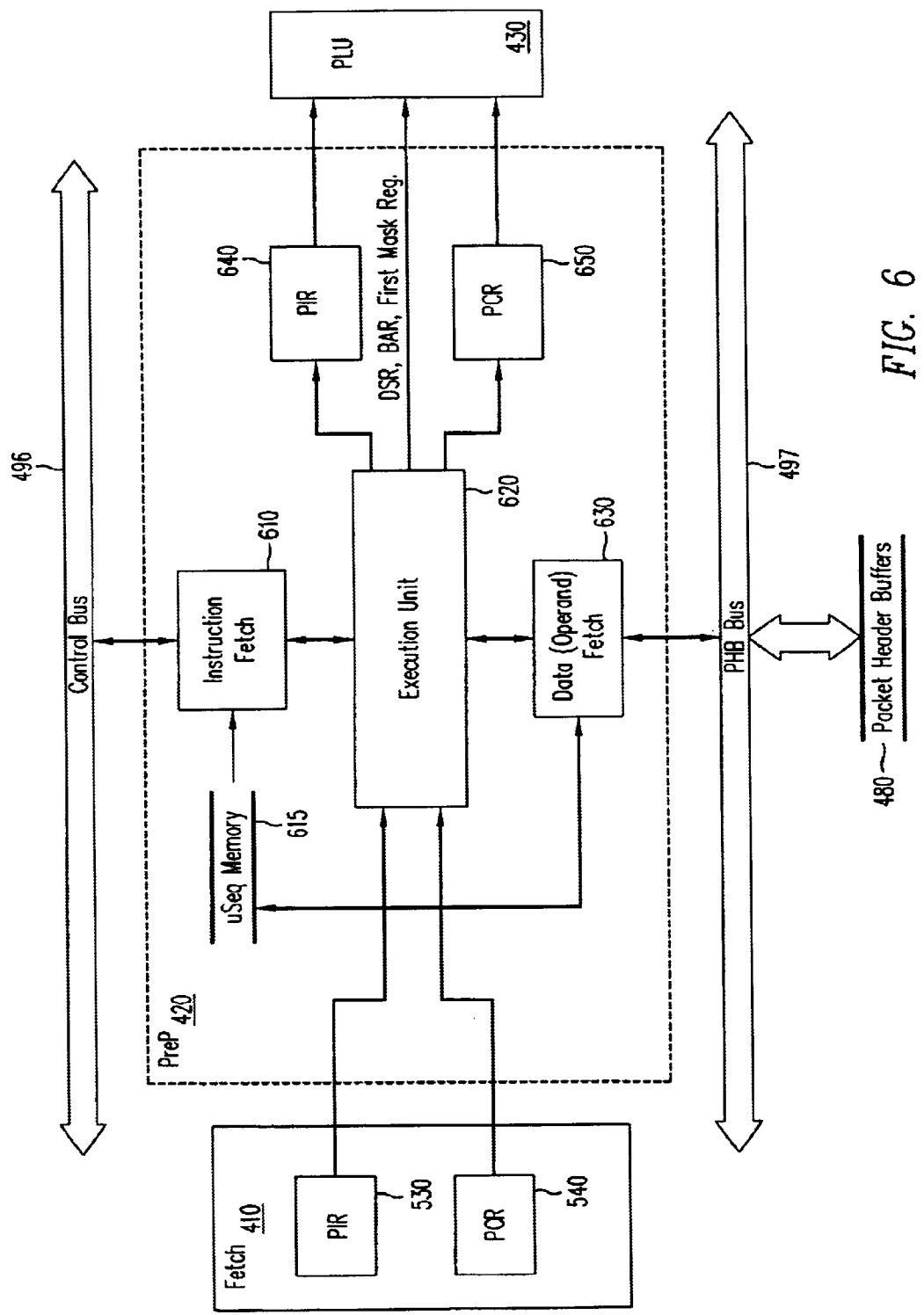
FIG. 6 is a high-level schematic of PreP pipeline stage 420 according to one embodiment of the present invention.
Figure 7:
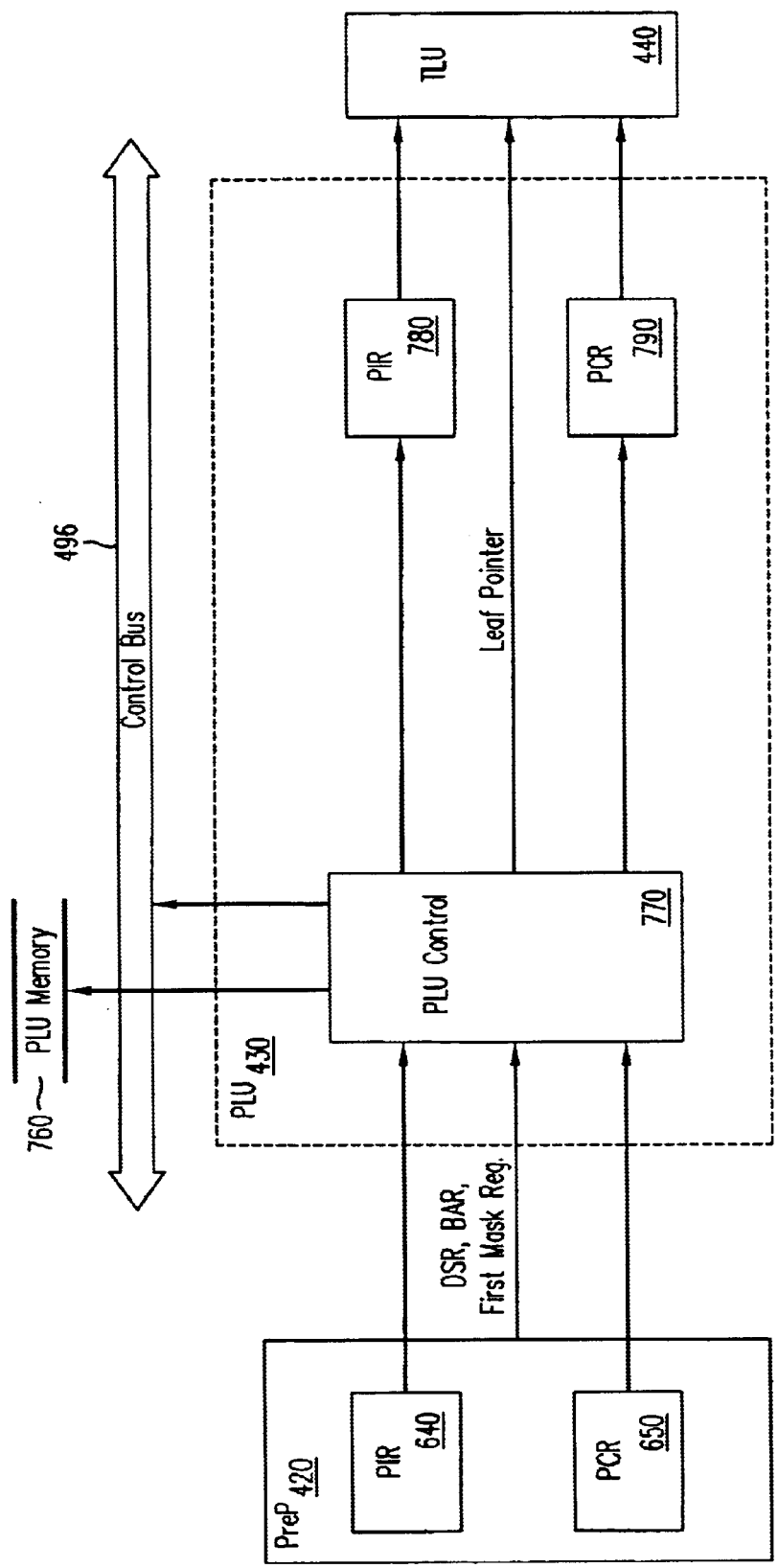
FIG. 7 is a high-level schematic of PLU pipeline stage 430 according to one embodiment of the present invention.
Figure 8:
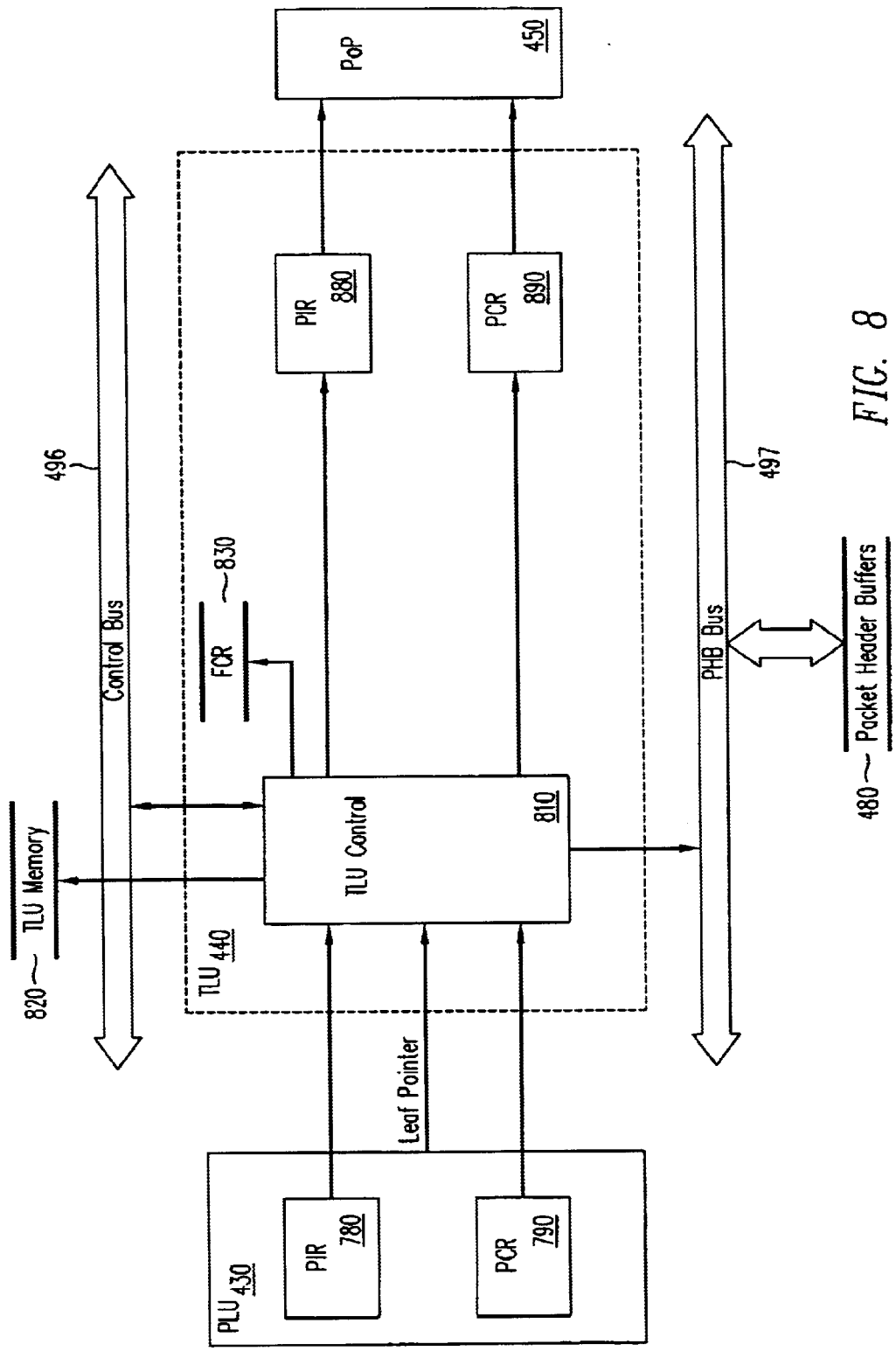
FIG. 8 is a high-level schematic of TLU pipeline stage 440 according to one embodiment of the present invention.
Figure 9:
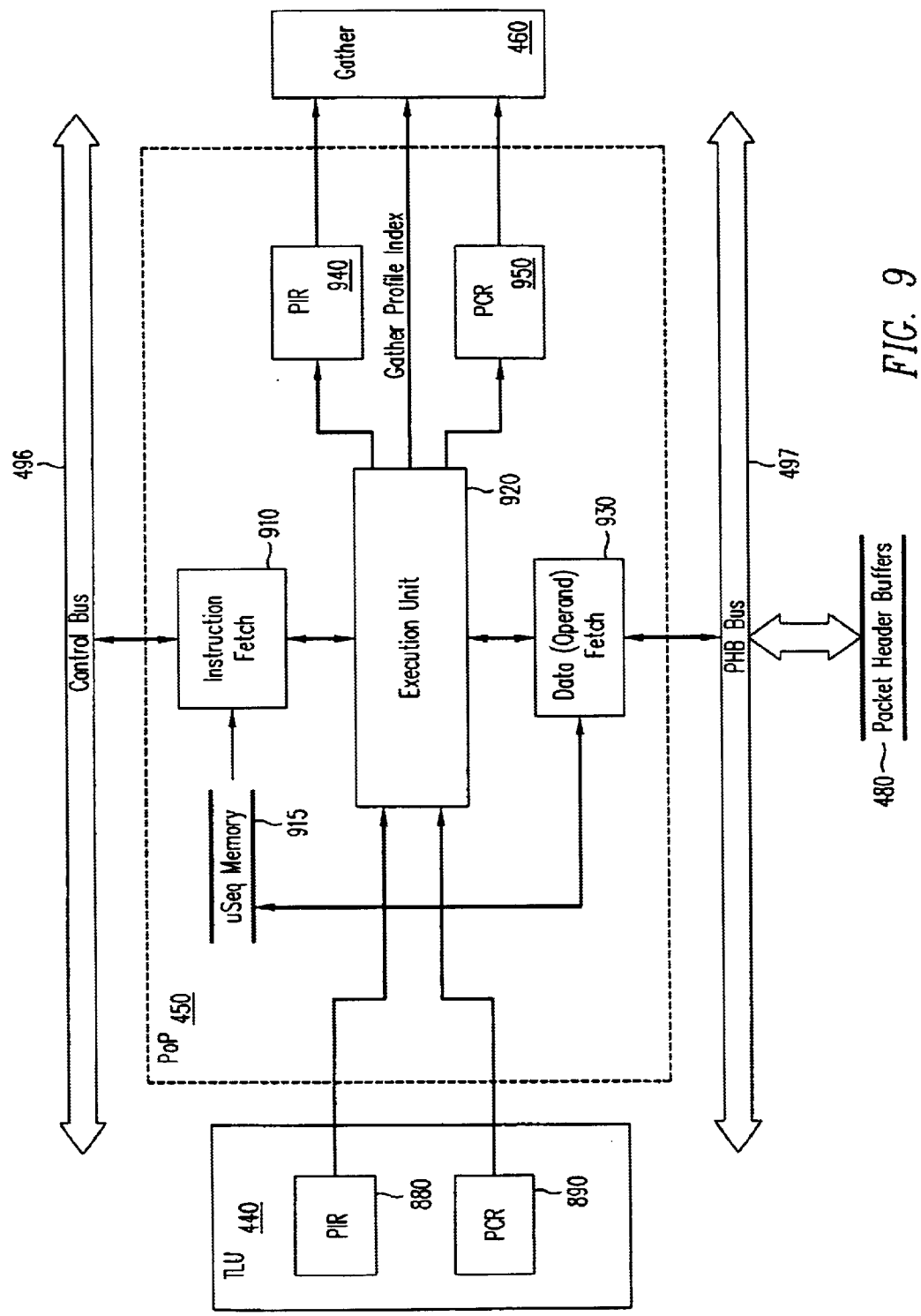
FIG. 9 is a high-level schematic of PoP pipeline stage 450 according to one embodiment of the present invention.
Figure 10:
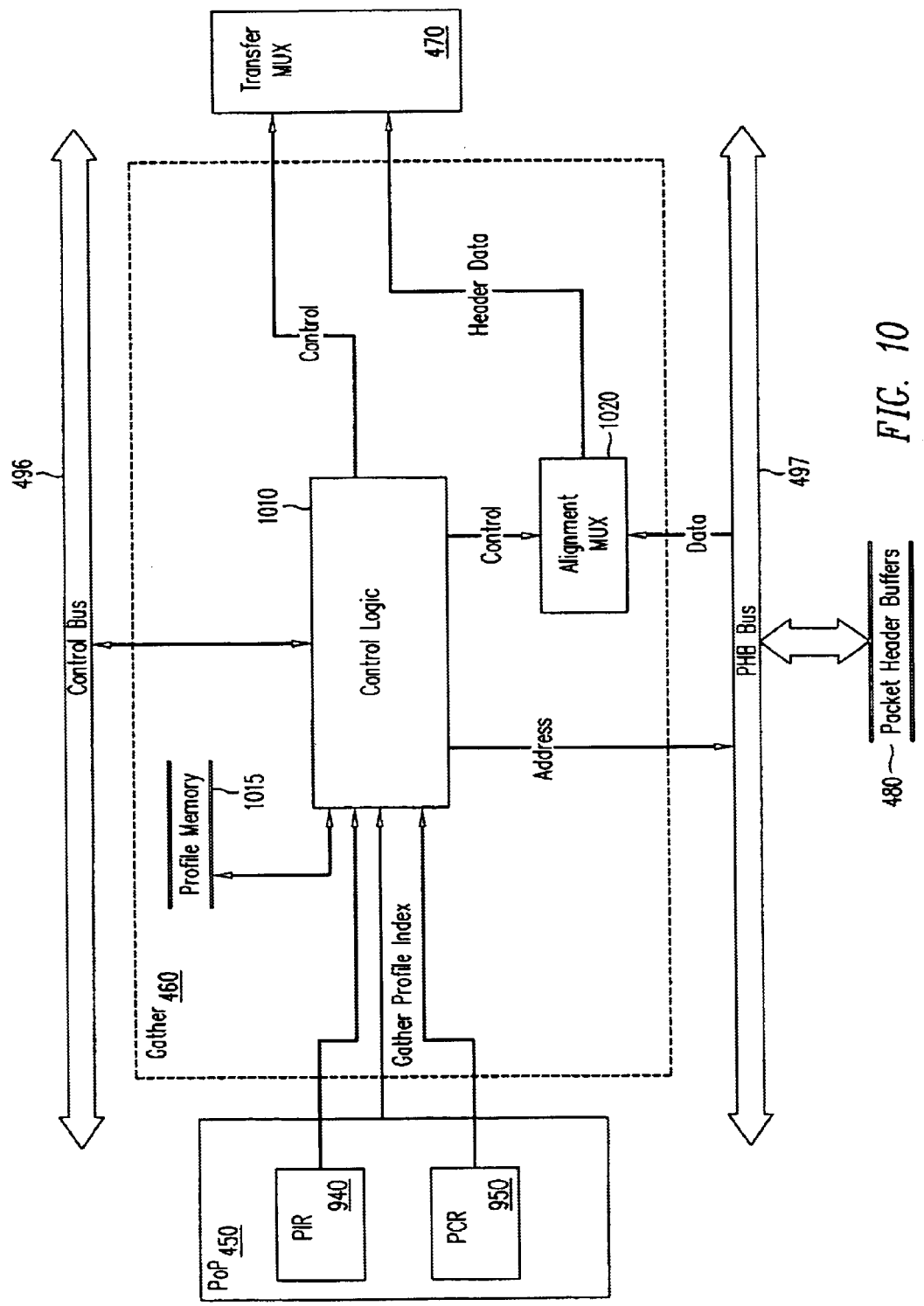
FIG. 10 is a high-level schematic of gather pipeline stage 460 according to one embodiment of the present invention.
Figure 11:
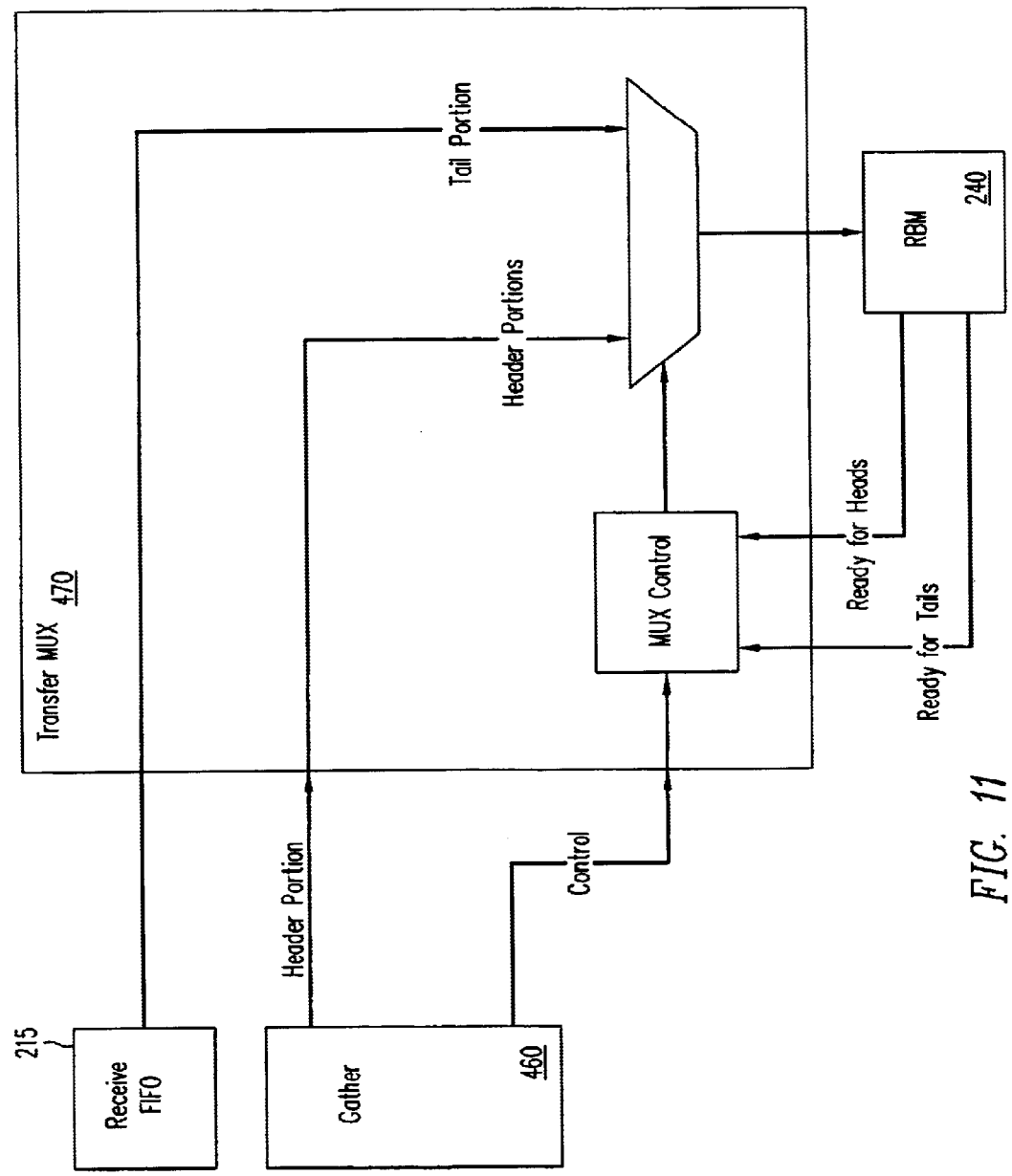
FIG. 11 is a high-level schematic of transfer mux circuit 470 according to one embodiment of the present invention.

Pipelined switch 220, shown in FIG. 4, is comprised of the following stages. These circuits, executing in sequence on a given packet, form the heart of the receive datapath.

Fetch Stage 410: Provides the physical transmission of the packet header (only) from Receive FIFO 215 into pipelined switch 220. As the data arrives, various checks are performed such as L2 protocol and IP header checksum (for IPv4 packets). The results of these checks are made available to the next stage.

Pre-process (PreP) Stage 420: Performs other checks and classifications and ultimately extracts the appropriate field or fields from within the packet header for a lookup (typically the IP destination address or MPLS label).

Pointer Lookup (PLU) Stage 430: Walks a tree-based data structure, making decisions along the way based on the operand (i.e., the extracted field or fields from the prior stage) being looked up. Ultimately an end point (a "leaf") is reached whose address is passed along to the next (TLU) stage.

Table Lookup (TLU) Stage 440: Walks a linked list of structures, making decisions based on information passed to it from the previous stages and collects information, e.g., which queue to send the packet to. In an alternate embodiment, the TLU stage also keeps accumulated statistics of which structures within the linked list were visited.

Post-processing (PoP) Stage 450: Makes decisions based on the sum of all the data collected by the previous stages. Additional tests/checks are done, and a data structure incorporating a summary of the disposition of this packet is created, referred to as the buffer header or BHDR. The BHDR includes an indicator showing the class of service (CoS) requirement of the packet. A gather profile is also selected from a pre-programmed list, based on the packet type, to enable proper reordering and collection of header and BHDR data by the gather stage.

Gather Stage 460: Programmed by the selection of a gather profile in the PoP stage to gather together various elements of information generated by the previous stages, this stage creates the final packet structure and its header (e.g. pushing/popping MPLS labels, etc.).

Transfer Mux 470: In one embodiment of the present invention, buffers the header portion from the Gather stage and multiplexes it with the tail portions in multiplexer (mux) 475 so that both the header and tail portions can be transmitted to RBM 240 over the same pins. One of skill in the art will recognize that such a pin-saving mux scheme is not essential and may be omitted.

Further details of each stage circuit in pipelined switch 220 are discussed below and in FIGS. 5 through 11.

Figure 12:
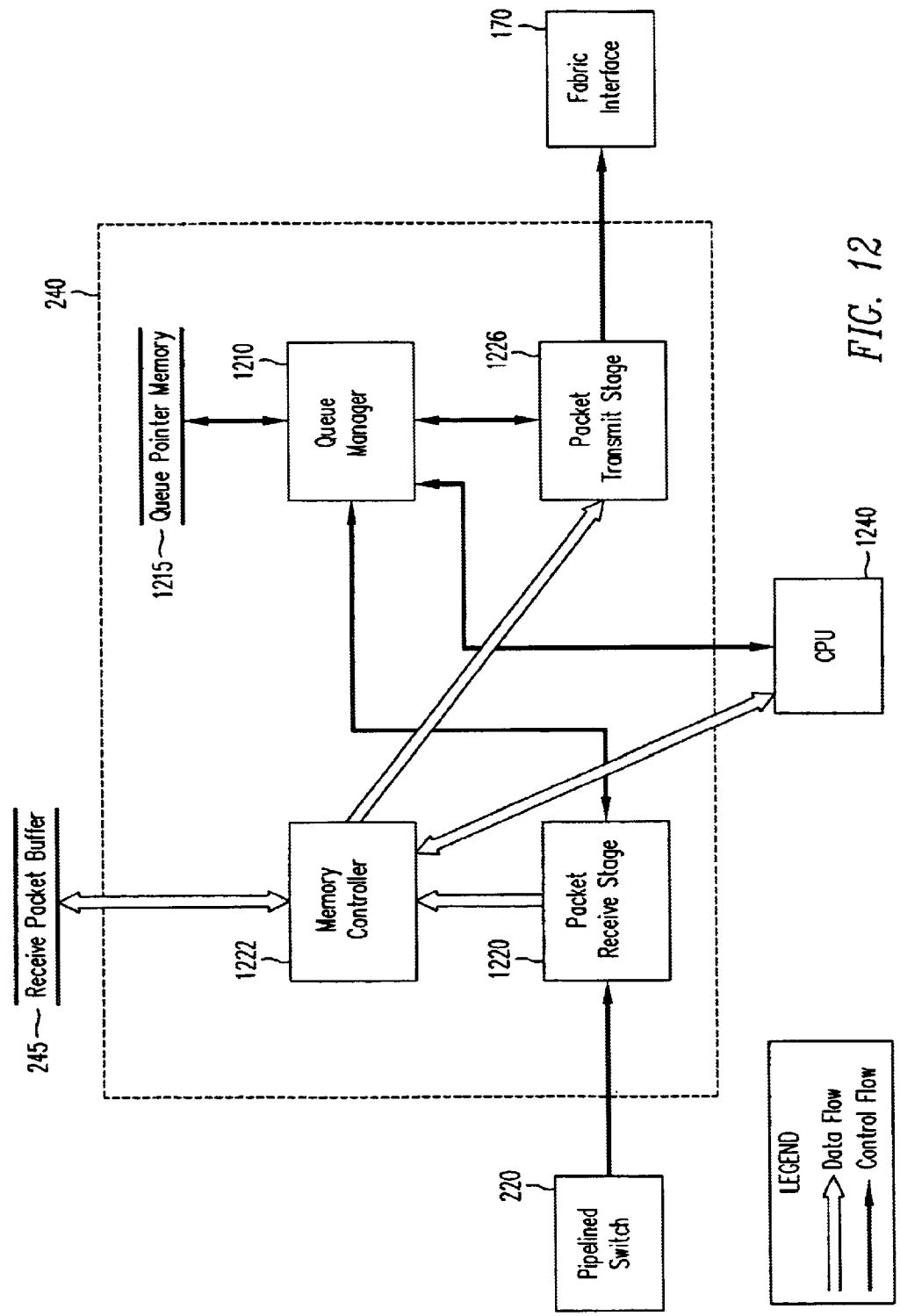
FIG. 12 is a high-level schematic of the receive buffer manager (RBM) 240 according to one embodiment of the present invention.

Packets then enter receive buffer manager (RBM) 240, which is detailed in FIG. 12. Packet receive stage 1220 is used to provide a small amount of surge-protection buffering for the re-joined packets. Packet header and tail portions are buffered separately in packet receive stage 1220 (see FIG. 13) and then re-joined in joining circuit 1350, which is, in one embodiment of the present invention, a simple multiplexer.

The size of the packet is next read by queue manager 1210. Queue manager 1210 maintains lists of free buffers of various sizes in its large external memory, referred to as receive packet buffer 245. Those skilled in the art will realise that this buffer needs to be large enough to hold hundreds of MBytes of packet data, in order to optimise the efficiency of TCP data transfers. Pointers to each buffer (and other related control information) are stored in pointer queue memory 1215. Queue manager 1210 determines a pointer to an appropriately sized free buffer for the re-joined packet based on its size.

In an alternate embodiment of the present invention, the free buffer pool is implemented as a number of fixed-sized buffers, with a mechanism to concatenate them appropriately to accommodate different packet sizes.

Queue manager 1210 next enqueues the packet into an output queue specified in the BHDR appended to the packet by pipeline gather stage 460. (Remember that PoP 450 determined which queue to send the packet to earlier, using CoS-derived information from PLU 430 and TLU 440.) Queue manager 1210, in one embodiment of the present invention, implements a congestion avoidance algorithm, such as the well-known random early detection (RED) algorithm, discussed below, which ultimately determines if the packet really is to be enqueued as requested, or dropped.

Packets are serviced from the output queues by packet transmit stage 1226 and sent to the switch fabric (backplane) interface 170 via a bandwidth sharing scheme. In one embodiment of the present invention, the bandwidth sharing scheme is a modified deficit round robin (MDRR) scheme, discussed below. From fabric interface 170, the packets enter switch fabric 120 and are connected directly to a device linecard 110 (not shown), which may be the same linecard or a different one, connected to the output port identified in the BHDR.

Packets which have some exception condition (e.g., errored packets or packets of a type that pipelined switch 220 is not configured to process) and thus are not able to processed by the pipeline are flagged for special treatment through each stage and ultimately sent to a special queue (the RAW queue) within receive packet buffer 245. The RAW queue is serviced by linecard general-purpose CPU 1240.

Figure 15:
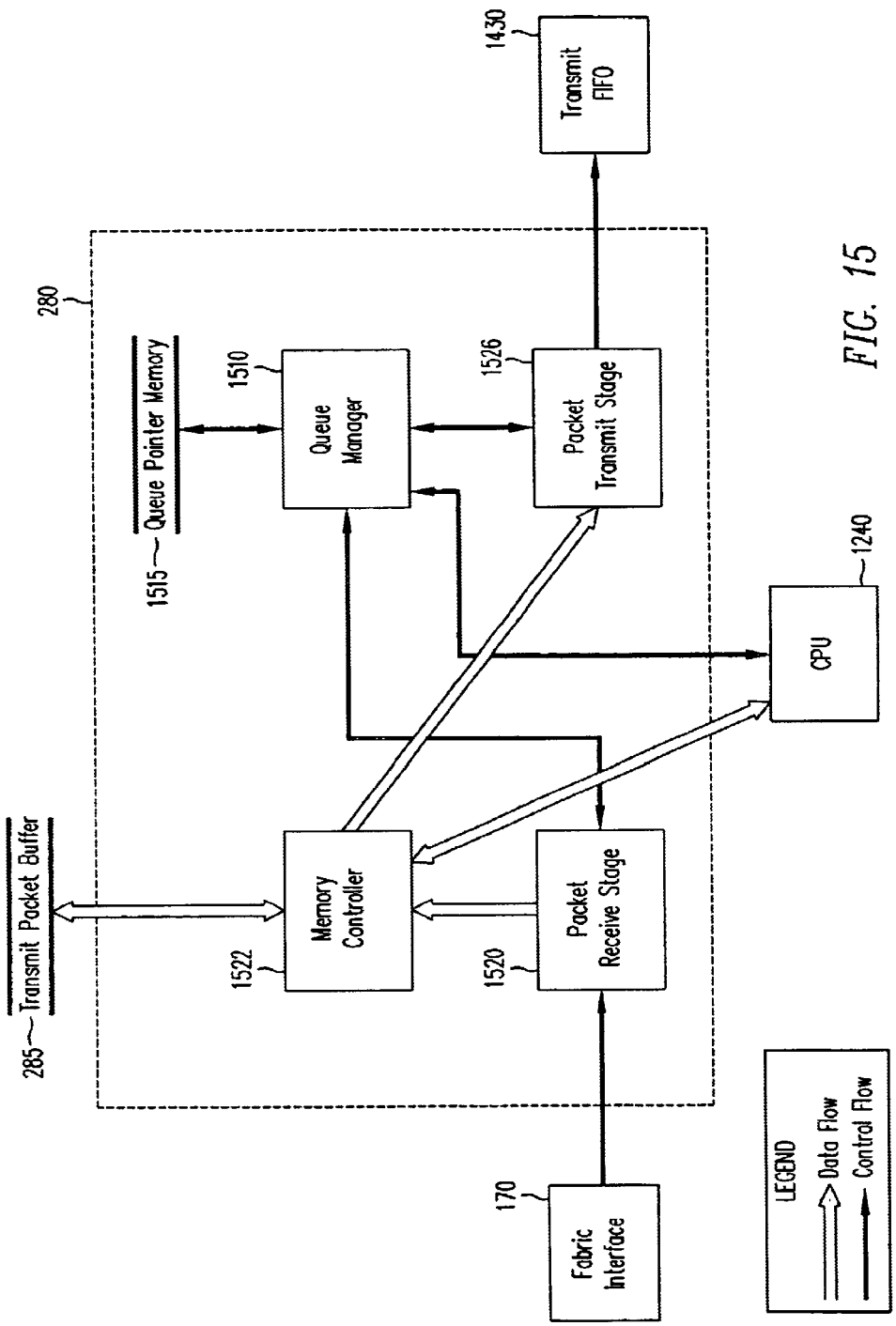
FIG. 15 is a high-level schematic of transmit buffer manager (TBM) 280 according to one embodiment of the present invention.

The transmit datapath is shown in FIG. 15. Packets received from fabric 120 via fabric interface 170 are written to transmit packet buffer 285 and queued to an output queue indicated in the BHDR of the packet. As above, the output queue is determined at least in part by the class of service required by the packet. These output queues also run a congestion-avoidance algorithm, such as the RED algorithm mentioned above. Packets can also be queued to the local general-purpose CPU 1240, as above.

Outbound (transmit) packets are serviced from these output queues by packet transmit stage 1526 (and sent to the various interfaces) via a bandwidth-sharing algorithm such as MDRR. In the process, packets have their output encapsulations added as the packet is read from transmit packet buffer 285. The encapsulation is determined by a field of the BHDR, which was set in pipelined switch 220.

Transmit FIFO 1430 (referring to FIG. 2) is between the packet transmit stage 1526 and network physical interface 210 to absorb bursts and keep the utilization of the media links at 100%. The packet 114 thus leaves control element 130 through network physical interface 210, eventually leaving linecard 110 for network 1.

The subsections below each discuss the major functional blocks of the present architecture in greater detail.

Receive FIFO

Referring to FIG. 3, after processing by network physical interface (NPI) 210, the packets are transmitted to byte counter 310 of receive FIFO 215. The exact length of the received packet is stored with the packet header by NPI 210. The header portion of the packet is, in one embodiment, the first 64 bytes (i.e., n=64) as this is enough for the pipelined switch 220 to make the appropriate switching decisions for TCP/IP and MPLS switching with PPP encapsulation. This value n (discussed above) is programmable and the present invention should not be construed to be limited to any particular header portion length; other lengths may be found with experience to be better optimized for different protocols and encapsulations.

Receive FIFO 215 allows for more flexible processing in pipelined switch 220 by providing surge buffering. This buffering allows pipelined switch 220 to process different types of packets, taking more or less time as demanded by each packet's needs.

Receive FIFO contains, in one embodiment, two logically separate FIFOs: one for the packet header portion (header FIFO 320) and one for the remaining part of the packet (if any), referred to as the tail or tail portion (tail FIFO 330). Note that this is a logical distinction only; physically, there may only be one FIFO.

In an alternate embodiment of the present invention, receive FIFO 215 can be omitted (leaving only conventional circuitry such as byte counter 310 to separate the header portion from the tail portion) if the pipelined switch is fast enough to process the header portions under all circumstances without buffering.

In one embodiment of the present invention, the header and tail portions are multiplexed together by conventional means (not shown) in order to conserve interconnection pins between receive FIFO 215 and pipelined switch 220. On receipt in pipelined switch 220, header portions proceed into the pipeline while tail portions are sent directly to transfer mux 470. Transfer mux 470, as will be discussed below, also conserves interconnection pins by multiplexing the post-pipeline processed header portions and tail portions for transmission to RBM 240.

In a further alternate embodiment, an additional surge protection FIFO is used in pipelined switch 220 to protect RBM 240 from being overloaded. This FIFO (not shown) is placed on the tail portion line immediately before transfer mux 470.

Pipelined Switch

Packet headers from the header FIFO 320 are fed into pipelined switch 220, which performs the L3 or MPLS switching function, shown in FIG. 4. The switching function in pipelined switch 220 consists of several stages.

Pipelined switch 220 operates on a relatively constant latency per packet switching decision. As packets can be received from the network physical interface 210 at an instantaneous rate faster than this, header FIFO 320 and tail FIFO 330 (shown in FIG. 3) also serve the dual purpose of providing a burst buffer and smoothing the flow of packets into pipelined switch 220.

As the header moves through the pipeline stages, the various components of the switching decision are made, including updating the appropriate fields in the IP header (TTL, CHECKSUM) and prepending a Buffer Header (BHDR) to the packet. The BHDR is written such that when the packet header eventually leaves the last switching stage it is ready to be queued on the correct output queue in the receive buffer memory and sent through switch fabric 120 to the destination output linecard 110. No additional changes to the buffer header or the packet are required.

At the end of the pipeline, header portions are transferred to receive buffer manager 240. Tail portions, which were sent through pipelined switch 220 using a path which bypasses the pipeline, are also transferred, separately, to receive buffer manager (RBM) 240. In one embodiment of the present invention, transfer multiplexer (mux) 470 is used to conserve the number of signal pins required to make these transfers by multiplexing the header and tail portions over the same physical path. In an alternate embodiment, not shown, transfer mux 470 is omitted and the header portion and tail portion paths from receive FIFO 215 to RBM 240 are both physically and logically separate.

Each stage in pipelined switch 220 operates on a different packet. When a stage completes its operation it signals to the pipeline control 495 that the operation has completed and waits for a start signal from the pipeline control. Pipeline control 495 waits until all stages have completed their operations before it signals to all the stages (over control bus 496) to start processing the next packet. Thus, while the starting point of the pipeline is synchronous across all stages, the period each stage operates is asynchronous, thereby allowing some stages to use more time for processing as required.

Pipelined switch 220 has six memories called packet header buffers (PHBs) 480, corresponding to the six pipeline stages. Each packet header is associated with a different PHB 480 by a unique pointer to that PHB. These pointers are passed from stage to stage, rather than physically moving the PHBs or copying the data therein. The packet header is written into a PHB as it arrives from receive FIFO 215 and the pointer to that PHB is given to the first stage (fetch 410). The pointer to that PHB then moves through the pipeline stages, advancing each time the pipeline is restarted by pipeline control 495 (i.e., each time pipeline control receives word that all stages have completed operations and signals the start of the next stage's processing). Each pipeline stage performs its operation, reading and/or writing the PHB using the pointer as required.

Pipelined switch 220 also maintains, in one embodiment of the present invention, two sets of registers for inter-stage communications, the packet information registers (PIRs) and the packet control registers (PCRs). There are five PIRs and five PCRs, one each for each pipeline stage, shown in FIGS. 5 through 10. The PIRs propagate information about the packet to be used for normal fast path processing. The PCRs, by contrast, only propagate control and exception information. Normally, the PCRs are empty (all zeros). Flags in the PCRs are only set if an exception or error condition is encountered in a stage; the flags are then propagated in the PCRs down the pipeline.

Further specific details for each stage of pipelined switch 220 follow in the subsections below.

Fetch Stage

The fetch stage (FS) 410 (FIG. 5) interfaces with receive FIFO 215, which sends the first n bytes, where n is a programmable value, of a packet (the header portion) to it. The FS receives the packet header and writes it into a PHB. Along with the packet header, receive FIFO 215 sends the packet length and channel number information (in the case of linecards having multiple input interfaces 111), which are stored in packet information register 530. Receive FIFO 215 also sets a flag bit indicating if this header has a corresponding tail portion.

As fetch stage 410 receives the packet header it performs the following operations. First, the FS writes the packet header into the PHB starting at the PHB offset address contained in a unique pointer assigned by the pipeline control. Next, the fetch stage calculates the IP header checksum in IP checksum validator 510. In one embodiment of the present invention, the FS assumes that the packet is IP with 4 bytes of MAC encapsulation preceding it and calculates the IP header checksum of the incoming packet accordingly. (One of ordinary skill in the art of course appreciates that such an assumption is not required but is only made because it covers the majority of typical cases. Accordingly, the present invention is not so limited.) Based on the checksum calculation, FS 410 sets an indication in the PCR 540 if the checksum is correct or not, which is used by PreP stage 420. If the packet is not IP, this indication is ignored. If the packet is IP and the checksum is incorrect, the packet is discarded as described further below.

Fetch stage 410 then compares the MAC encapsulation of the incoming packet to a preprogrammed value for the channel (also known as the "interface") that the packet arrived on. The preprogrammed MAC encapsulation value is 2 bytes wide to accommodate a variety of protocols, such as PPP and HDLC. This value is the first two bytes of the MAC header.

FS 410 then assists in protocol identification by comparing the protocol field in the MAC header (the last two bytes) to a set of several preprogrammed values for each encapsulation and sets an indication to PreP 420 based (in PIR 530) on the protocol type of the incoming packet. In one embodiment, the FS assumes 4 bytes of PPP, HDLC, or Frame Relay (FR) encapsulation; any other encapsulation results in the FS not identifying the protocol type and not setting the appropriate indication to the PreP. One of ordinary skill in the art will of course see that other assumptions and programming are possible as well. In this case, the PreP will complete the protocol identification. FS 410, in one embodiment of the present invention, has eight, 16 bit protocol registers. More or fewer protocol registers are also possible. Linecard CPU 1240 programs these registers to the values the incoming protocol field should be compared to. The eight registers allow checking for specific cases in the fast path, including but not limited to:

IP unicast over PPP
IP multicast over PPP
IP unicast over FR
IP multicast over FR
MPLS unicast over PPP
MPLS multicast over PPP
IP unicast over HDLC
IP multicast over HDLC
MPLS unicast over HDLC
MPLS multicast over HDLC
MPLS unicast over FR
MPLS multicast over FR For linecards with multiple inbound channels, each channel can be programmed to select only a subset of the protocol registers. Thus, when a packet comes in on a channel that has PPP encapsulation configured, it is compared only against the protocol registers which contain PPP protocol values. Packets which come in on channels with HDLC encapsulation configured are compared with protocol registers with HDLC values. The FS indicates to the PreP stage the protocol type found by setting the appropriate bits in PIR 530.

Protocol identification and header validation and classification are performed in L2 header validator/classifier 520 by conventional means well-known in the art.

PreP Stage

The main purpose of PreP stage 420 (FIG. 6) is to complete the packet classification, prepare the address fields that need to be looked up by the following stages, and perform various checks and statistics accumulation on the packet. Specific tasks include, but are not limited to:

Examine the MAC checking and protocol identification results from fetch stage 410.

If the packet is IP, examine the L3 header. If the L3 header is more than 20 bytes and is an IPv4 packet (i.e., it has options), the packet is forwarded to the linecard CPU.

If the packet is IP, examine the results of the fetch stage checksum calculation.

Decrement & check the time to live (TTL) field.

Extract the destination address (for IP) or label (for MPLS switching) and the CoS and load them into the destination search register (DSR) for PLU stage 430 to search on.

Determine the appropriate base address (i.e., the first mask register value) to use for the packet lookup and pass the base address to PLU stage 430 via the base address register (BAR). Different base addresses may be determined, in some embodiments, by the source interface or packet CoS.

Provide other services, such as identifying multicast and pre-calculating the RPF hash lookup, as well as support for load balancing, such as by calculating an appropriate hash value.

When the PreP identifies an exception case in which pipelined switch 220 cannot forward the packet (e.g., TTL expired, checksum error, IP options), it sets the skip bits in the packet control register (which moves along with the packet header from stage to stage). This indicates to the following stages to skip operations. The packet is eventually passed to the PoP stage, which decides how to continue with the packet based on the exception type.

PreP stage 420 operation is controlled by execution unit 620, which is, in some embodiments of the present invention, a microsequencer. Microsequencer memory 615 stores conventional instructions to be fetched by instruction fetch 610 for execution. Instruction fetch 610 can also be instructed by and communicate with pipeline control 495 via control bus 496. Packet header buffer data (from PHB 480) is conveyed to execution unit 620 via PHB bus 497 and data fetch 630.

PLU Stage

PLU stage 430 (FIG. 7) consists of a programmable indirect search engine (control 770) that performs lookups in a data structure known as an "M-trie" stored in PLU memory 760. M-trie structures are further described in commonly-owned, co-pending U.S. patent application Ser. No. 09/127,253, ROUTING TABLE LOOKUP by John H. Hughes, filed on Jul. 31, 1998, incorporated herein by reference in its entirety.

The PLU stage performs indirect lookups using the value fetched from memory as a base pointer to calculate the next fetch and thus "walk" an M-trie. Alternatively, it can perform a single lookup which could be used for MPLS (TAG) switching among other things. The PLU is a programmable search engine and its operation is controlled by the following three registers:

Destination Search Register (DSR): The DSR contains the data key being looked up, e.g., the IP destination or the MPLS label. It is loaded by the PreP stage.

Base Address Register (BAR): The PLU starts its lookup at a base address defined by the BAR register. The BAR points to the top of an M-trie. One special case is a direct lookup, such as could be used for MPLS. PreP stage 420, along with loading the destination search register, writes the appropriate base address to use into the BAR, according to the packet type, and thus selects the tree to be searched (walked).

Mask registers: The mask registers define the portion of the destination address in the DSR which is to be used for the search in each search iteration. For example: in the IP case, if the first mask register has the first 16 bits set (i.e., [31:16]), it determines that those 16 bits from the DSR will be used in the PLU stage to calculate the offset for the first search. The next mask register may have the next 8 bits ([15:8]) set which indicates that those 8 bits from the DSR should be used in the next iteration, and so on. For MPLS lookup, 20 bits (i.e., [31:12]), thus defining the entire MPLS label, could be set. Thus the number of bits in the DSR which are used on each search operation is programmable via the mask registers. There are 16 mask registers in the PLU that can be programmed to any mask value. PreP stage 420, along with loading the DSR and BAR, provides the number of the first mask register. The PLU uses this mask register for its first memory iteration and then increments the mask register number and continues with the following mask register for the next iteration until it completes the search.

The output of the PLU stage is a leaf pointer which points to a data structure whose format is described by a field of the pointer itself.

TLU Stage

Based on the leaf pointer provided by PLU 430, TLU 440 (FIG. 8) looks up table entries in a second, distinct data structure in TLU memory 820. In general, the TLU is designed to "walk" (navigate) a linked list of data structures and store some of the fetched data in the corresponding PHB 480. The PLU provides the pointer to the first data structure to be fetched by TLU control 810 while the pointer to the next data structure is embedded in the (first) data structure itself. The TLU continues to fetch down the linked list, using the pointers embedded in each fetched data structure as the pointer to the next one, until it reaches the end of the list. These fetched entries can be in any format and for any purpose, such as leaf and/or adjacency information for IP or MPLS packets. Each fetch operation of the TLU is controlled by a Fetch Control Register (FCR) 830. The FCR tells the TLU the following information for each fetch:

Which part of the data structure should be stored in the corresponding PHB. This control enables storing only the required data in the PHB, if any.

Pointer offset. There are two mechanisms that define an offset to the pointer of the next data structure. If any of those mechanisms is used, the TLU uses the offset value and adds it to the pointer to the next data structure. The FCR determines which of these mechanisms, if any, is used to determine the next data structure address. The two mechanisms are:

Simple offset: In this case the TLU or PLU calculates an offset and writes it into the PIR. The TLU adds this offset value to the pointer to the next data structure to be fetched. This permits indexing a table, for example, in which the pointer to the next data structure points to the beginning of a table and the offset to the required entry in the table.

Offset select. In this mode the PLU provides a vector of 16 offset values. The TLU selects the offset to use based on a field in the data structure fetched. This mode is useful for load balancing.

End of list. This flag indicates the last fetch.

In one embodiment of the present invention, there are 32 FCRs in the TLU. The number of the first FCR to use for the first fetch is part of the information coming from the PLU and is embedded in the PLU leaf pointer. Thereafter, the TLU increments the FCR number and uses the next FCR for the next fetch until it reaches an FCR whose last fetch bit is set. In an alternate embodiment, each FCR has a link to the next appropriate FCR entry. This permits having a different linked list structure for different types of packets, since each leaf pointer in the PLU points to an FCR number based on its type. For example, an IP unicast packet selects an FCR that defines the IP unicast linked list, multicast packets select a multicast linked list, etc.

After the TLU reaches the end of the linked list, it completes storing the fetched information into the corresponding PHB 480 and signals to pipeline control 495 that it has completed its operation.

PoP Stage

The PoP stage 450 (FIG. 9) completes the switching operation based on the information stored by TLU 440. It receives the pointer to the corresponding PHB 480 containing the packet header and the results of the TLU lookup, i.e., the adjacency data as well as additional data that the TLU may have written into the PHB as per the FCRs. The PoP stage 450 computes information for the BHDR's various fields based on the information in the adjacency table, identifies the local output queue (for RBM 240) that the packet should be queued on, identifies the transmit output queue (for TBM 280), and selects a free queue to use based on the packet length and CoS.

Note that the PoP stage does not actually build the BHDR; rather, it computes any fields not actually determined the TLU fetches. It is ultimately the gather stage which collects together the various fields from the PHB into a contiguous'structure known as the BHDR.

The PoP also checks for any exception indication which may have been set by previous stages. If an exception occurred (e.g., wrong checksum, TTL expired, IP with options, or route not found in the M-trie, etc.), the PoP decides, based on the exception type, how to proceed with the packet. It can either queue it on the "RAW" (slow path) queue for further processing by linecard CPU 1240 or it can send it on to RBM 240 with an indication to drop the packet. Note that pipelined switch 220 never drops packets, in order to avoid losing synchronization with the tails. If the PoP identifies a packet that should be dropped, it marks it and sends the packet header to the RBM, letting the RBM drop the packet after it is re-joined with its tail.

Finally, PoP stage 450 selects the appropriate gather profile such that the packet can have the appropriate BHDR and encapsulation modifications made by gather stage 460.

PoP stage 450 operation is similar to that of PreP stage 420. PoP stage 450 is controlled by execution unit 920, which is, in some embodiments of the present invention, a microsequencer. Microsequencer memory 915 stores conventional instructions to be fetched by instruction fetch 910 for execution. Instruction fetch 910 can also be instructed by and communicate with pipeline control 495 via control bus 496. Packet header buffer data (from PHB 480) is conveyed to execution unit 920 via PHB bus 497 and data fetch 930.

Gather Stage

The gather stage (GS) 460 (FIG. 10) performs a gathering function on the data in the PHB 480 (i.e., reads it out in a pre-determined order) and calculates the new IP header checksum for IP packets. The gather stage is a direct memory access (DMA) machine that iteratively reads and writes data (i.e., "DMAs" data, as it is referred to in the art) from the PHB to the next stage in the pipeline sequence.

As data is read from different fields in PHB 480, it is concatenated and filtered by alignment mux 1020 and control logic 1010 such that only fields that should be sent to the output linecard are read. Fields which are not part of the packet are skipped. The gather stage defines which nibbles of PHB data should be read (by a well-known direct memory access of PHB 480) and concatenated using a gather profile programmed into profile memory 1015 at configuration (initialization) time and accessed by an index determined by the PoP stage. The gather profile is a list of address and length pairs described with respect to the top of PHB 480.

Alternatively, the gather profile can be determined dynamically by an earlier pipeline stage, depending on a variety of packet characteristics, including but not limited to class of service, input or output destination, port number, or packet type.

The data in PHB 480 is thus reordered into a consecutive stream of bytes ready to be sent across fabric 120 to the output linecard, thus eliminating copy operations and allowing data to be gathered from many different locations in the PHB 480 corresponding to the header portion being processed by the gather stage. This allows construction of the packet and BHDR as needed while operating at line rate.

The gather stage also assists in supporting MPLS switching. The label swap (of the first 20 bits of the MPLS label entry) is done by the gathering function as the new label is read from the leaf in the PHB. The new label is then concatenated with the rest of the original label, i.e., the last 12 bits, which may have been modified by PoP stage 450. For MPLS push and pop, the pushed labels are read from the label leaf ahead of the current label. Pop is accomplished in the same fashion: the popped labels are skipped as the packet is read out.

The gather facility operates using a reading profile (the gather profile) for each type of PHB read required. Profile memory 1015 is pre-programmed by CPU 1240 with the PHB field addresses (in the form of offsets from the top of each PHB) that should be read and their lengths for each packet type. PoP stage 450 selects which profile to use based on the actual packet type. The PoP stage passes this information to gather stage 460, which uses the identified gather profile to perform a DMA on the corresponding PHB.

Transfer Multiplexer

In one embodiment of the present invention, transfer multiplexer (mux) 470 (FIG. 11) receives packet header portions from gather stage 460 and then multiplexes the buffered header portions with the tail portions sent from receive FIFO 215. This is done only to save pins in an embodiment where the pipelined switch and the RBM functions are implemented on different ASICs, i.e., it is purely a convenience to a particular multiple-ASIC implementation of the present invention. The invention is in no way limited to this embodiment. Although a mux is described, those skilled in the art will realize that joining circuits other than a mux can be used. Accordingly, the invention is not limited to any particular type of joining circuits.

As mentioned above, in one embodiment of the present invention transfer mux 470 are omitted and header and tail portions are sent to RBM 240 without multiplexing. An additional surge protection FIFO may be present on the tail portion line in some embodiments, as noted above.

Receive Buffer Manager

The flow of headers from the header FIFO 320 through pipelined switch 220 to receive buffer manager 240 is independent of the flow of tails from the tail FIFO 330 through transfer mux 470 to receive buffer manager 240. Both the header and tail portions are separately received in packet receive stage 1220. See FIGS. 12 and 13. Completely processed headers go into RBM header FIFO 1320, while tail portions are placed in RBM tail FIFO 1330. The header and tail portions, together, are written into receive packet buffer 245 (through joining circuit 1350) by memory controller 1222 only when both the header portion and its corresponding tail portion become available in packet receive stage 1220. While either the header or the tail portions may arrive first, writing will not occur until both are present in order to optimize the memory bandwidth of receive packet buffer 245.

In one embodiment of the present invention, referring back to FIG. 12, packet header and tail portions arrive in the receive buffer manager (RBM) 240 on one bus from transfer mux 470 (part of pipelined switch 220) in a time-multiplexed manner. Receive buffer manager 240 comprises queue manager 1210, queue pointer memory 1215, packet receive stage 1220, memory controller 1222, and packet transmit stage 1226.

Packets enter RBM 240 at packet receive stage 1220. Controlled by queue manager 1210, packet receive stage 1120 sends packet data to memory controller 1222. Memory controller 1222 contains, in some embodiments, a conventional arbitration circuit to manage memory read/write demands from packet receive stage 1220, packet transmit stage 1226, and CPU 1240. Packet data is written to receive packet buffer 245 under the control of memory controller 1222.

It is important to note that packet receive stage 1220 and packet transmit stage 1226 operate independently of one another. In other words, packet storage in and retrieval from receive buffer memory 245 occurs nearly simultaneously (under the control of the arbiter within memory controller 1222).

Queue manager 1210 provides control and coordination of packet receive stage 1220 and packet transmit stage 1226.

Queue manager 1220 also interfaces with linecard CPU 1240 to handle exception packets.

Figure 13:
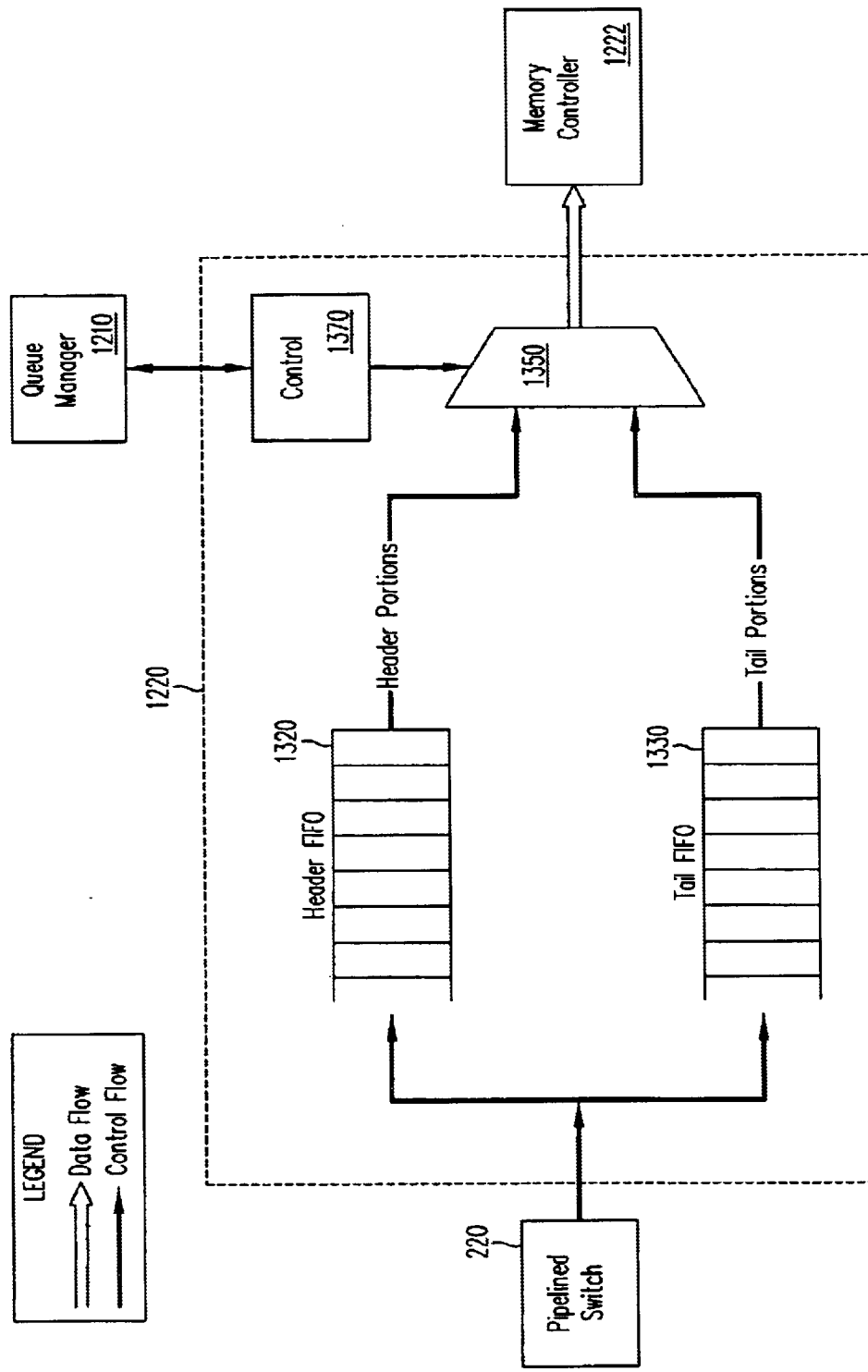
FIG. 13 is a high-level schematic of the packet receive stage 1220 according to one embodiment of the present invention.

As with receive FIFO 215, packet receive stage 1220 may consist of one or more physical FIFOs. packet receive stage 1220 consists, in one embodiment of the present invention, of a multiplexer 1350 controlled by queuing control 1370, as shown in FIG. 13. Although a mux is described, those skilled in the art will realize that joining circuits other than a mux can be used. Accordingly, the invention is not limited to any particular type of joining circuits.

There is no implied relationship between the current packet tail being transferred from tail FIFO 330 to RBM 240 and the packet header portion being transferred from pipeline switch 220 to RBM 240. Both are transferred via transfer mux 470. The first tail to be read out will always correspond to the first header to be read out, because headers are not read until a complete tail is ready; neither headers nor tails are ever dropped prior to reading out from packet receive stage 1220.

As noted above, packet receive stage 1220 consists of logically (although not necessarily physically) separate FIFOs, one for header portions (header FIFO 1320) and one for tail portions (tail FIFO 1330). Packet receive stage 1220 thus provides surge protection buffering for the RBM in case a large number of small packets arrive from pipelined switch 220 consecutively after a packet with a very large tail portion.

Queue manager (QM) 1210 is discussed in further detail by reference to FIG. 14. Packet arrival is signaled to arbitration unit 1405 by packet receive stage 1220. Packets themselves do not enter QM 1210, of course, but control and enable signals (shown generally as control signals 1490) pass the facts of arrival to QM 1210. Control information can also arrive at arbitration unit 1405 from CPU 1240 and/or packet transmit stage 1226. One of ordinary skill in the art can readily see that many control and enable signal structures are possible.

Arbitration unit 1405 in turn controls packet enqueuing via output enqueue (OP EQ) 1410 and dequeuing via output dequeue (OP DQ) 1460. OP EQ 1410 is followed by congestion avoidance module 1420 which is, in some embodiments, a circuit implementing the Random Early Detection (RED) algorithm in hardware, further discussed below. OP DQ 1460 is followed by dequeuing module 1470 which is, in some embodiments, a circuit implementing the Modified Deficit Round Robin (MDRR) algorithm in hardware, also further discussed below.

Queuing request information flows from arbitration unit 1405 to OP EQ 1410 and thence (via congestion avoidance module 1420) to link manager 1430, which is a conventional memory access controller (or arbiter) managing competing resource demands on queue pointer memory 1215. Queue pointers are fetched from queue pointer memory 1215 by OQ DQ 1460 (operating in conjunction with dequeuing module 1470) via link manager 1430. These pointers are passed to packet transmit stage 1226 and there used to fetch the actual packets from receive buffer memory 245.

The queue pointers are themselves managed by free queue dequeue (FQ DQ) 1440 (in the packet enqueuing process) and free queue enqueue (FQ EQ) 1450 (in the packet dequeuing process). Use of the free queues is further detailed below.

It is important to note that all enqueue and dequeue operations originating from different sources within queue manager 1210 (e.g., packet receive stage 1220, CPU 1240, or packet transmit stage 1226) are performed in parallel.

In one embodiment of the present invention, the RBM supports eight different queues for each output port, one per each of eight allowed class of service (CoS) levels, and a total of 16 different output ports per linecard (i.e., 128 separate output queues per destination linecard). Each RBM supports a complete set of 128 queues per possible destination linecard slot in the system. In one embodiment, the system has 16 linecard slots; thus, there are 16×128=2048 possible queues. One of ordinary skill in the art will appreciate that embodiments supporting more or less queues are equally possible. Accordingly, the present invention is not limited in the number of CoS levels and corresponding queues supported. Each of the CoS queues per port can be used for a different CoS; they need not all be used if so desired. Class of service differentiation is achieved between CoS queues using a bandwidth sharing scheme implemented within queue manager 1210 (FIG. 12), further discussed below.

In addition to the above-mentioned queues, all of which are used for unicast traffic, there are (in one embodiment) an additional eight queues used for transmission of multicast data to the switch fabric, each for a separate CoS.

In one embodiment of the present invention, these queues are managed as "virtual output queues," configured such that there is a one-to-one relationship between the RBM queue and exactly one Transmit Buffer Manager (TBM) queue. Utilization of the output queues is controlled in cooperation with output queue enqueue circuit 1410 using a congestion avoidance scheme such as Random Early Detection (RED; sometimes also referred to as "Random Early Drop" or "Random Early Discard") or Weighted RED (WRED) or one of their variants, all well-known in the art. The RED algorithm is described in S. Floyd and V. Jacobson, "Random Early Detection Gateways for Congestion Avoidance," IEEE/ACM Transactions on Networking, Vol. 1, No. 4 (August 1993) (hereinafter Floyd & Jacobson), which is incorporated herein in its entirety by reference.

The chosen congestion avoidance scheme is implemented in hardware, specifically in congestion avoidance (RED) module 1420. If RED (or another congestion avoidance algorithm) is enabled on a queue, a packet destined for that queue may be dropped if the queue contains more than a certain amount of data already.

Output queue enqueue circuit 1410 (as regulated by RED congestion avoidance circuit 1420) picks a buffer in receive packet buffer 245 associated with the free queue determined previously by PoP stage 450 and indicated within the BHDR, and writes the header (including the BHDR) and the tail portions into that buffer. OP EQ 1410 supplies the write address; pipelined switch 220 (referring back to FIG. 12) supplies the packet data to be written to packet receive stage 1220. However, OP EQ 1410's decision is controlled by congestion avoidance circuit 1420, as noted above.

In the case of the packet needing to be deliberately dropped (e.g., because of a checksum error), then the memory controller 1222 is told (by OP EQ 1410) to write the packet to an unused area of buffer memory 245. In an alternative embodiment of the present invention, memory controller 1222 does not write out the packet at all and discards the data directly.

In order to dequeue packets enqueued in receive packet buffer 245, queue manager 1210 runs a bandwidth sharing scheme to service the various output queues for a given destination slot and select packets for transmission to the switch fabric. Each of the sets of eight CoS queues throughout the card (both transmit and receive) are serviced by output dequeue circuit 1460 and a fast parallel implementation of the Modified Deficit Round Robin (MDRR) algorithm 1470. The MDRR algorithm is based on the well-known DRR algorithm but with one of each set of eight queues considered a high priority queue. The DRR algorithm is described in Shreedhar and Varghese, "Efficient Fair Queuing Using Deficit Round Robin," Proceedings of ACM SIGCOMM '95, Computer Communications Review, Vol. 25, No. 4, Oct. 1995, which is incorporated herein in its entirety by reference. MDRR is one embodiment of the "DRR+" extension to DRR alluded to in this paper.

The high priority queue is serviced in one of two modes:

Low Delay Mode: In this mode, all the high-priority queues are serviced in simple round-robin (one packet from each). Only once all the high-priority traffic for all the ports is clear will the other queues be considered. These remaining 7 low-priority queues per port are serviced in the classic DRR fashion, with simple round-robin between the ports (i.e. one packet from each port). This mode has the advantage of guaranteeing the lowest possible latency for the high-priority traffic, but at the expense of possible starvation of the lower priority traffic if there is overuse of the high-priority queues.

Fair Mode: In this mode, a quantum of data is taken from the high-priority queue, then one quantum from one of the other 7 queues (chosen via the regular DRR algorithm), then back to a quantum of the high-priority again. This guarantees that all queues get serviced, at the expense of the latency on the high-priority queue. All ports are serviced in a packet-by-packet round-robin, regardless of whether there is high-priority traffic available or not.

Note that when in the Fair Mode, as the hardware round-robins between each of the ports for a given linecard slot it may be sending low priority traffic for up to 15 other ports before coming back to a queue that has high priority for a port. In Low Delay mode, high priority traffic is very strictly sent first.

A short description of the MDRR algorithm for each set of eight queues is as follows. For each queue there is a programmable value called the 'quantum' and a variable called the 'deficit' maintained. For each set of eight queues the hardware performs the following algorithm. This algorithm makes the assumption that at least one of the 8 queues are non-empty when it is invoked. Also note that queue number (q#) 7 is considered the high priority queue, queues number 0 through 6 are the low-priority queues, and 'i' records the current low-priority queue selected by. MDRR.

```
// static variables
// q7active: 1=high priority queue currently active
// newqueue: 1=current dequeue caused this queue to either
// go empty or use all of its quantum up. Thus we
// need to choose an new queue nest time.
// cur_q#[2:0]: Current queue of 0 . . . 6 being serviced.
do forever {
    if (lowdelay_mode && q7_not_empty) {
        q7active = 1;
    } else {
        if (newqueue_flag) {
            // choose a new queue#
            if (!lowdelay_mode && !q7active && q7_not_empty) {
                //fairmode, only choose q#7 if we didn't last time
                q7active = 1;
            } else if (any queue in [0 . . . 6] is non-empty) {
                //choose next low priority queue to send from
                q7active = 0;
                cur_q# = next nonempty q# in [0 . . . 6]
                    starting at previous cur_q#
            } else {
```

-continued

```
        //assumptiom was at least one queue non-empty,
                    must be #7
                q7active = 1;
            }
        }
    }
    if (q7active) {
        q#=7;
    } else {
        q#=cur_q#
    }
    dequeue packet from queue 'q#';
    if (newqueue_flag) {
        deficit (q#) = deficit (q#) + quantum (q#);
    }
    deficit (q#) = deficit (q#) - sizeof(packet);
    if (queue (q#) == empty) {
        deficit (q#) = 0;
    }
    newqueue_flag = (queue(q#) == empty) || deficit(q#) < 0);
}
```

Note that the quantum needs to be at least as large as the largest possible packet that could be encountered for this algorithm to work properly. As an implementation optimization, the quantum is stored as a multiple of 512 bytes, since it is expected that no MTU will ever be that low. Other quantum sizes are of course possible and the present invention is accordingly not limited to any one particular quantum size.

Note that an optimization made in one embodiment is to continue transmitting packets until the deficit actually goes negative. This is simpler than testing the length of the packet about to be transmitted against the deficit and then deciding to transmit and does not sacrifice any significant performance.

Upon dequeuing, packets are sent to fabric interface 170 and on to switch fabric 120 as switch fabric 120 and its associated scheduling/control systems dictate.

Any packets on which pipelined switch 220 cannot make a fast switching decision are flagged to be either dropped by the RBM or queued onto the RAW queue (a.k.a. the 'slow path'). Packets on the RAW queue have their packet header fetched from the buffer memory (receive packet buffer 245) and passed down to CPU 1240 for processing. Upon examination and potential manipulation of the packet and its BHDR, CPU 1240 can either have the RBM drop the packet or send it on to a specified output queue.

Although the RED and WRED congestion avoidance and MDRR dequeuing algorithms are described, those skilled in the art will realize that congestion avoidance and queue management schemes other than RED or WRED and dequeuing methods other than MDRR can be used. Those skilled in the art will also realize that queue management schemes may be omitted entirely. Accordingly, the present invention is not limited to any particular type of queue management scheme or dequeuing algorithm or to embodiments incorporating a queue management scheme.

In an alternate embodiment, queues are not differentiated by CoS. Instead, all queues are the same. CoS differentiation is achieved by selecting a different set of RED parameters (especially the drop probability) for each packet according to the packet class of service. RED or WRED is then performed before enqueuing (as above), with low CoS packets experiencing a higher drop rate than high CoS packets. This embodiment may be employed in either the RBM or TBM or both.

Transmit Buffer Manager

The transmit buffer manager (TBM) 280 receives packets from switch fabric interface 170. The packets are then queued for output to the appropriate port via (in some embodiments) transmit FIFO 1430 according to information in the BHDR.

In one embodiment of the present invention, referring to FIG. 15, packets arrive in the transmit buffer manager 280 from fabric interface 170. Transmit buffer manager (TBM) 280 comprises queue manager 1510, queue pointer memory 1515, packet receive stage 1520, memory controller 1522, and packet transmit stage 1526. TBM 280 is, in most respects, identical to RBM 240 and contains the same elements.

Data, in the form of packets, goes from the fabric through the TBM and into transmit packet buffer memory 285. Once a complete packet is received, the TBM either enqueues it on the output queue specified in the BHDR or drops it, based on a determination by the congestion avoidance algorithm (discussed above with respect to RBM 240) implemented in the congestion avoidance module a part of queue manager 1510.

In one embodiment of the present invention, the TBM supports eight different queues for each output port, one per each of eight allowed class of service (CoS) levels, and a total of 16 different output ports per linecard (i.e., 128 separate output queues per linecard). One of ordinary skill in the art will appreciate that embodiments supporting more or less queues are equally possible. Accordingly, the present invention is not limited in the number of CoS levels and corresponding queues supported. Each of the CoS queues per port can be used for a different CoS; they need not all be used if so desired. Class of service differentiation is achieved using a bandwidth sharing scheme, such as MDRR, as described above with respect to RBM 240.

The transmit buffer manager maintains these queues in memory, using transmit packet buffer 285 to temporarily store the packets analogously to RBM 240. Utilization of the output queues is controlled by queue manager 1510 using a congestion avoidance scheme such as Random Early Detection (RED) or Weighted RED (WRED) or one of their variants, all well-known in the art.

The chosen congestion avoidance scheme is implemented in hardware within queue manager 1510, as in RBM 240. The congestion avoidance scheme is, in one embodiment, the same as that implemented in receive buffer manager 240.

In an alternate embodiment, each TBM queue has a QueueStatus signal which is sent back to all other linecards indicating whether the depth of the queue is over a configurable threshold. With this mechanism in place, the depth of each queue can be controlled/limited, so it is not necessary to run a congestion avoidance algorithm on the output queues in TBM 280. In addition, this alternate scheme provides for improved bandwidth allocation fairness over switch fabric 120.

Each packet sent to the TBM for transmission has a field in its Buffer Header BHDR (designated 'OutputInfo') which can indicate a MAC rewrite. TBM 280 prepends the appropriate string of bytes to the packet corresponding to the specified MAC rewrite, if any, when reading from the buffer. Alternately, the MAC rewrite is performed when writing the packet into the transmit buffer. However, memory bandwidth is conserved by performing the rewrite in conjunction with the read. Furthermore, packet multicast is simplified if the same buffer can be reused for multiple replications.

The TBM runs a bandwidth sharing scheme to service the various output queues for a given destination port and select packets for transmission to that port. Each of the queues are serviced, in one embodiment of the present invention, by hardware which implements a Modified Deficit Round Robin (MDRR) algorithm, as discussed above.

In one embodiment of the present invention, TBM 280 is nearly physically identical to RBM 240, differing in the number of queues and corresponding size of queue pointer memory 1515.

Representative Embodiment
PLU Operation: M-Trie Database

For each lookup, PLU 430 uses an N-way branch tree. This section provide an explanation of the M-Trie structure using, by example, a 256 way branch tree. One of ordinary skill in the art will of course appreciate that other configurations having more or less than 256 branches are possible. Accordingly the present invention is not limited in the number of branches.

Each octet in the IPv4 address represent a different layer in the tree. See FIG. 16. The first octet belongs to the first layer 1610 which has 256 entries, one for each value of the 8 bits. Each entry contain a pointer that either points to the starting address of the second layer 1620 (i.e., L=0, the entry represents a node) or points to a leaf address (L=1). The second layer for each of the first layer entries has also 256 entries and each entry can also either point to a leaf or is a node and thus points to the third layer. Again, each third layer node has 256 entries. Pointers in the third layer can either point to a leaf or point to a node. All entries in the fourth layer point to a leaf.

When a pointer points to a node (i.e., to the next layer), it always points to the address of the first entry of the next layer. The eight bit value in the IP address for this layer (i.e., the second, third, or fourth octet) provides the offset from the beginning of the node. If the pointer points to a leaf, it contain the address in the TLU memory of the leaf.

Figure 16:
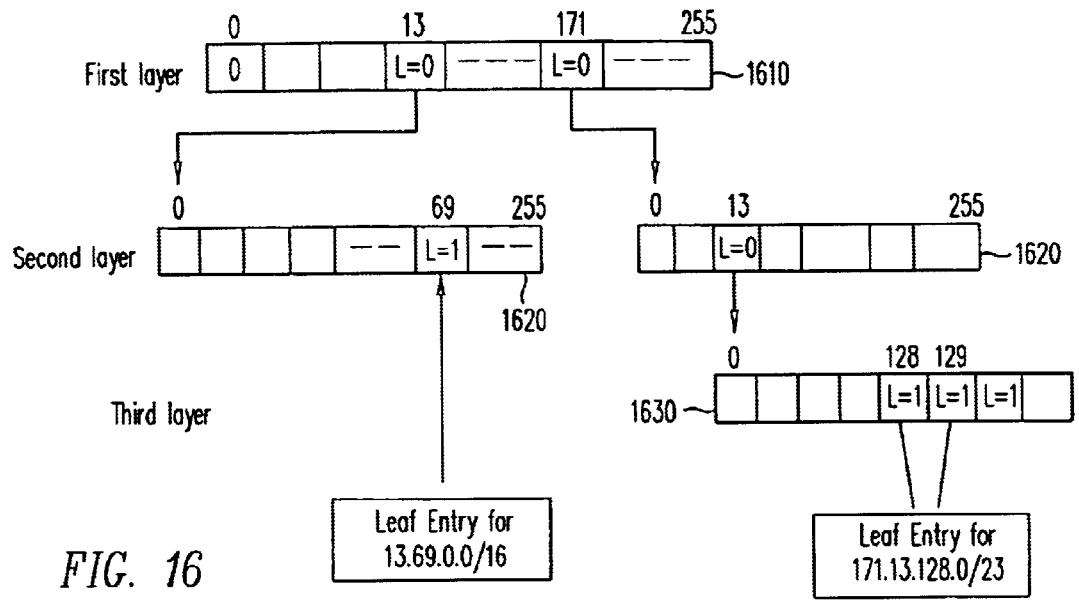
FIG. 16 is an example of a FIB 256-way tree logical structure.

FIG. 16 shows one example of 256 way tree. Each entry in a layer with L=0 points to the address of the beginning of the 256 entry block for the next layer. The layer number determines which octet in the IPv4 address is used as the offset to the beginning of the block. The leaves (entries) having L=1 point to the address of the searched-for destination leaf in TLU memory.

Examples of IP unicast PLU Search

Figure 17:
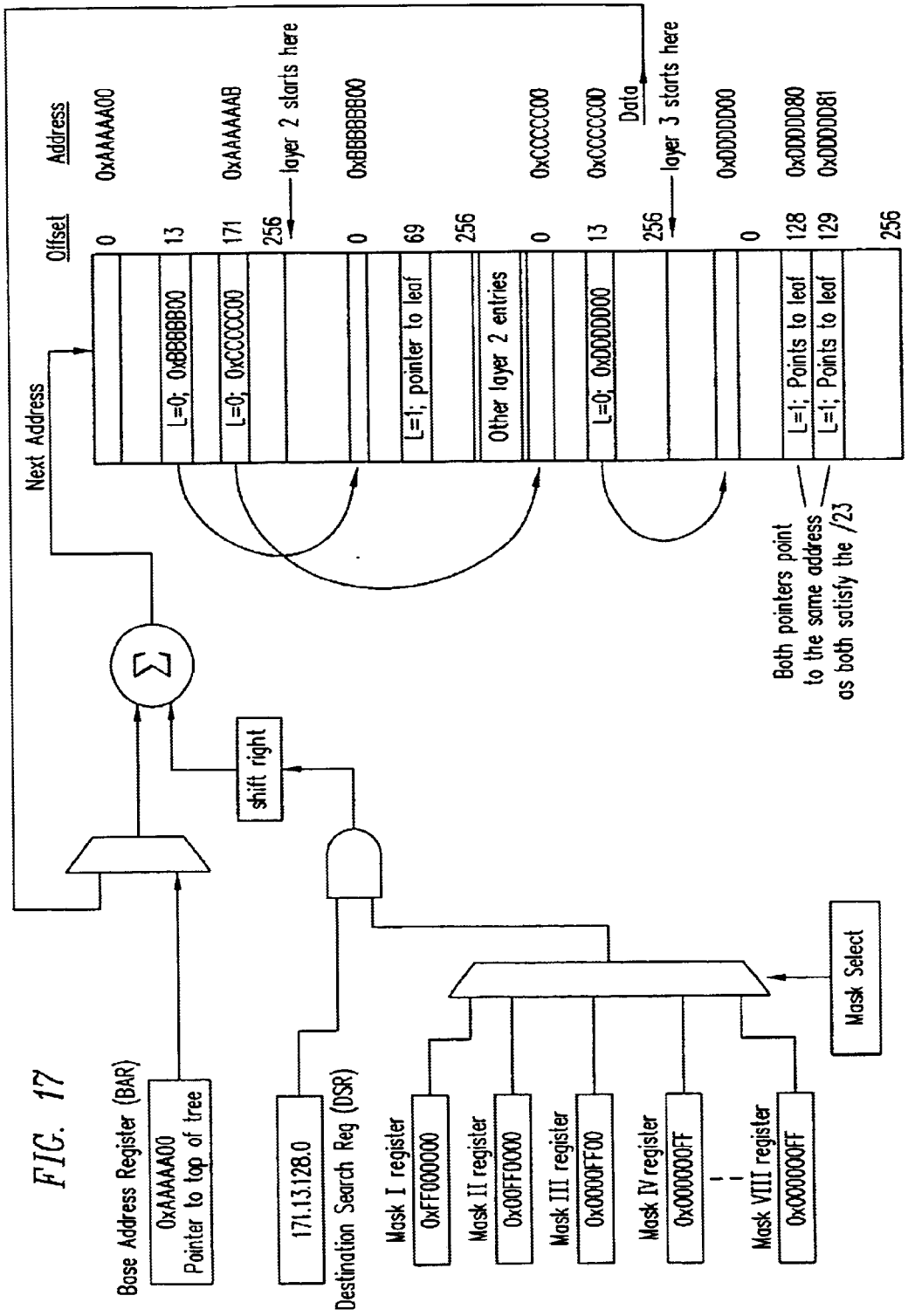
FIG. 17 is a schematic example of a PLU M-trie lookup.

FIG. 17 shows an example of a PLU memory organization and an M-Trie lookup for two addresses, 171.13.128.0/23 and 13.69.0.0./16. The following explanation refer to a search for 171.13.128.0/23.

Step 1: The PreP loads the IP destination address into the DSR; it also loads the BAR and first mask register to use. The PreP then signals to the pipe control that it has finished its operation.

Step 2: After the pipe is restarted, the PLU, using the DSR, BAR and mask loaded by the PreP, calculates the first memory address as follows:
Base address+(shift right(DSR & Mask I))= 0xAAAAA00+(Shift right(171.13.128.0 & 0xFF000000))=0xAAAAAAAB Step 3: The PLU fetches the data at address 0xAAAAAAAB Step 4: Since L=0, the fetched value is a node. The address 0xCCCCC00 points to the second layer. The PLU performs:
Fetched value+(shift right (DSR & Mask II))= 0xCCCCC00+(Shift Right (171.13.128.0 & 0x00FF0000))=0xCCCCC0D Step 5: The PLU fetches the data at address 0xCCCCC0D Step 6: Since L=0, the fetched value from 0xCCCCC0D is a node. The PLU performs:
Fetched value+(shift right (DSR & Mask II))= 0xDDDDD00+(Shift Right (171.13.128.0 & 0x0000FF00))=0xDDDDD80

Step 7: The PLU fetches the data at address 0xDDDDD80.

Step 8: L=1 in the fetched value which means that this is a leaf pointer. The fetched pointer is handed to the TLU address register and the search ends.

Note that both 171.13.128.0 and 171.13.129.0 are a match since the prefix is /23 and both have the first 23 bits matching. Thus, both point to the same leaf in the TLU memory.

Note also that the PLU starts from the mask register whose number was loaded by the PreP and then increments the mask register number until the search completes. The mask register has a "last bit" indication that defines the maximum depth of the tree. If the PLU reaches the mask register defined as "last" without finding an entry whose L=1, the tree is said to be un-terminated. This is a PLU programming error.

Example 2: TAG (MPLS) Search

Though generally known as MPLS, in Cisco's present implementation the process of multi-protocol label switching is referred to as "TAG switching." In particular, the MPLS label is referred to as the "TAG."

Figure 18:
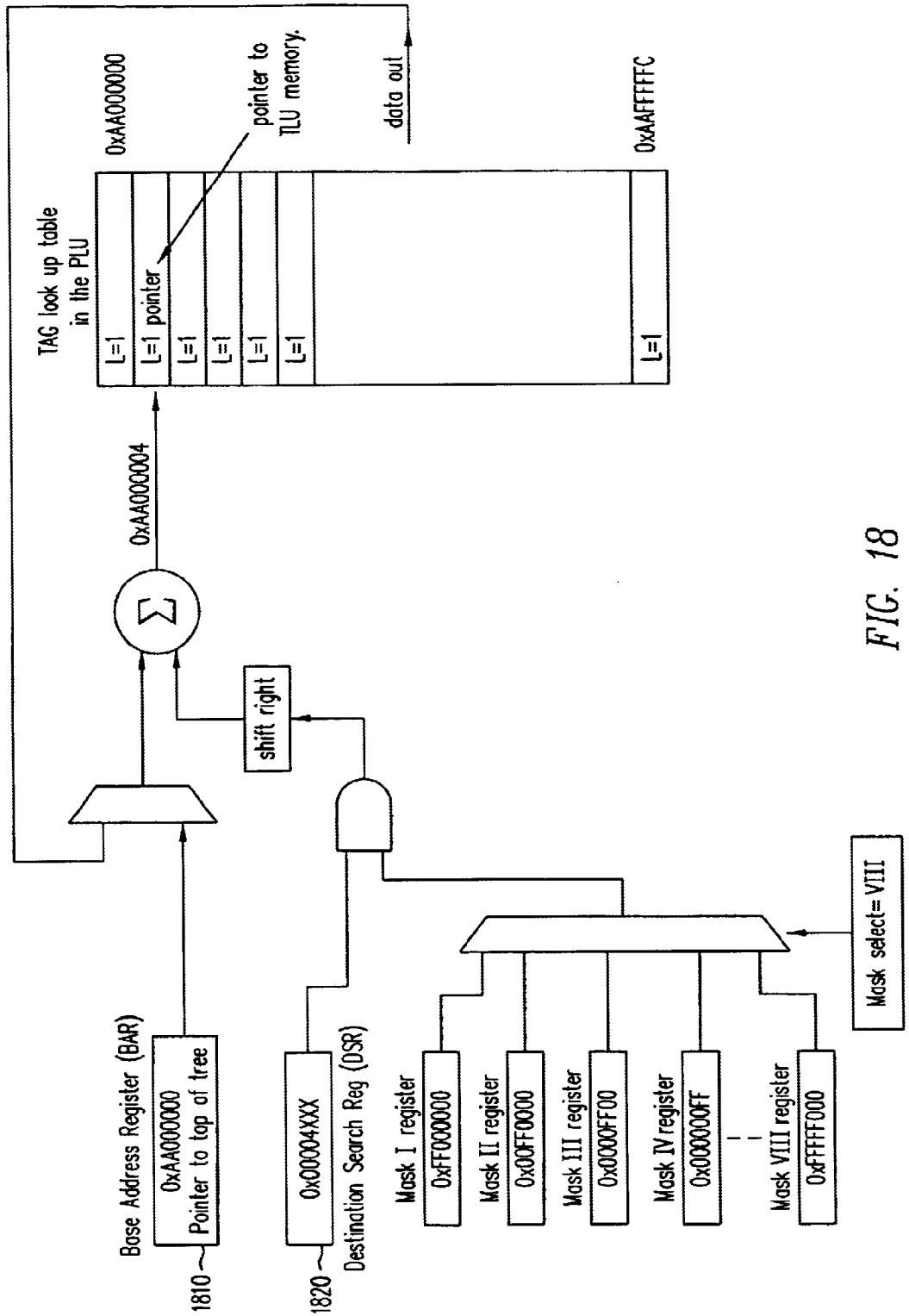
FIG. 18 is an example of a PLU TAG lookup.

TAG lookup can be done as a single iteration look up, which requires a TAG table of 1 M entries. Alternatively, the TAG lookup can be broken into two stages via appropriate DSR mask register settings. The following text describes the one-lookup approach. See FIG. 18.

The PreP loads BAR 1810 with the appropriate TAG table base address (there could be several). PreP also loads DSR 1820 with the appropriate value to search on, including the 20 bit TAG/label and other fields. PreP then selects a mask register appropriate for selecting the 20 bit TAG/label field, here the Mask VIII. The PLU performs the same operation as in the IP look up: it adds the label value to the base register and reads the TAG table entry:

BAR+shift right (DSR & Mask VIII)

Since L=1 in all TAG table entries, this is the last search which points to the TAG leaf in the TLU memory. Thus the TAG and IP lookup operations are the same from the PLU point of view, except that the TAG is one iteration while the IP lookup requires more iterations.

Note that since the TAG label is presently only 20 bits, it is possible to create an alternate, two-layer structure. For example, if we want to make sure that we do not get a certain TAG from a certain channel, a tree can be built in which each relevant TAG points to a second layer. The second layer is indexed by the channel number, which either points to a default route or to an actual TAG leaf. We can then use two mask registers, one with 20 bits for the label which points to the beginning address of a four-entry table. The second mask register is 2 bits, for the channel number, which is the offset to the right location. One application of this would be for TAG-based VPN security. If the TAG label length definition changes in a new version of the MPLS standard, further alternate structures are also possible. Accordingly, the scope of the present invention is not limited by the current version of the MPLS standard.

All entries in the IP lookup M-Trie as well as in the TAG lookup table are assumed to be valid. If a TAG or IP prefix is not valid, they should point to a default route or default entry in the TLU. The PLU always loads the leaf pointer to the TLU which uses it as an address for its memory. Default or NULL entries should be defined by the TLU.

TLU Operation Example: IP Unicast Forwarding Without Load Balancing

Figure 19:
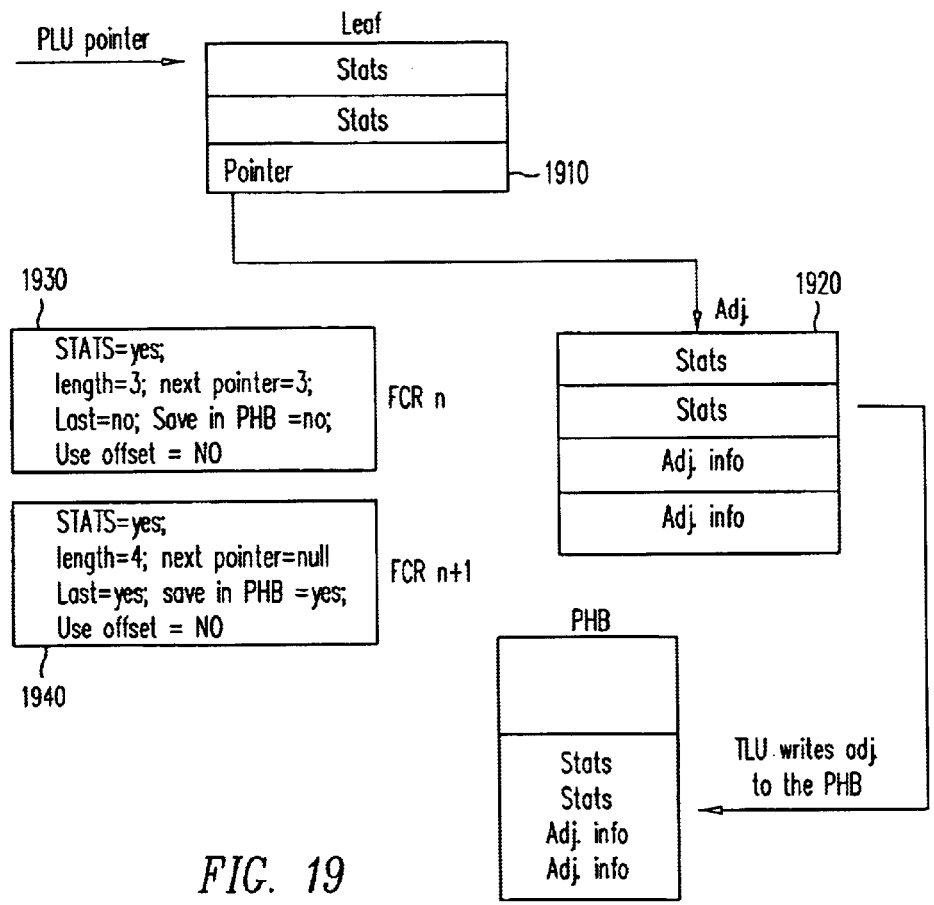
FIG. 19 is an example of a TLU IP Unicast lookup without load balancing.

This section describes the TLU operation. Note that it is described here as an example only to clarify the TLU operation. Different data structures and link lists can be defined as needed. In this example (see FIG. 19), we assume that the IP unicast requires two fetches: an IP leaf 1910 which points to an IP adjacency table 1920. The adjacency table (also referred to as "adj") is 32 bytes and the leaf is 24 bytes in this example. The pointer to the leaf (the "fetch entry"), along with the first FCR number, are loaded to the TLU by the PLU. The first FCR 1930 in this case is set as follows:

Stats=yes
Length=3
Next pointer=third octet first word
Last=no
Save in PHB=no
Use offset=no Thus the TLU fetches 24 bytes (length=3) and uses the pointer in the third double word to fetch the adjacency table, discussed below. No information is written into the PHB since the save field in the FCR is not set. After the first fetch, the TLU increments the FCR number and performs the next fetch.

At the next fetch, of the adjacency table, the FCR 1940 looks as follows:

Stats=yes
Length=4
Next pointer=Null
Last=Yes
Save in PHB=4
Use offset=No

The TLU fetches four longwords (a total of 32 Bytes) and saves them in the PHB. This is also the last fetch and the TLU completes its operation.

TLU Operation Example: IP Unicast Forwarding with Load Balancing

Figure 20:
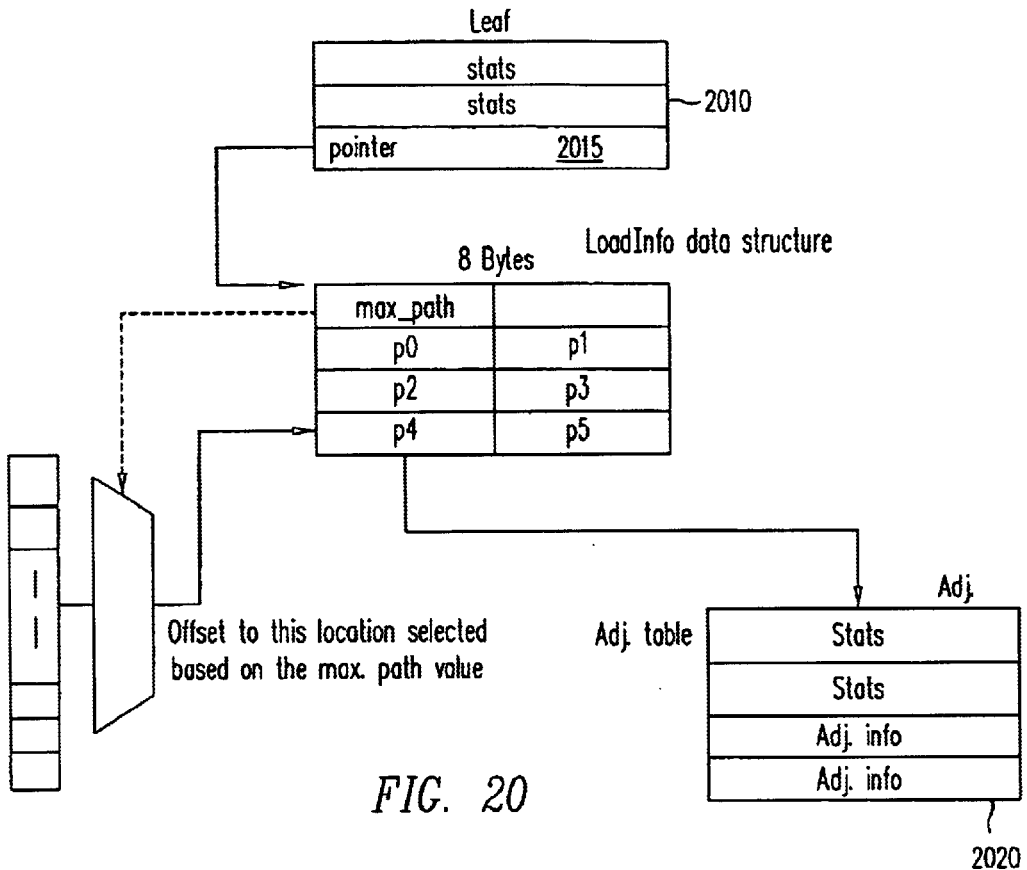
FIG. 20 is an example of a TLU IP Unicast lookup with load balancing.

When load balancing is turned on, there are three data structures that are involved in the operation: the leaf, a load balancing data structure, and the adjacency table (adj). The relationship between those data structures is shown in FIG. 20. Note that none of the data structures is hard wired and each can be changed. Another level of indirection can be added as the entire operation is programmable through the FCR and the actual data structures in TLU memory.

The PreP and PLU (see "Hashing the Offset" below) perform hash function calculation based on the source and destination IP addresses. The result is up to 16 offset values. Each offset corresponds to a different max_path value in which max_path is the maximum number of paths that are to be load balanced. The first field in the loadinfo data structure is used as a selector and selects the offset to use. This field is the max_path for this particular loadinfo. The loadInfo structure can contain up to 16 pointers, but in this example less pointers are given. Thus, here max-path can range from 0 to 5.

The TLU operation is as follows: the PLU loads a pointer to the leaf as well as the FCR number to use. In this example the FCR is programmed as follows:

Stats=yes
Length=3
Next pointer location=third octet upper word
Last=no
Save in PHB=no
Use offset=no The TLU fetches the leaf 2010 which is 3 byte octets. It uses the pointer 2015 in the third octet for its next fetch and increment the FCR. The next FCR is:

Stats=yes
Length=4
Next pointer location=first octet lower word
Last=no
Save in PHB=no
Use offset=yes Since the use offset select field is set, the TLU uses the max_path field to select the offset and then adds the offset value to the next pointer to calculate the next pointer location. Thus the offset is used to select a different pointer in the same data structure. Note that the next pointer location in this example is the first pointer and the offset is added to it. This mechanism allow changing the max_path value at a single location (the loadInfo structure) when the number of paths to load balance across has changed. The TLU uses the pointer at the calculated place to fetch the adj 2020 and save it in the PHB. Thus the third FCR looks like:

Stats=yes
Length=4
Next pointer=Null
Last=yes
Save in PHB=4
Use offset=no

Hashing the Offset

Hashing the IP source and destination into an offset is done by the PreP and the PLU. The operation is divided into two parts. The PreP calculates a 16 bit value which is then hashed by the PLU into an offset.

In some embodiments of the present invention, the PreP uses hardware (HW) assist to calculate a 16 bit value. The HW assist allows loading the IP source and destination into special purpose HW and performs up to five shift and XOR operations on each one. Both the IP source and destination are XORed to produce the final 16 bit result. The shift amount and number of iterations (up to 5) are preprogrammed by the linecard CPU 1240. The result is written into a register which is given to the PLU. This permits changing the hash as a function of the traffic type while avoiding doing it in the PreP as it will require large number of cycles from the PreP.

Hashing the 16 bit value into an offset is done with a PLU lookup. Since the actual hashing function involves max_path, the PLU looks up an entry in its memory based on the 16 bit value from the PreP and reads 16 offsets, one for each potential max_path value. The TLU then selects the one to use based on the actual max_path value. Note that this mechanism allows changing the max_path value in a single location (loadInfo) when necessary.

IP Unicast with Load Balancing, Skipping the TLU Leaf

Figure 21:
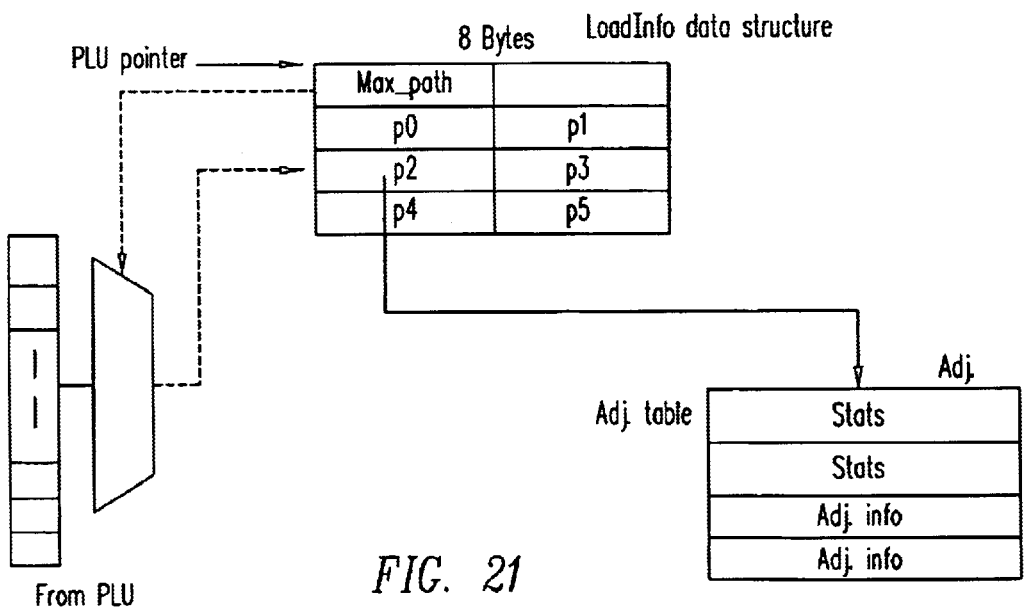
FIG. 21 is an example of a TLU IP Unicast lookup with load balancing but without tracking leaf statistics.

In case the leaf statistics (stats) are not required and we only need the adjacency table statistics, the PLU can point directly to the load balancing structure as shown in FIG. 21. This saves a TLU memory access.

Note that the location of the max_path which selects the offset is 'hard wired' to the location shown when the FCR select offset control is set. However, if stats count is also enabled, then the first two double words are stats and the max_path location is in the same location in the double word which immediately follows the first two double words. This allows having stats for the loadInfo if needed.

PLU/TLU FIB and Tables Update

Pipelined switch 220's external memories (i.e., PLU memory 760, TLU memory 820, and packet header buffers 480), which contain the M-Trie data structures, TAG and adjacency tables, stats, etc.) are written and maintained by the linecard CPU 1240. Linecard CPU 1240 access those memories via a CPU interface to pipelined switch 220.

Gather Stage: PHB and Read Profiles

Figure 22:
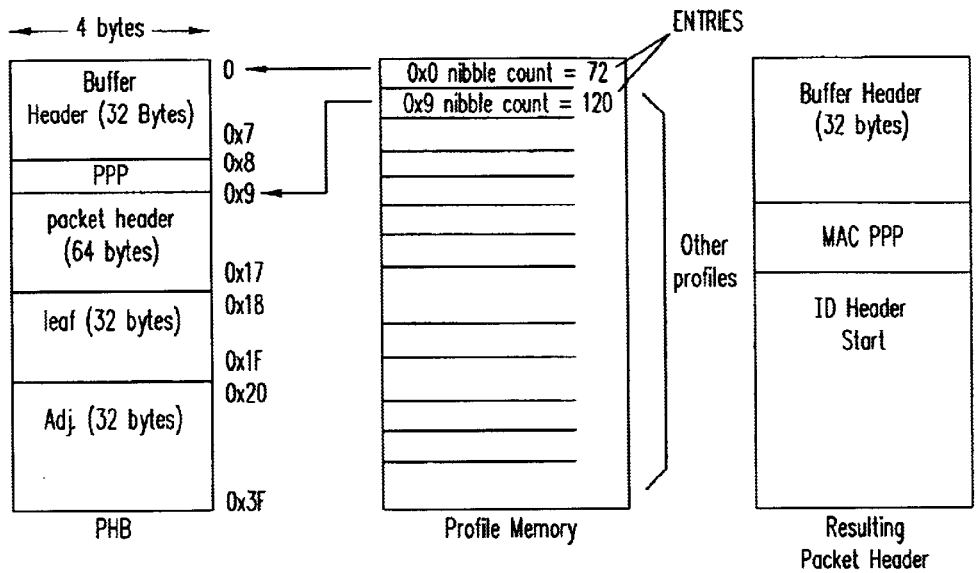
FIG. 22 is an example of how data is read from the PHB by the gather stage.

IP Only, no TAG Support:

The Fetch Stage offset is set to 32 bytes such that data is written into the PHB as shown by example in FIG. 22. In this example it is assumed that the MAC header is sent along with the packet, as may be the case where both the receive and transmit ports use PPP/HDLC.

Two profile entries are used. The first reads the buffer header and the MAC. The second reads the IP header and the remainder of the packet header. In total, the first 96 bytes are thus read, including the BHDR and the packet header. Since the IP header requires checksum calculation, a different entry in the profile is used to point to the beginning of the IP header. This entry has a bit which indicates start of the IP header, which triggers the IP checksum calculation by the gather stage (GS) 460. As data is read from the PHB, the beginning IP bit in the profile is examined. If set, it triggers a checksum calculation over the next 20 bytes. The GS 460 calculates the checksum and replaces the existing one with the new checksum. Note that calculating the checksum in the GS allows changes in the IP header, if needed, by either the PreP or PoP: we calculate the checksum only when the packet leaves the pipelined switch 220. For TAG switching, the start IP header bit is not set and thus no checksum is calculated.

TAG Insertion

Figure 23:
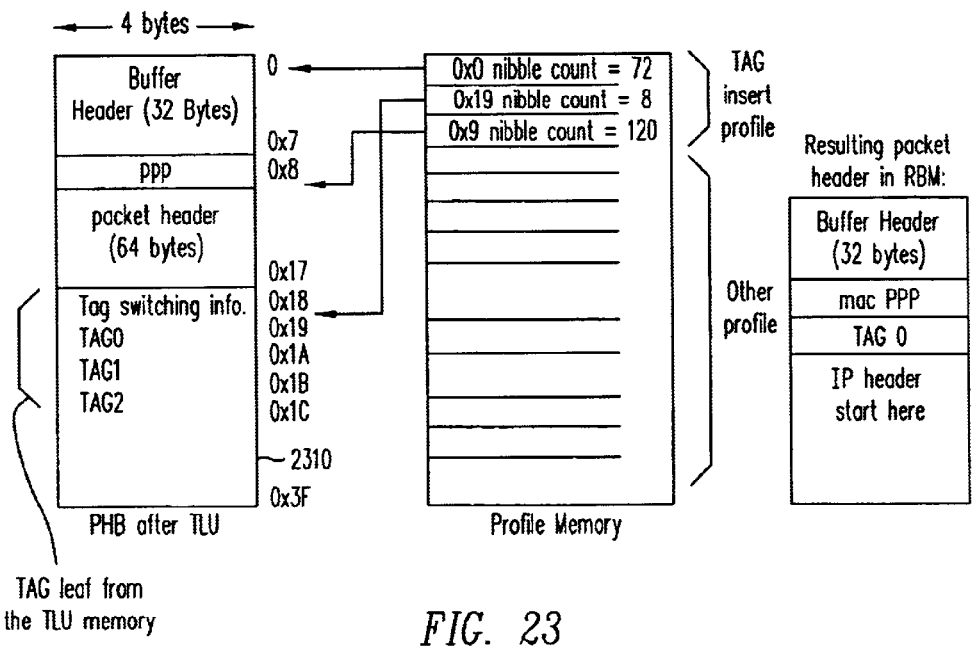
FIG. 23 illustrates the process whereby TAG information is inserted by the gather stage.

The buffer header and MAC are read, followed by the new TAG, and then the IP packet. See FIG. 23. Note that in a TAG swap operation, a 20 bit label is read from the TAG leaf 2310 and concatenated with the remainder of the incoming TAG. Thus a nibble operation is required to allow a fast label swap.

Receive Buffer Manager (RBM) 240 Operation

The RBM manages the OC48 linecard's receive memory buffers and queues.

Interfaces

Receive Buffer Memory—Receive buffer memory 245 is composed (in some embodiments) of two SDRAM DIMM modules. These can be populated in various configurations so as to provide anywhere from 32 MBytes to 256 MBytes. Both modules must be populated at all times, and with the same type/size of module.

Queue Pointer Memory 1215—This is where information is stored regarding the state of the various queue elements allocated in the receive buffer memory. In some embodiments, there are two MBytes of SSRAM comprising queue pointer memory 1215. Note that in addition to this external memory, there is additional queue memory within the RBM ASIC itself.

Pipelined Switch Interface—Pipelined switch 220 (also referred to as the "PSA" for the name of the ASIC implementing it in one embodiment of the present invention) forwards both the completed packet headers, and the tail portion of each packet to RBM 240 over this bus.

When RBM 240 is ready to accept another packet header, it supplies a READY_HEAD signal to the PSA. When RBM 240 is ready to accept tail data into packet receive stage 1220, it sends a READY_TAIL signal. See FIG. 11.

The PSA will choose to send completed packet headers as its first priority, then outstanding tail data afterward.

Once the RBM has accepted the header for a given packet, it combines it with the corresponding tail data and writes it to receive packet buffer (in one embodiment implemented in SDRAM) 245 and queues the packet on the appropriate queue.

Note that, in some embodiments, packet headers move over the entire 64 bits of the bus, while packet tails move over the most significant 32 bits only. This is because the maximum rate that tail data can move from receive FIFO 215 (known, in one embodiment of the present invention as the SOP or SOP ASIC) through PSA 220 to RBM 240 is limited to the 32 bit interface between the receive FIFO 215 and the PSA. It also simplifies the internal structures of the two ASICs involved.

Switch Fabric Interface—RBM 240 takes packets from the output queues and sends them to the other linecards in the system via switch fabric 120.

CPU Interface—This interface is used for two separate purposes. The first is for passing packets to linecard CPU 1240 which pipelined switch 220 decided needed further processing (i.e., packets on the 'RAW' queue or 'slow path' packets.). This involves sending the first 96 bytes of each packet (including buffer header) to CPU 1240 and subsequently writing the updated header back to the buffer.

The second use for the this interface is to allow linecard CPU 1240 configuration and diagnostic access to RBM 240 internal configuration registers and memories, as well as access to the external memories (receive packet buffer SDRAM 245 and queue pointer memory SSRAM 1215).

Note that both the RBM and PSA share this bus, and thus each chip responds only to the address range assigned to it. There are separate Acknowledge signals from the RBM and PSA back to the linecard CPU interface to achieve this.

Buffer Memory

There are two physical memory arrays on the linecard which are each referred to as Buffer Memory. One is in the receive data path (receiver buffer memory 245), the other in the transmit data path (transmit buffer memory 285).

The function of receive buffer memory 245 is to store packets as they are received from the PSA and are waiting for transmission over the switch fabric. Each packet is written to the memory once and stays in its original location until it is finally read out for transmission to the fabric, freeing the location for a subsequent packet.

At configuration time, the software will 'carve' receive buffer memory 245 into fixed-length areas called 'buffers'. A buffer is the area where packets are written to. One and only one packet is ever associated with a buffer at any one time. Each buffer is associated with a data structure called a 'Buffer Header'. This data structure will be discussed in more detail in a following section.

Each Buffer Header resides in memory immediately preceding the buffer it describes. Thus when referring to the address of a buffer, we will always refer to the address of the buffer header and use the fact that the buffer header has a known, fixed format throughout the system.

Not all buffers need be the same length. The processor is free to carve the buffer memory into a certain number of short buffers (e.g., 128 bytes), medium buffers (e.g., 600 bytes) and long buffers (e.g., 1500 bytes). This is in order to get better utilization of the (expensive) buffer memory since the hardware will initially choose the buffer size which gives the best fit for each received packet. Note that the number of different buffer sizes and their actual sizes are completely under software control and the above example is for illustrative purposes only. Accordingly, the invention is not limited to any particular size or number of buffers in receive buffer memory 245. In some embodiments, there are eight different buffer lengths.

Buffers can start on any 16-byte boundary in receive buffer memory 245. Each buffer is limited in hardware to a maximum length of 64K bytes.

Unused buffers of each size are kept together on a free queue for buffers of just that size. After each buffer is read out into the transmit path, the buffer is returned to the original free queue it came from for reuse by another packet. Free queue dequeuing and re-queuing after use are controlled by free queue dequeue (FQ DQ) 1440 and free queue enqueue (FQ EQ) 1450 (shown in FIG. 14) in RBM queue manager 1210. In the transmit path, analogous free queue dequeue and free queue enqueue circuits are found within TBM queue manager 1510.

Queues

In order to organize the buffers into queues, the RBM (and TBM) hardware each include a queue manager (QM). Each QM supports 256K buffers, as noted above, which are represented by queue elements, an integer ranging from 0 to 256K. The queue element is the unit of data manipulated by the QM.

Each queue element is associated 1:1 with each packet buffer. This association is made at configuration time and is not changed except when the board is reset or reconfigured. This limits the number of packet buffers that can be carved from the packet buffer memory to 256K buffers.

Every queue element can be on one and only one queue at a time. Unused buffers (represented by queue elements) are kept on free queues (FQs), while buffers in use are kept on output queues (QQs).

Each queue is logically a FIFO of queue elements. Elements can be added to the tail of the queue (enqueued), and removed from the head of the queue (dequeued).

A dequeue operation requires the queue number as an input parameter, and returns the queue element number and buffer address. An enqueue operation requires both the queue number and queue element number as input parameters, and returns nothing.

There are a total of 2088 queues supported in the RBM, broken up as follows:
- 32 simple queues (free queues, RAW queue, etc.)
- 2048 Unicast output queues (16 slots×16 ports×8 COS)
- 8 Multicast output queues (8 COS)

Note that the output queues have special properties that the simple queues do not have. This is discussed further in the following sections.

Buffer Header Structure

The Buffer Header (BHDR) structure occupies up to the first 32 bytes of each and every buffer.

The format of the BHDR is fixed. There are certain fields which are directly interpreted by the RBM hardware and are immovable. In addition, there are other fields which can be optionally appended to the BHDR which can pass various other information for this packet.

Queue Manager

Figure 14:
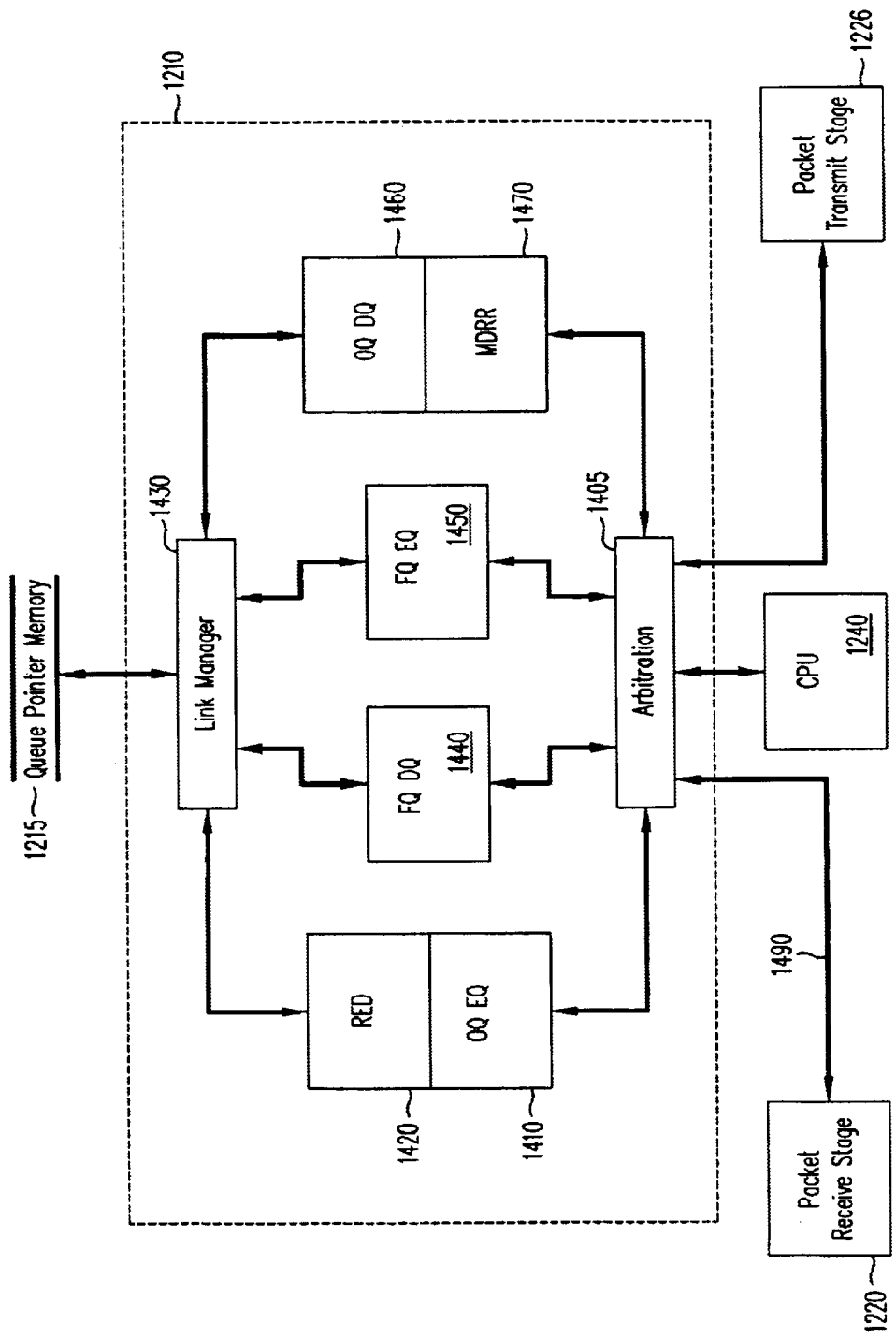
FIG. 14 is a high-level schematic of RBM queue manager 1210 according to one embodiment of the present invention.

FIG. 14 shows an overview of the RBM queue manager 1210. Link manager 1430 is the core of the queue manager. It processes the primitive queuing operations of enqueue and dequeue. It manages the Head and Tail pointers, as well as the per queue-element storage kept in the external queue pointer memory 1215, in some embodiments a SSRAM. It doesn't know anything about RED or MDRR, it just does what it is told to do by the surrounding modules in QM 1210.

The internal data structures maintained by link manager 1430 are as follows:

HEAD (2088×18): One entry for each queue. Each entry indicates the queue element number of the head of this queue (i.e. the element returned on the next dequeue)

TAIL (2088×18): One entry for each queue. Each entry indicates the queue element number of the tail of this queue (i.e. the most recent element enqueued)

LENGTH (2088×18): One entry for each queue. Each entry indicates the current instantaneous length (in packets) for this queue. This field is used by RED module 1420 for determining the average queue depth.

The data structures maintained by link manager 1430 in the external SSRAM (queue pointer memory 1215) are as follows:

LINK (256K×18): One entry for each queue element. Written when enqueuing only. Read when dequeuing only. Each entry indicates the queue element number for the entry which follows this one in whatever queue it is on. The value is undefined if it is the last element of the list.

BADDR (256K×24): One entry for each queue element. Written at initialization time only. Read when dequeuing only. Each entry indicates the physical memory address of the buffer associated with this queue element.

PKT_LENGTH (256K×16): One entry for each queue element. Written when enqueuing only. Read when dequeuing only. Each entry indicates the length of the packet being stored in the buffer.

SPARES (256K×8): One entry per queue element. The use for these bits is undefined at the moment.

Note that linecard CPU 1240 has full access to both RBM internal and external memories for diagnostic purposes.

There are two types of queues: LowQs and OutputQueues. In the LowQ space, there are 16 free queues (FreeQs), a RAW queue (RAWQ), an IPCQ, and spare queues. In the OutputQ space, there are 2048 unicast queues and 8 multicast queues. All OutputQ numbers include a 3-bit field at the end which indicates the RED parameters to use. One of these sets of parameters is assumed to be configured as a "bypass-RED" option.

All RAM arrays in the receive buffer memory 245 which have per-queue information are addressed from 0 to 2055, where the 12-bit address is taken from the queue number according to one embodiment of the present invention.

QueueStatus Processing

In some alternate embodiments, each linecard has the ability to send 'QueueStatus' signals to every other linecard in order to indicate that a certain TBM transmit queue is above/below a threshold and that further traffic should or should not be sent to that queue until further notice. This information is passed serially between each linecard and is terminated in the RBM queue manager 1210.

Each message from the other linecards indicates a queue number and its new state (OK/not OK to send to). This state table is kept by the QueueStatus Processing module within OQ DQ 1460 and is taken into account for dequeues from output queues.

Free Queues

Whenever a dequeue request is issued for a free queue (FreeQ), free queue dequeue module 1440 (or its twin in TBM 280) might discover that the specified free queue is empty. In this case, FQ DQ uses the fact that it knows that free queues are numbered in strictly ascending order of size, and search the higher numbered queues until it finds the first larger non-empty queue. If it ends up finding nothing at all, it returns all zeros for all parameters. Queue manager 1210

(or 1510 in the TBM) returns the number of the FreeQ it eventually uses. In addition, the queue manager returns the size of the buffer (i.e., the size of the largest packet that will fit entirely in it) to the requester, rather than the size of the packet within the buffer as it normally returns.

RAW Queue (Queue #31)

The RAW queue is hard-wired throughout the system as queue #31. This queue has a special property in that it has a programmable hard upper depth threshold. This depth is measured in packets. The reason behind this is to avoid a malicious user from sending a large number of 'slow path' packets (e.g., ping, IP fragmentation, IP options, or packets of types the pipelined switch is not programmed to deal with itself) to the linecard. A flood of this type of packets would cause linecard CPU 1240's RAW queue to build up and occupy all of the buffering memory in time, thus starving the normal (well-behaved) traffic of buffers.

RED Congestion Avoidance Algorithm

RED (a.k.a. Random Early Detection/Drop/Discard) is an algorithm for congestion avoidance in a router. In other words, it has the objective of constraining the average number of packets in the queues it is applied to, and thus the average latency introduced by the queue to the system.

All enqueue operations to output queues are passed through the RED module 1420 (FIG. 14) first, before being processed by the Link Manager 1430. In addition to the normal Enqueue parameters required by the Link Manager (queue number, queue element number, packet length), one additional parameter is also provided, the drop queue number.

If the queue number is for a RED-processed queue, then RED module 1420 will determine the appropriate action to take for this packet. This boils down to either proceed with the enqueue as originally requested or drop the packet. Dropping a packet simply means the request is passed on to link manager 1430 but with the queue number replaced with the drop-queue number. The drop-queue number should be the original free queue the buffer came from.

There are two motivations for applying the RED algorithm: the first is for exactly the reason Floyd & Jacobson describe, which is to avoid queues becoming fjull and dropping packet tails ("tail-dropping"). The second is that linecards will have so much potential buffering available for packet bursts (up to several hundred milliseconds) that unless something like RED is used to keep the average queue depth well down from the potential maximum, the latency introduced by the router will be completely unacceptable.

RED works on the assumption that the traffic flowing through the router is predominately TCP originated. TCP operates with a 'transmit window,' which essentially controls the amount of data that a given host can transmit to the network before it must receive an acknowledgment for previous packets. Ideally, this window size will be exactly the amount of data that the host could send over its network interface in the time it takes the first packet to get to the far end and the acknowledgment for that packet to come back (i.e., the round-trip-time, RTT). That would allow the host to transmit continuously at peak speed.

The well-known Transmission Control Protocol (TCP) has an algorithm which allow s it to open and close the transmit window size depending on network conditions. Simply put, when things are going well and packets are not being lost in the network, the window size is increased and thus the net amount of traffic that the host is sending to the network goes up. When things are not going so well and the host discovers that packets are being lost in transit to the other end, TCP reduces the window size and the net amount of traffic sent to the network goes down.

Figure 24:
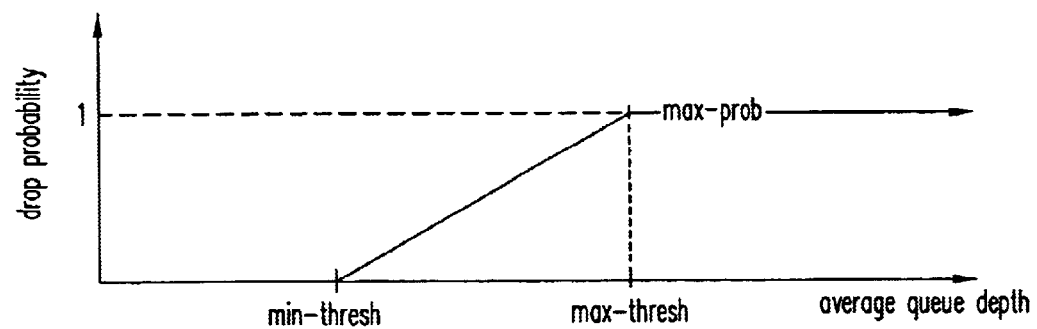
FIG. 24 is the RED drop probability curve according to one embodiment of the present invention.

The principle behind RED is that it deliberately drops packets before congestion occurs in order to prevent it happening in the first place. For each packet that would potentially be put onto a queue, there is a probability computed for just dropping it instead. The RED algorithm states that this drop probability should increase as the average queue size increases (not the instantaneous depth). FIG. 24 shows the basic structure of the probability function used by the RED algorithm.

Each dropped packet would (ultimately) cause the sending host to reduce its transmit window slowing transmission to the network and thus reducing the likelihood this queue will grow unbounded and congest. Since we assume there will be many simultaneous TCP flows through any given queue in the router, a packet dropped from one flow won't make very much difference. This is achieved by the randomness inherent in the drop probability calculation. We would have to drop packets from many different flows to see any significant effect.

The values of the RED-controlling parameters (discussed in Floyd & Jacobson) are left as user-configurable knobs, to allow adaptation of the algorithm to actual traffic patterns.

Weighted RED (WRED)—Weighted RED is an extension of RED where multiples classes of traffic are combined into one queue and where each class of traffic uses a different set of RED control parameters.

The usual way to configure WRED would be to set the drop threshold for the 'higher' classes of service above those used for the 'lower' classes of service. This means that as the average depth of the queue increases, the drop probability increases for the lower classes first, while the drop probability for the upper classes remains the same.

Figure 25:
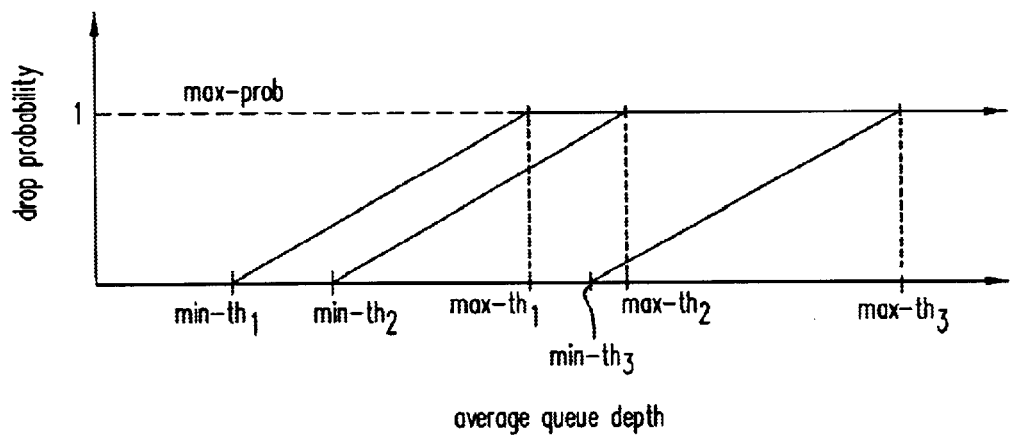
FIG. 25 is the WRED drop probability curve according to one embodiment of the present invention.

FIG. 25 gives an example of one way to configure the WRED parameters for a system with three classes of service.

RED Implementation Details

The present invention implements the RED algorithm somewhat differently to the way it is described in Floyd & Jacobson's original RED paper. A summary of the main differences/features are as follows:

The average queue depth is computed over every queue per unit time, rather than at enqueue time only. This allows the hardware implementation of the RED algorithm to compute the average depth to a higher resolution more easily. It saves having the additional steps of counting the time a queue remains empty. The update period is approximately 40 uS. This is time enough for approximately 160 packets (average=75 Bytes) to have moved. As the TBM has far fewer queues than the RBM (discussed below), the TBM is capable of updating each queue much more frequently (16×), but for simplicity, we chose to make it re-compute averages at exactly the same rate as the RBM.

The average queue depth is computed for packet count, rather than byte count. The goal of the RED algorithm is to keep the average latency of a given queue down. Although this would theoretically be more accurately achieved if the average queue depth were computed in bytes, computing it as the average packet depth will give similar results since consistent average packet sizes are seen on the Internet even over small window sizes. This choice also simplifies the hardware implementation.

RED is implemented in both the transmit and receive directions. In embodiments where there is a per-queue QueueStatus signal from the transmit queues to the receive queues, there is no reason for the transmit queues to be controlled via RED. There is no problem with them hitting their maximum levels since this causes no tail-dropping and, furthermore, these queues will be deliberately small so as to reduce the latency introduced by them filling.

Figure 26:
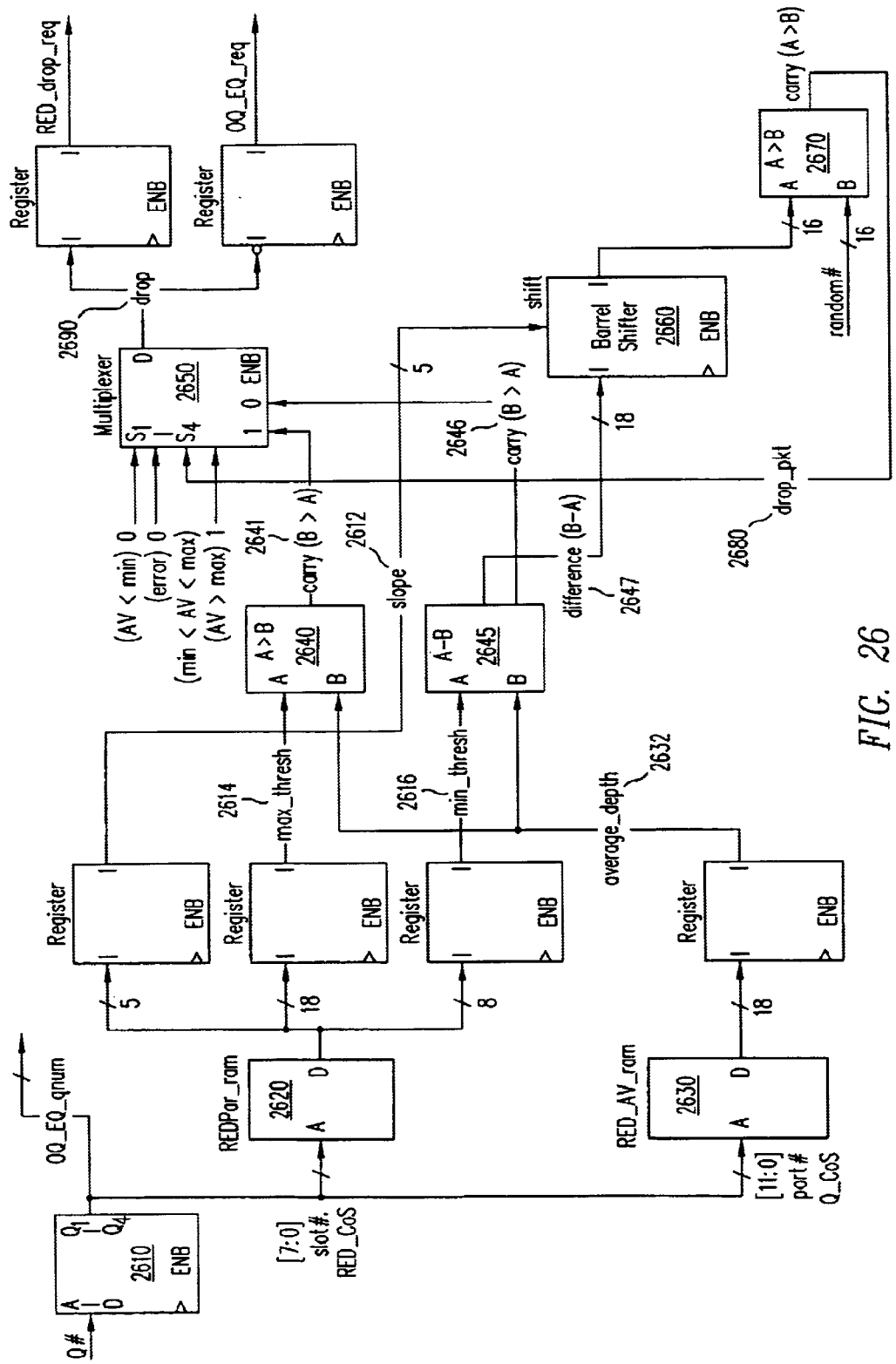
FIG. 26 is a high-level schematic of the RED control logic, according to one embodiment of the present invention.

The RED congestion avoidance module is implemented in two distinct components: one works in the background, constantly re-computing the average queue depths and storing them in an SRAM; the other component fetches the average queue depth for the appropriate queue on each enqueue operation and uses that value in conjunction with the RED parameters to compute the drop probability for this packet. The RED decision logic is shown schematically in FIG. 26. (Enable and clock lines are omitted for clarity; one of ordinary skill in the art recognizes their conventional use and would not require undue experimentation to implement them.)

The queue number arrives as an input to register 2610. The bits of the queue # corresponding to the slot # and RED_COS are combined and used to fetch RED parameters slope 2612, maximum threshold 2614, and minimum threshold 2616 from RED parameter RAM 2620. Additional queue # bits are used to fetch the average queue depth 2632 from RED average depth RAM 2630.

Comparator 2640 determines if the average queue depth 2632 is greater then the maximum threshold value 2614. Likewise, comparator 2645 checks if average queue depth 2632 is below the minimum threshold 2616, and if not, how much it exceeds the minimum. The carry signals 2641 and 2646 from comparators 2640 and 2642 (respectively) control mux 2650, which outputs a one-bit drop signal 2690.

The difference between the average queue depth 2632 and the minimum threshold 2616, signal 2647, is multiplied by the RED slope parameter 2612 in barrel shifter 2660. The output of barrel shifter 2660 is compared to a random number in comparator 2670; the carry output of comparator 2670, representing the cases where slope times (amount that average queue depth currently exceeds the minimum threshold) exceeds a random amount, forms a variable (probabilistic) drop signal 2680. Variable drop signal 2680 is applied on input 3 of mux 2650; this signal is used as the one-bit drop signal 2690 when both control bits are logic ONE, i.e., when the average queue depth 2632 is between the minimum and maximum threshold parameters.

Average Queue Depth Computation Module

The average depth computation module operates in a continuous loop. At the start of each loop it fetches the current average and instantaneous depth for the first queue (queue number 0), i.e., it reads location 0 of the average queue depth SRAM 2630 and location 0 of the instantaneous queue depth SRAM. It then computes the new average value using the well-known low-pass filter equation (given in Floyd & Jacobson):

$$Anew = Aold + ((Inst - Aold)/W)$$

where W is a global (configurable) constant called RED-shift. This constant is programmed by software based on the assumed round-trip time of the TCP traffic passing through this router divided by the number of times per second the average will be recomputed.

In some embodiments, the SRAMs are implemented with one access port shared by multiple clients, which meant there has to be small FIFOs placed on the interface between the average depth module and each SRAM in order to keep the pipeline filled. Many other implementations are possible. Using a multiple port SRAM is the simplest, but most expensive in silicon resources.

Once the new average has been computed, it is written back to the corresponding location of the average depth SRAM 2630 and work begins on queue no. 1. Once all the queues (2056 in the RBM case, 128 in the TBM case) have been processed, then the average depth module can go back to the first queue and start again.

In some embodiments, a programmable timer is started at the beginning of each pass through the queues. If this timer has not expired by the time the last queue is processed for this pass, then the average depth module will stall until the timer finally expires. This is useful when the time it takes to pass through all the queues is not deterministic as it is in this case. It allows the recomputation interval to be fixed at a constant no matter what traffic was experienced in the process. In one embodiment, it is programmed to 50 uS.

Per-packet RED Drop Probability Computation

For each packet which requires consideration by RED before being enqueued the RED module performs the following steps:

fetch the current average queue depth for this queue (from the SRAM)

fetch the selected RED parameters for this packet. These parameters include: minimum drop threshold, maximum drop threshold and drop probability slope.

Note that if the drop probability is assumed to be 1 at the point of the maximum drop threshold, then the drop probability slope is not technical required. However it simplifies the hardware implementation by having this slope (shift value) pre-computed regardless.

Once the RED module has the average queue depth and the RED parameters then it computes the RED drop probability.

The probability is actually computed as a 16 bit integer (i.e., just shifted 16 places to the left of where it would normally be expected for a fraction). This 16-bit integer is then compared with a 16-bit random number generated by the hardware (in this instance a 16-bit LFSR based on an irreducible polynomial is used).

The decision to drop or pass the packet is simply the result of the comparison of the drop probability and the random number if the packet is to be dropped, then the appropriate counters are incremented to track this, and the packet is enqueued onto the second queue number supplied by the requester. This queue number is typically the original free queue the packet buffer came from.

Configurable RED Parameters/Variables

Although there are unique output queues per class of service (COS), per port and per linecard slot in the RBM, there is only one set of RED parameters per COS per slot provided, i.e., 8×16=128 sets for unicast, plus 8 for multicast. The reason for this is to rationalize the amount of storage required for these parameters.

For the TBM, there are separate sets of parameters per COS and per port, i.e., 8×16=128 sets. For each queue, the following RED-related information is kept:

instantaneous queue depth (in packets) [18 bits]

average queue depth (in packets) [23 bits=18 integer+5 fractional part]

number of random drops [24 bits]

number of forced drops [16 bits]

Note that the drop counters above (random & forced) can be counted in one of two modes. The first is where the drops are counted per physical queue, i.e., regardless of the RED_COS used to get to the queue. The second mode is where drops are counted per {port number, RED_COS} pair. This would provide mode useful information in a situation where WRED is being used.

There is a global mode bit which selects which counting mode is used for all queues in the chip.

For each set of RED parameters, the following information is kept:

min-thresh [18 bits]

max-thresh [18 bits]

slope [5 bits]

The RED-shift factor W is kept globally in for all queues in the TBM, and per linecard slot in the RBM (with a separate W for each set of 128 queues). It is a 4-bit value which can indicate a RED-shift of 1, 32, 64, 128, . . . , 512K. Note the discontinuity is due to the smaller values being of lesser use than the higher values of W, while a RED-shift of 1 is handy for verification/diagnostics, test development etc.

In addition, the RED-shift can be overridden on a per-queue basis by a bit in the RED average depth array. This allows for individual queues to be flagged as non-TCP and thus controlled on their instantaneous memory usage, rather than average usage.

RED Drop Probability Slope Approximated to Nearest Power of Two

To compute the probability to use in the RED calculation requires the following computation (refer to FIG. 24).

$$(average - minthresh) \times \left(\frac{maxprob}{maxthresh - minthresh}\right)$$

The first half of this expression is determined at run-time, while the second part is a constant that is pre-computed at configuration time. If we approximate this with a power of two, then we can achieve this computation with just a shift, rather than any multiply/divide operations. This shift will always be a right-shift since this term is always less than one.

Weighted RED Alternate Embodiment

Each packet can be assigned both a COS (determining which of the 8 queues to enqueue it on) and a RED_COS, which selects which of 8 sets of RED parameters for these queues to use. This allows easy implementation of WRED.

In addition, when one of these 8 sets of per-port RED parameters are initialized to zero, that all-zero RED_COS can be used by packets which are considered un-droppable. "Important" packets can thus be labeled so that they bypass RED-drop by either RBM 240/TBM 280 (fast path packets) or linecard CPU 1240 (slow path packets). One application of this mechanism is ensuring that certain control messages (such as IPC packets) are delivered from one linecard to another linecard in the system.

Multicast on TBM

TBM 280 also processes multicast packets, using the Multicast Queue Server (MQS) module. This module determines the list of ports to which the packet needs to be sent. It queues the packet to each port in turn, starting from the lowest numbered port first and progressing to each high-numbered port.

Each time it enqueues the packet to a port, it uses RED_COS[2:0] and Q#[2:0] fields from the MGID field of the BHDR to fully specify to the TBM QM 1510 which queue and RED parameters to use. This allows RED to be bypassed entirely for the packet, or not.

In addition, there is a set of signals from the QM to the MQS which tell it which of the 16 ports are currently in the QueueStatus "full" state. If configured (via a mode bit), the MQS can skip over any port which is not ready for a packet (and not ever come back to it).

MDRR Dequeuing Algorithm Implementation

There are two different clients to the output queue dequeue 1460 module of the queue manager. The first client is a dequeue from a simple queue (i.e., one of the first 32 queues). These dequeue requests are passed on to link manager 1430 unchanged. The second type of client request is when a linecard slot number in the range 0 to 16 is provided. In this case, the MDRR module 1470 determines a queue number in the range of queues for that destination slot and passes that queue number on to link manager 1430.

MDRR module 1470 determines the queue number by first round-robining between all the ports for the specified linecard slot, then within the eight COS queues for the destination port via the MDRR algorithm.

Figure 27:
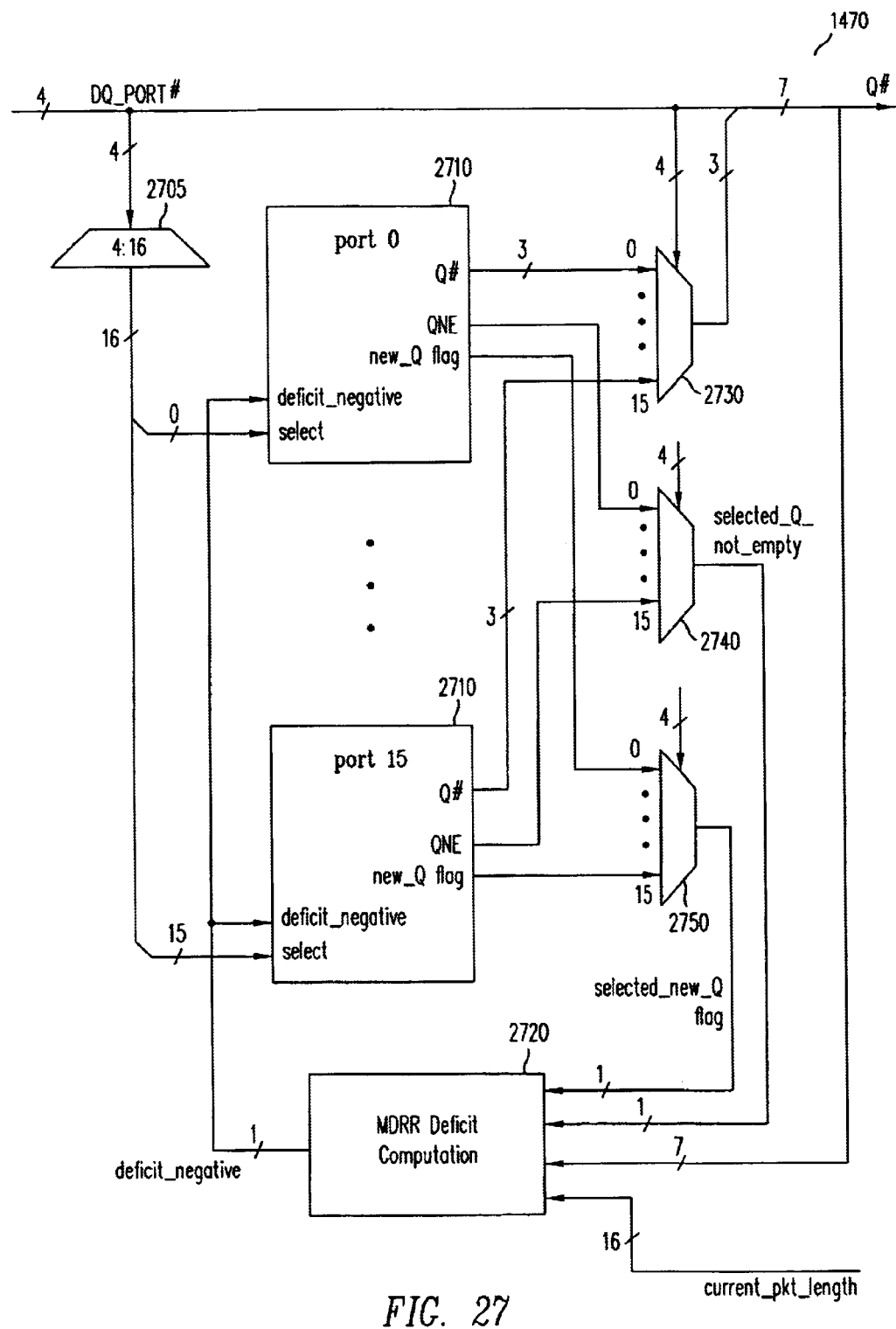
FIG. 27 is a high-level schematic of the MDRR control logic, according to one embodiment of the present invention.

FIG. 27 shows a high-level schematic of the MDRR circuitry 1470 according to one embodiment of the present invention. The number of the queue to be dequeued (DQ_PORT#) is demultiplexed into 16 individual lines in demux 2705. Each line is a select signal for one of 16 port control circuits 2710 (further explained by reference to FIG. 28 below). Each port control circuit 2710 provides a queue number (Q#), queue not empty flag (QNE), and a new queue flag (new_Q flag). Each of the three outputs is sent to a separate multiplexer 2730, 2740, and 2750, respectively. Multiplexers 2730, 2740, and 2750 are also controlled by the 4 bit DQ_PORT#; as each port is selected for dequeuing in output queue dequeue (OQ DQ) 1460, information specific to each port is supplied to MDRR deficit computation circuit 2720 as shown in FIG. 27.

Figure 28:
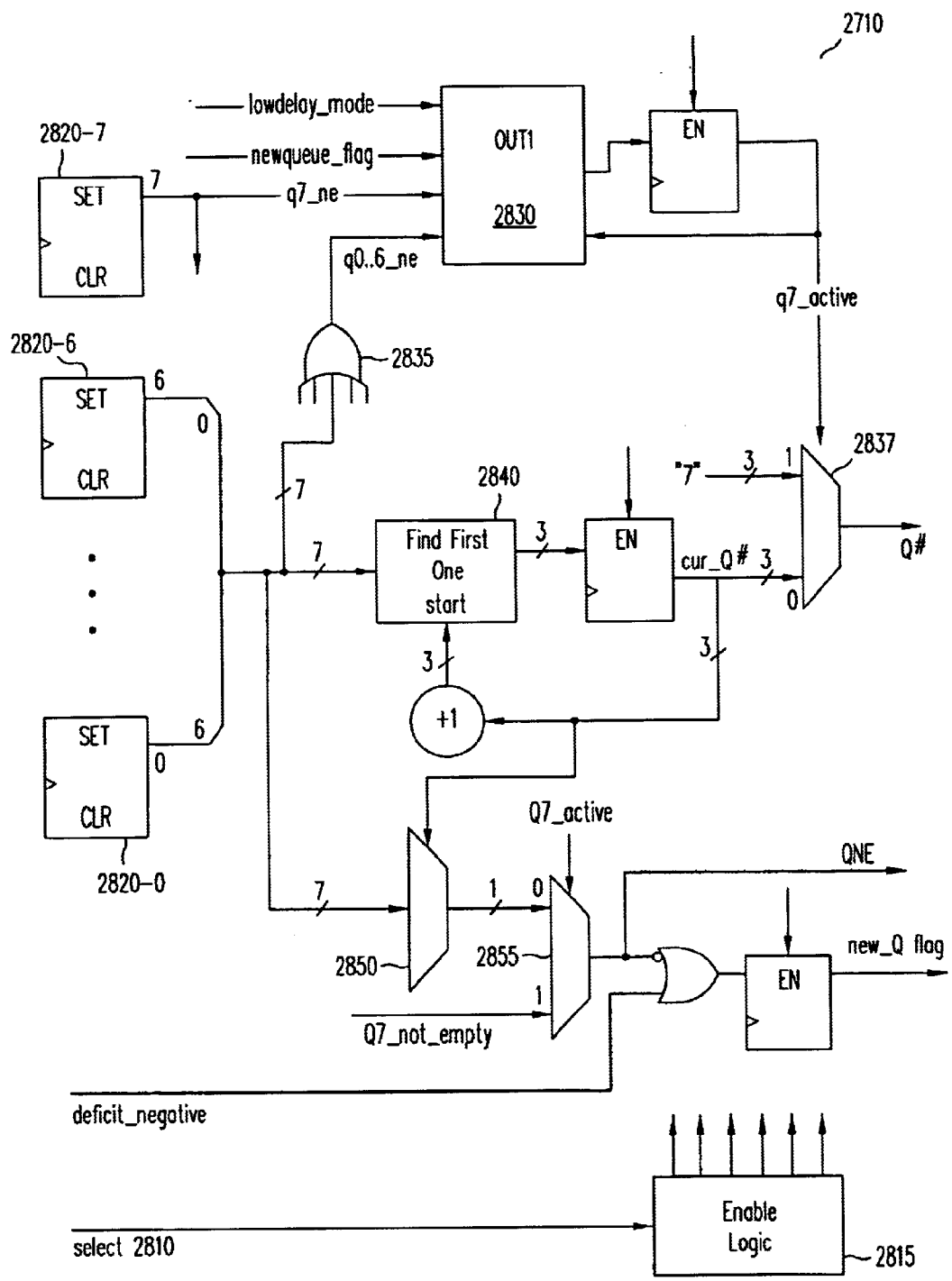
FIG. 28 is a lower-level schematic of port control circuit 2710, according to one embodiment of the present invention.

FIG. 28 shows port control circuit 2710 is greater detail. The select input 2810 is one of the 16 individual lines discussed above. Select line 2810 controls enable logic 2815, which coordinates the various registers in port control circuit 2710. Each port control circuit 2710 has eight registers, 2820-0 through 2820-7. Each register 2820 identifies which queue in the port is in use. Register 2820-7 holds a special signal (q7_ne) designating whether queue 7 is empty; queue 7 is reserved for the highest priority traffic in some embodiments and is thus treated specially.

Function box 2830 contains standard logic gates to implement the "OUT1" function. OUT1 is computed from the inputs shown in FIG. 28 according to the following pseudo code equation.

---

OUT1 = (lowdelay_mode & q7_ne) +
(newqueue_flag & !lowdelay_mode & !q7_active & q7_ne) +
(newqueue_flag & !q0 . . . 6_ne);

---

Alternatively, one could calculate OUT1 with the following pseudo code. This way makes it easier to see how the expression was derived.

```
if (lowdelay_mode && q7_not_empty) {
    q7active = 1;
} else {
    if (newqueue_flag) {
        // choose a new queue#
        if (!lowdelay_mode && !q7active && q7_not_empty) {
            //fairmode, only choose q#7 if we didn't last
            // time
            q7active = 1;
        } else if (any queue in [0 . . . 6] is non-empty) {
            //choose next low priority queue to send from
            q7active = 0;
        } else {
            //assumption was at least one queue non-empty,
            // must be #7
            q7active = 1;
        }
    }
}
```

Signal q0 . . . 6_ne is the output of a seven-way OR function performed in gate 2835.

The seven "regular" queue registers (queue 0 through queue 6) are also used to identify the queue number from which to dequeue in "Find First One" circuit 2840. This is conventional logic that determines the first occupied queue (searching from queue 0 upward) and outputs a 3 bit current queue number (cur_Q#) identifier. The q7_active signal output from OUT1 logic 2830 selects (in selector 2837) either the cur_Q# or the number "7" depending on whether queue 7 takes priority in a particular dequeue. The cur_Q# also selects (in selector 2850) the active configuration register 2820. Selector 2855 then determines the QNE output of port control circuit 2710.

If the MDRR deficit is negative (further discussed below), then a new queue needs to be opened for use (i.e., made active) in the next dequeue iteration.

The current queue number is incremented by one (with wrap-around to queue 0 after queue 6) in each successive dequeue iteration through Find First One logic 2840.

Figure 29:
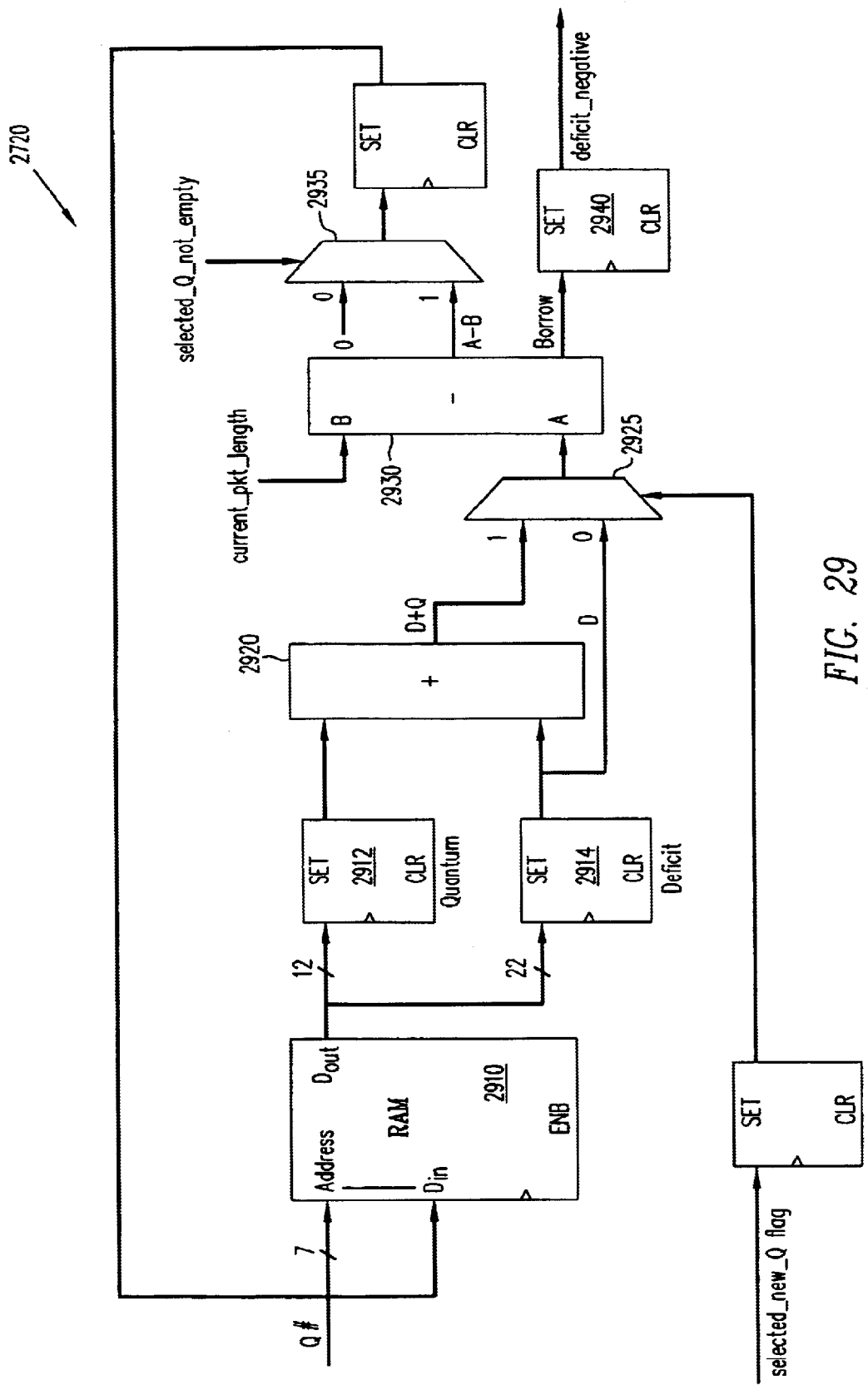
FIG. 29 is a lower-level schematic of deficit computation circuit 2720, according to one embodiment of the present invention.

FIG. 29 shows deficit computation circuit 2720 in greater detail. The queue number Q# is supplied as the address to access RAM 2910. A 34 bit data value is read out of RAM 2910 on each iteration. Of these bits, 12 bits represent the current quantum and 22 bits represent the current deficit for the selected queue. The quantum and deficit are registered in registers 2912 and 2914 and added in adder 2920. If the (selected) new_Q flag is set, the sum of the deficit and the quantum is passed to subtraction logic 2930. Subtraction logic 2930 subtracts the current packet length (i.e., the length of the packet about to be dequeued) from the output of selector 2925. The result (which may be a negative number) is passed through selector 2935 and registered. At the appropriate clock time, the difference, which is the new value of the deficit, is written into RAM 2910.

If the current packet length is greater than the output of selector 2925, necessitating a borrow in subtraction logic 2930, the deficit_negative flag is also set in register 2940.

Figure 30:
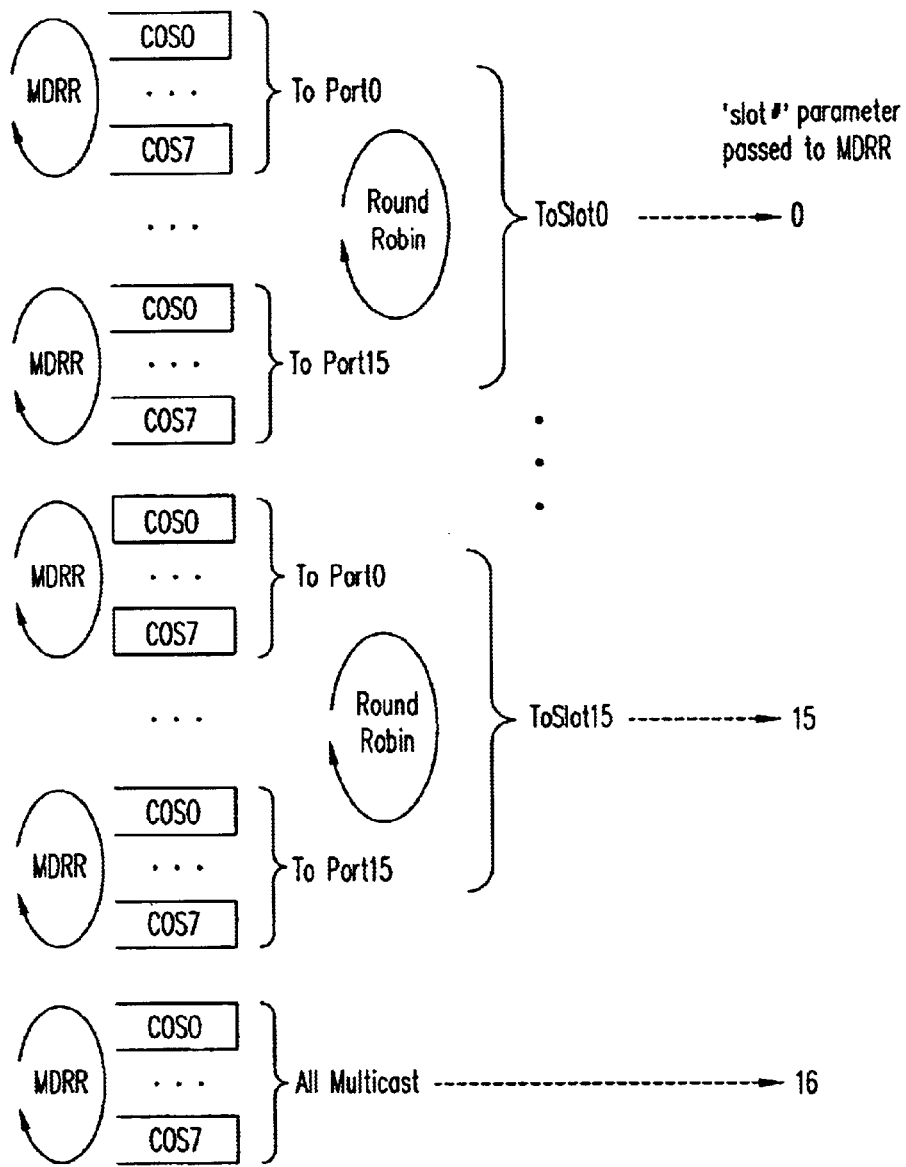
FIG. 30 is a high-level schematic of the RBM output queue organization according to one embodiment of the present invention.

FIG. 30 shows the organization of the output queues on the RBM 240. As mentioned above, for each output queue MDRR module 1470 stores the following parameters RAM 2910:

QUANTUM (12 bits): This is the number of bytes which is credited to this queue's deficit every time its turn comes up. Is not necessary for this value to have precision down to the exact byte, so it is only stored as a multiple of 512 bytes, thus saving SRAM resources within the RBM ASIC. This value is written by the CPU at configuration time and read by the MDRR module.

DEFICIT (22 bits): This is the exact byte count for the current 'deficit' for this queue. Note that this value is a signed value. The sign bit for this field is kept within the ASIC in a separate register in order for the MDRR algorithm to find the next queue to use quickly.

Packet Flow Through the RBM

The basic flow of packets through the RBM is as shown in FIGS. 12 through 14. A packet header arrives from the pipelined switch 220 to RBM FIFO 1310 (a.k.a. the Packet Receive (PLIM) stage). It is held in an internal memory until the corresponding packet tail begins to arrive from the pipelined switch 220. Meanwhile, queue manager 1210 is signaled to dequeue a buffer into which to write the packet (the appropriate free queue number is provided in the buffer header of the packet). This returns the buffer address (in receive packet buffer 245) used to write the packet into buffer 245.

The packet header and tail are written to receive packet buffer 245 (in transfers up to 256 bytes) until the end-of-tail signal is received from the pipelined switch 220.

Queue manager 1210 is then signaled to enqueue the packet onto the appropriate output queue (as provided in the buffer header). Note that the packet may end up being dropped at this point due to RED.

The Fabric Interface Module (FIM) 170 works on up to 17 different packets simultaneously, one for every destination linecard slot in the system (in one embodiment) plus one for multicast. For each slot, FIM 170 waits for the availability of a packet destined to that slot, then signals output queue dequeue circuit 1460 to dequeue it. Dequeue circuit 1460 returns the buffer address. The FIM 170 then transfers the packet to the fabric 120.

Once the last cell of the packet has been transferred to fabric 120, the packet is enqueued onto the appropriate return queue (usually the original free queue the buffer came from in the first place).

In the case of a 'slow path' packet, the packet can optionally be directed to go down to the linecard CPU 1240. In this case the packet is enqueued onto the special 'RAW' queue by the packet receive stage 1220.

Note that packet receive stage 1210, FIM 170, and CPU 1240 all operate independently. The only globally shared resources/dependencies within the RBM are queue manager 1210 and the SDRAM interfaces managed by memory controller 1222.

Packet Receive Stage

Packet receive stage 1220 (a.k.a. the PLIM stage) accepts the heads and tails data from the pipelined switch 220 in FIFOs 1320 and 1330 (respectively), dequeues an appropriately sized buffer from a free queue (selected by pipelined switch 220) via queue manager 1210, writes the head and tail data into that buffer, and enqueues the packet onto the proper output queue.

Packet receive stage 1220 looks in the Free Queue and Local Output queue fields of the Buffer Header provided by the PSA.

Note that when the dequeue request is passed to the queue manager 1210 for the Free Queue, if the queue manager has run out of buffers of that size, then it may select a buffer of a larger size and return it instead. The queue manager will return the queue number of the Free Queue eventually chosen.

One of the pieces of data returned from the queue manager is the size of the buffer selected. This is used by packet receive stage 1220 to check that the data arriving from the PSA is not too long for the buffer used. In this situation ever does occur, then Packet Receive Stage will halt the RBM and generate and IRQ for the linecard CPU 1240 to come and help. Note that the most likely reason for this would be a microcode programming error in the PoP software.

Once the dequeue has occurred, but before the data starts being written to the SDRAM, packet receive stage 1220 needs to modify the BHDR with the information returned from the queue manager. Specifically, it does the following:

replaces the Queue Element field with the value returned by the queue manager; and replaces the Free Queue field with the value returned by the queue manager. This is done since the queue manager may in fact have used a different Free Queue than the one indicated by the PSA in the first place (note the original free queue is still intact in the "Ideal Free Queue" BHDR field).

If the Return Queue field is zero, the queue manager replaces the Return Queue field with the same Free Queue number as above, since this is what the Fabric Interface Module 170 will use to determine where the packet should be returned to. If the Return Queue field was initially non-zero, then it is left untouched.

When the Packet Receive Stage 1220 has accepted an entire packet from the PSA 220, and completed writing it to memory 245, it issues an enqueue request to the queue manager (specifically OP EQ 1410). It passes both the Local Output Queue number and the actual Free Queue number used for this buffer to the enqueue logic. Passing both queue numbers allows the packet to be dropped by the RED logic 1420 without any further interaction with the Packet Receive Stage 1220. In addition, it also passes the packet length to the queue manager In the case of the PSA 220 wanting the packet dropped without further processing, it indicates this by setting the Free Queue field of the BHDR to zero. This tells the Packet Receive Stage 1220 to not bother dequeuing anything, nor writing the packet to SDRAM 245.

Note that the Packet Receive Stage assumes the packet header portion is a multiple of 4 bytes. In other words, since the size of the header portion as it entered the PSA 220 was known to be a multiple of 4 bytes, the assumption is that the PSA will only modify the length of the header portion plus or minus by a multiple of 4 bytes. The most common example of this is pushing or popping TAGs, which are 4 byte quantities.

Inbound Fabric Interface Module

The Fabric Interface Module (FIM) 170 takes packets from the various RBM output queues and readies them for transmission over the switch fabric 120. The FIM can handle up to one packet to each of the 17 destination linecard slots simultaneously (16 unicast plus one multicast). Queue manager 1210 (specifically, output queue dequeue circuit 1460) provides the FIM with a set of 17 signals which indicates which destination slot has at least one outstanding packet to be transmitted. Note that the queue manager is combining the status of many queues in each case to create this summarized signal.

When the FIM is able to begin processing another new packet for a particular slot, it asks the queue manager to dequeue a packet for that slot. The output dequeue circuit 1460 internally maintains a round-robin within the various sets of per-port queues allocated to this slot. In addition, MDRR module 1470 maintains the Modified Deficit Round Robin state within the 8 COS queues for the particular port chosen. All of this is hidden from the FIM module.

After the dequeue, the queue manager returns to the FIM module the BADDR, queue element number, and packet-length. The FIM then reads the first part of the packet from SDRAM packet buffer 245 into the appropriate one of 17 internal buffers and readies it for transmission over fabric 120.

Once the last byte has been sent for a given packet, the FIM 170 requests the queue manager to enqueue the packet onto the 'Return Queue' that it saw from the BHDR. This will normally be equal to the Free Queue.

The inbound FIM is, in some embodiments of the present invention, identical to the outbound FIM 170 discussed below. Both FIMs 170 have an inbound (to-fabric) and an outbound (from-fabric) channel. The above discussion concerns the to-fabric direction; the from-fabric channel is discussed below in connection with the TBM.

Transmit Buffer Manager (TBM) Operation

The TBM has many aspects similar to the RBM, so this section will highlight only those areas where things are different.

Transmit Buffer Memory 285—Same (functionally) as RBM.

Queue pointer memory (SRAM) 1515—Same (functionally) as RBM.

Switch Fabric Interface 170—The TBM takes data from the fabric and reassembles it into packets.

Linecard CPU Interface 1240—This is exactly the same as the CPU interface module in the RBM. However, the bus is truly point-to-point from the TBM to the interface; no other devices are on it.

Queues—There are a total of 160 queues supported in the TBM, broken up as follows. Note that the output queues have special properties that the simple queues don't have. This will be discussed further in the following sections.

32 simple queues (free queues, RAW queue, etc.)

128 output queues (16 ports×8 COS)

Buffer Header Structure—Same as RBM

QueueStatus—As noted above, the TBM also generates QueueStatus signals for the output queues and sends them to other cards, rather than responding to signals received from other cards. The QueueStatus signals operate as follows. The TBM has two programmable thresholds for each output queue: one a high-water level, and the other a low-water threshold. When the queue depth crosses the high-water mark, it sends the stop signal for this queue to other linecards, when the queue depth goes below the low-water mark it sends the OK to send signal to the other linecards. Enqueues by the TBM's queue manager ignore the current state of the QueueStatus signal for that queue. It is expected that once the threshold is crossed, then several more packets could still arrive as they were already in flight from the other linecards. (In the worst case, it could be 2 or 3 per linecard×16 slots).

RED is implemented on the TBM in a similar fashion to the RBM.

Free Queues—The TBM is similar to the RBM in handling dequeues from a Free Queue in that it can select a larger sized buffer if necessary.

RAW Queue (Queue #31)—Same as RBM.

Multicast RAW Queue (MRQ) (Queue #29)—This is similar to the RAW queue in that it has a hard upper limit threshold. This queue is serviced by the multicast processing module.

MDRR—The MDRR processing on the TBM is somewhat simpler than in the RBM. There is only one set of 8 COS queues to be handled for each 'active list'

Figure 31:
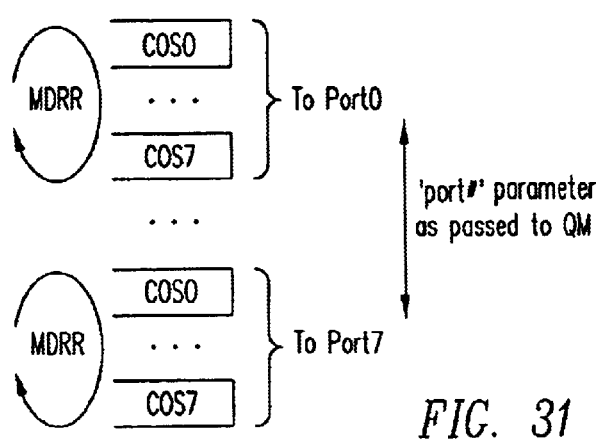
FIG. 31 is a high-level schematic of the TBM output queue organization according to one embodiment of the present invention.

(physical port in this case). There is no need for the additional round-robin stage that the RBM requires. FIG. 31 shows the organization of the TBM output queues. The Quantum and Deficit parameters are similar in size and resolution to the RBM.

queue manager—The TBM queue manager 1510 are the same as in the RBM with the following differences. QueueStatus signals are sent from this chip, rather than received by this chip. There are only 128 output queues, instead of 2056. There are separate RED configuration parameters per port and per COS (rather than per slot and per COS). There are two types of queues: LowQs and OutputQueues. In the LowQ space, there are 16 FreeQs, a RAWQ, a Multicast RAW Queue (MRQ), an IPCQ, and spare queues. In the OutputQ space, there are 128 unicast output queues and one MRQ. The unicast OutputQ numbers include a 3 bit field at the end which indicates the RED parameters to use.

All RAM arrays in the TBM which have per-queue information are addressed from 0 to 127, where the 7-bit address is taken from bits [9:3] above.

QueueStatus Signals

In order to provide a fairer way to share bandwidth of differing COS traffic over the switch fabric, each of the 128 transmit output queues have programmable thresholds (max and min) on their depth. The depth kept is the total number of packets on the queue.

When the queue depth crosses the appropriate threshold (max) then a signal (QueueStatus) is sent from the active linecard to every other linecard indicating that the particular queue is now full and no further packets should be sent over the switch fabric for it. This only stops traffic for that particular COS queue, and thus does not affect traffic to other queues. It is assumed that linecards may have already committed to send one or two packets to this queue which cannot be undone without creating a head of line (HOL) blockage, so the queue threshold must be set appropriately to accommodate this lag.

When the depth of the queue eventually falls below another configurable threshold level (min), then a signal is sent to all other linecards indicating it is now OK to resume sending to the queue in question. Again, there may be latency in the linecard reception of and response to this signal, so the minimum threshold must be set appropriately to avoid under-utilizing the output interface.

In embodiments of the present invention utilizing the QueueStatus signal, the system 100 backplane contains individual point-to-point signals from every linecard to every other linecard over which the QueueStatus queue-backpressure signals are transmitted.

Packet Flow Through the TBM

The basic flow of packets through the TBM is as per FIG. 15. The first byte of a new packet arrives from FIM 170 to the packet receive stage 1520. The BHDR indicates the appropriate Free Queue number to pass to the queue manager 1510. The queue manager returns the BADDR into which the packet is reassembled.

When the last byte has been received, the packet is enqueued onto the output queue number specified in the BHDR. In some cases this will be the RAW queue, but in general it will be an output queue. Note that the packet may end up being dropped at this point due to RED.

The packet transmit stage (a.k.a. PLIM) 1526 works on one packet at a time. When it is ready to start on a new packet, it selects a port which is both ready and for which queue manager 1510 has traffic and requests a dequeue for that port. Queue manager 1510 uses an MDRR module (as in RBM queue manager 1210) to select which COS queue is actually used for the dequeue within a set of port queues.

Packet transmit stage 1526 reads the packet from the transmit buffer memory SDRAM 285 and sends it to the transmit FIFO 1430. At the completion of the entire packet it enqueues it back to the queue number specified in the 'Return Queue' field of the BHDR.

CPU Interface

This is the same as in the RBM. It provides the packet header prefetch/flush mechanism for sending packets to the linecard CPU 1240, as well as the configuration, status, and diagnostic interface to the internals of TBM 280.

Outbound Fabric Interface Module

This module 170 reassembles packets received from the switch fabric 120. It can reassemble up to 32 packets simultaneously (one unicast plus one multicast per slot in the system). The outbound FIM 170 is, in some embodiments of the present invention, identical to the inbound FIM discussed above.

In every group of bytes sent across the fabric (sometimes referred to as "cells") is a payload header which includes the Free Queue and Output Queue number determined by the receiving linecard. When the first cell of a packet is received from the fabric, FIM 170 makes a request to queue manager 1510 to dequeue a buffer from the Free Queue specified. The queue manager will return the BADDR, queue element number, actual free queue used, and the maximum buffer size.

Note, just as in the RBM, queue manager 1510 can potentially end up dequeuing from a different (larger) free queue in the case the requested queue was empty.

Meanwhile, the FIM uses the appropriate one of its 32 reassembly buffers to write the cell into. The reassembly buffer is used to collect together several cells worth of data in order to make the transmit buffer memory SDRAM 285 transfer more efficient. Each reassembly buffer is 10 cells deep. Once there are 5 cells in the reassembly buffer, the data is written off to transmit buffer memory 285 and the process continues.

Once the last cell of a packet is received by the FIM (indicated by the 'last' bit of the cell payload header being set), FIM 170 enqueues the packet onto the queue number provided in the payload header. This queue number is normally be one of the output queues, but could also be the RAW queue. Note that the FIM passes the length of the packet to queue manager 1510 as the length parameter on the enqueue.

In the case of the packet requiring multicast, the output queue number (bits [15:0] in the payload header) has its most significant bit set. This tells the FIM to send the packet to the Multicast RAW Queue (MRQ) instead of what is indicated in the output queue field. The MRQ is hard-wired as queue number 29 in one embodiment of the present invention.

Since the fabric discards cells that have an unrecoverable CRC error in them, the FIM may encounter packets with missing cells. It detects this because each cell has a sequence number and packets are always sent over the fabric with all cells in order. If ever the FIM sees a sequence number error while reassembling a packet, then the whole packet is dropped, the buffer returned to its original free queue, and an appropriate error counter is incremented.

Packet Transmit Stage

The Packet Transmit Stage (a.k.a. PLIM stage) 1526 has the task of taking packets from the output queues on the TBM, determining the appropriate encapsulation required by examining the BHDR, prepending the encapsulation (which might come from transmit packet buffer 285 or from a small internal SRAM) and sending the packet to the FIM 170.

Figure 32:
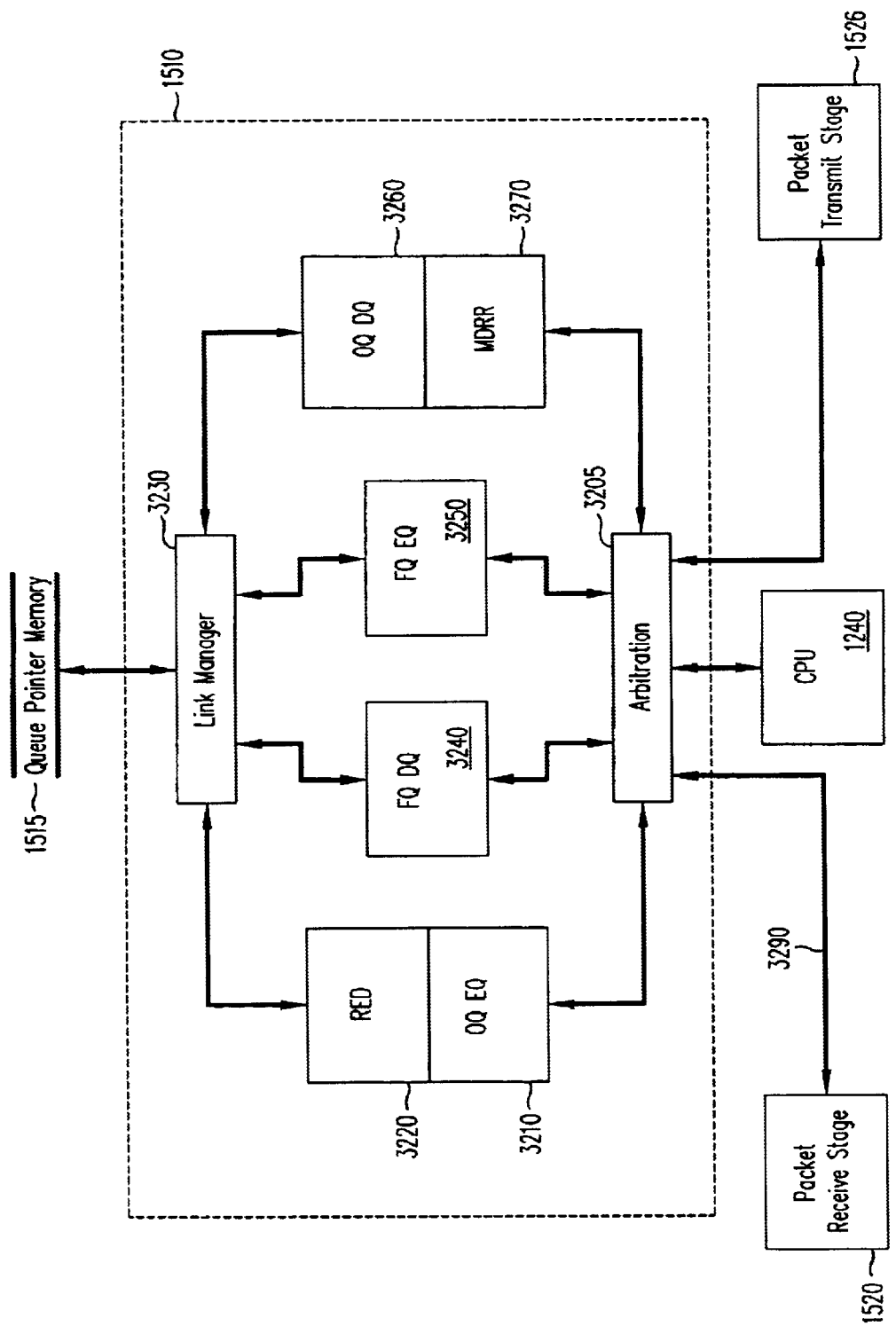
FIG. 32 is a high-level data and control flowchart of TBM queue manager 1510 according to one embodiment of the present invention.

FIG. 32 shows the internals of the packet transmit stage 1226. Transmit stage 1526 first determines to which port the next packet needs to go. It does this by combining the FIFO Full flags 3210 from the transmit FIFO 1430 and the Queue Not Empty flags 3220 from the queue manager 1510 and round-robining between those which are ready to accept data and have work to do. This results in a port number having a value of from 0 to 15 which is passed to queue manager 1510 as the parameter for a dequeue request. The queue manager uses the MDRR module (not shown) to determine which queue from within the 8 COS queues associated with this port to dequeue from. Queue manager 1510 returns to packet transmit stage 1526 the queue element number, BADDR, and the packet length (which FIM 170 had previously given queue manager 1510). One additional bit which is returned from the queue manager is whether the packet is a multicast buffer or not.

From this information, packet transmit stage 1526 makes a packet buffer memory 285 read (via memory controller 1522) to fetch the BHDR plus the first part of the packet itself. The PLIM has a FIFO 3230 of 256 bytes, so it only reads the minimum amount required in case the packet is smaller than 256 bytes.

Once the BHDR is available, packet transmit stage 1526 extracts the Start Offset and L3 Length fields from it, and programs the direct memory access (DMA) to transmit packet buffer 285 accordingly. The Start Offset field indicates the offset from the start of the buffer to where the first byte of the actual packet to be transmitted is. This is, in one embodiment of the present invention, the L3 part of the packet, allowing the previous L2 encapsulation to be removed.

Packet transmit stage 1526 also examines the Start Offset for the special value 20 (decimal). This is an indication that this BHDR is in the 'compressed' format and that there will be no OutputInfo field. In this case, packet transmit stage 1526 uses a preconfigured default instead.

If the BHDR is not compressed, then there will be an OutputInfo field in the BHDR. Packet transmit stage 1526 passes this (or the default in the compressed case above) to the Output Encap finite state machine (FSM) 3270. State machine 3270 prepends the string of bytes described by this OutputInfo to the L3 packet described previously by the StartOffset/L3Length fields. It is possible for the OutputInfo to be null, indicating there is nothing to prepend.

The OutputInfo can have one of the following forms:

The first (and likely the most common) form is where the OutputInfo includes an address and length (in bytes) of a string contained in a small (64 byte) SRAM 3240 located within TBM packet transmit stage 1526. Using an encapsulation from internal SRAM 3240 gives the highest performance to the system as it saves on additional transmit packet buffer 285 accesses. Note that in this form, the start address contained in the OutputInfo must be 4-byte aligned. Also, as SRAM 3240 is only 64 bytes long, it can only contain a very small selection of encapsulations. It is anticipated that the following strings are programmed in: PPP/IP, HDLC/IP, PPP/TAG, HDLC/TAG, PPP/MCAST-IP, HDLC/MCAST-IP, PPP/MCAST-TAG, HDLC/MCAST-TAG. Each of these strings are 4 bytes each, thus only using the first half of the memory.

This first form also has an optional 32 bit bonus header mode. In addition to the data from SRAM 3240 described by the Addr/Length fields, there is a bit which signifies that an additional 32 bit header should be prepended. When set, the first 16 bits of the header will come from the VMAC16 field of the OutputInfo field, and the second 16 bits will be a fixed value which comes from a register in the TBM. This option would be used for sending a MAC which changes per packet, such as a Frame-Relay DLCI or ATM VCD.

The second form is where the OutputInfo includes an address and length (in bytes) of a string found in the transmit packet buffer SDRAM 285. This allows the most flexibility in the transmit path, as the amount of SDRAM addressable by this scheme is quite substantial. Up to 32 MBytes of transmit packet buffer SDRAM 285 can be addressed via this scheme, although each encapsulation string must start on a 16-byte boundary.

The third format is for TAG switching, which is used only for multicast paths. The OutputInfo includes the new TAG (20 bits) as well as an address/length pointer into internal encapsulation SRAM 3240. The encapsulation that comes from the internal SRAM 3240 is sent to transmit FIFO 1430 first. The StartOffset is backed up 4 bytes in order to point to the TAG that is being replaced and the new 20 bit TAG is concatenated with the remaining 12 bits of the previous TAG entry (COS, TTL) and sent to transmit FIFO 1430 followed immediately with the rest of the packet. Note that the TTL value is assumed to have already been updated by the receiving linecard before the packet was sent to the TBM.

Eventually, when the packet has been entirely sent to transmit FIFO 1430, the packet transmit stage 1526 enqueues the packet onto the queue indicated in the Return Queue field of the BHDR. Note that this could be the original Free Queue, or the RAW queue (e.g., as for IP fragmentation), or another output queue in the case of multicast.

TBM Multicast Support

In addition to the unicast support described in the previous section, packet transmit stage 1526 supports hardware multicast of packets. Packets can be multicast out several interfaces or ports (multiple times per interface, if required). Any mixture of TAG and IP output encapsulation for the same packet are supported without performance penalty compared with all IP or all TAG encapsulation.

In addition, the overall performance of multicast is not substantially slower than unicast. Specifically, this scheme requires three transmit packet buffer (SDRAM) 285 operations per packet the first time they are processed, instead of the regular one SDRAM operation. All other replications occur with just one SDRAM access, i.e., the same speed as regular unicast.

In order to support multicast, the buffer format in the transmit buffer memory 285 is modified. The most significant difference is that an additional 32 bytes of space is allocated above each buffer, immediately before the BHDR. Queue manager 1510 still returns a BADDR pointer to the start of the normal BHDR, meaning these additional 32 bytes are not used for normal unicast packets. Only the multicast hardware uses it.

The Multicast Queue Server (MQS) component of packet transmit stage 1526 (not shown) first becomes involved once a packet is enqueued to the Multicast RAW Queue (MRQ). The MRQ is a hardwired queue number within the TBM, queue number 29.

When the MRQ is non-empty, the multicast engine will send a dequeue request to the queue manager 1510. From the BADDR returned, it reads the BHDR from transmit buffer memory 285 (via memory controller 1522) into a scratch SRAM. From there it fetches the Multicast Group ID (GID) field (which is in the same location in the BHDR as the OutputInfo field normally is). The Multicast GID field occupies bits [17:0] of this field.

The Multicast GID is then used as an index into an array of Multicast Group structures kept in transmit buffer memory 285. Each structure is 64 bytes long and the base address of each structure is programmable within the transmit buffer memory address space.

The Ports[7:0] field describes which ports to send this packet to: bit 7 selects port 7 (or 15 if the HiPort bit is set); bit 0 selects port 0 (or port 8 if the HiPort bit is set). Ports are selected by searching from bit 0 to bit 7 of the Ports[ ] byte.

The Multicast Group structure is read from the transmit packet buffer (SDRAM) 285 into another internal scratch SRAM. From there, the following steps take place:

- The 32 bit field at offset 32 (Ports/HiPort/NextAddr) is copied into the BHDR (offset 12, which is where the now unused fields of Output Queue and Header Flags were).
- The entire BHDR plus OutputInfo Extension space is written back to SDRAM 285. Specifically, the first 32 bytes comes from the Multicast GID structure (the 8 OutputInfo values), then the original BHDR with the NextPortInfo, etc. fields inserted. Note that this is a 48 byte write only, since the last 16 bytes of the BHDR were not modified.

The packet is enqueued onto the appropriate output queue for the first port it needs to go to. This queue number is derived from the first set bit in Ports[7:0] plus the COS and RED_COS fields from the MGID field of the BHDR.

When the first Enqueue Request was made to the queue manager by the FIM, an indication was given that the packet should have the 'multicast' flag bit cleared. This is a status flag kept within the queue manager which is returned the next time this packet is dequeued.

Each of the OutputInfo[n] fields correspond to the OutputInfo to use if/when the packet goes out that particular port. They are in the same format as a regular OutputInfo.

The Ports[ ] field is made up of 8 bits. Each bit represents whether the packet is to be sent out the corresponding port or not.

Each time a packet is re-queued during multicast, it keeps the same COS and RED_COS as it started with, thus the lower six bits of the queue number are constant.

The process of transmitting a multicast packet out an interface is just as described in the previous (unicast) section, with the following exceptions:

- After dequeuing the packet from the output queue, the hardware sees that the multicast flag is asserted from the queue manager.
- Instead of reading the BHDR and first part of the packet, it starts reading from SDRAM 32 bytes earlier and read 32 byte more than it was going to. This means it now has access to the OutputInfo[ ] array, which was written by the earlier operation.
- Based on the port number being sent to, one of these OutputInfo[ ] values will be extracted and passed on to the Output Encap state machine 3270. There is no other difference in how the packet is treated by the packet transmit hardware. Note that the StartOffset field of the BHDR is still an offset from the start of the normal BHDR, not the additional 32 bytes of OutputInfo[ ] values. In fact, the Output Encap machine 3270 is not aware that this packet is even a multicast packet. This entire process is also independent of whether each replication is IP or TAG, or a mixture of both.

The queue number to next enqueue this packet onto needs to be determined. Normally (for unicast) this will come from the Return Queue field of the BHDR. In the case of multicast, the Ports[ ] field will be consulted for the next port. The bits are searched, starting from the position representing the current port number plus one, looking for any set bits. If a set bit is found, then the packet will be queued onto the queue corresponding to that bit position. If no set bits are found, then this port was the last one to be sent to for the moment. The packet is then either enqueued to the Return Queue or it is enqueued back to the Multicast RAW Queue. This is determined by checking the NextAddr field in the BHDR according to the following logic: if it is zero, then we are done—put the packet on the Return Queue; if the NextAddr is not zero, then there are more replications due for this packet—enqueue it on the MRQ.

Note that when the packet is requeued on either an output queue or the MRQ, the Multicast bit will remain set. It will only finally get cleared the next time this buffer is enqueued.

Also note that as the bits of the Ports[ ] are searched, there is a mode bit (SkipFullQueues) which when set, tells the search to pass over any queues which have their corresponding QueueStatus bit set (for the appropriate COS). Once a queue is passed over, it will not return to try it again. That replication of the packet will be 'dropped'.

Multicasting to more than 8 ports or to the same port multiple times: When a packet is returned to the MRQ after being multicast to up to 8 ports, the Multicast RAW queue (MRQ) server will recognize that the multicast bit is set for this packet. This tells the MRQ that this is not the first time this packet has been examined by it. In this case, it still reads the 32 bytes of the BHDR, but instead of picking out the MGID field and using it to index into the Multicast Group structure array, it picks out the NextAddr field, and uses it just as it would have used the MGID before: the MRQ writes a different set of 8 OutputInfo fields into the BHDR, writes a new NextPortInfo/HiPort flag and NextAddr field into the BHDR, and enqueues the packet onto the first port's queue.

In this manner, a packet can be sent to both the low 8 ports and high 8 ports any number of times, which is useful for shared media linecards where there could be mixed TAG and IP multicast networks in operation. The only penalty is the additional latency in having to re-read the header from transmit packet buffer SDRAM 285 and additional queuing operations.

TAG Handling

When a TAG packet is to be sent by the TBM, it can be done in one of two ways. Firstly, the packet can already have the replacement TAG and updated TTL written into it by the receive linecard so that the TBM has no work to do, except prepending the appropriate PPP/HDLC header.

The second way (and the way required if the packet is being multicast), is to have the receive linecard update the TTL only, leaving the old TAG (or at least a place holder) in place. Then the TAG form of the OutputInfo field is used to describe the replacement TAG value and the encapsulation required (PPP or HDLC).

Note that this scheme only allows replacement of a single TAG per replication, and so all ports that the packet is to be replicated out to must have the same stack depth. If that is not desirable, then the packet should be sent to the regular RAW queue for the linecard CPU to process.

Conclusion

The order in which the steps of the method or methods presently disclosed are performed is purely illustrative in nature. In fact, steps can be performed in any order or in parallel, unless otherwise indicated by the present disclosure.

The method of the present invention may be performed in either hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among computers connected to the Internet. Accordingly, the present invention is not limited to any particular platform, unless specifically stated otherwise in the present disclosure.

While particular embodiments of the present invention have been shown and described, it will be apparent to those skilled in the art that changes and modifications may be made without departing from this invention in its broader aspects and, therefore, the appended claims are to encompass within their scope all such changes and modifications as fall within the true spirit of this invention.

We claim:

1. An apparatus for switching packets, said packets having a header portion, a tail portion, and a class of service indicator, comprising:
    a pipelined switch comprising a plurality of pipeline stage circuits connected in a sequence;
    a dequeue circuit that dequeues a packet using a round robin algorithm; wherein each said stage circuit begins an operation substantially simultaneously with each other said stage circuit and each said stage circuit passes data to a next stage circuit in said sequence when every said operation performed by all said stage circuits is completed; and
    an output queue, wherein the output queue has an associated quantum value and an associated deficit value.

2. The apparatus as recited in claim 1, wherein said round robin algorithm is a modified deficit round robin algorithm.

3. The apparatus of claim 1 further comprising:
    a memory coupled to the dequeue circuit and operable to store a queue pointer.

4. The apparatus of claim 3 wherein the dequeue circuit is operable to fetch the queue pointer from the memory.

5. The apparatus of claim 1 further comprising:
    a plurality of output queues.

6. The apparatus of claim 5 wherein at least one of the plurality of output queues is associated with a class of service (CoS) level.

7. The apparatus of claim 5 wherein a first one of the plurality of output queues is associated with a first class of service (CoS) level, wherein a second one of the plurality of output queues is associated with a second CoS level, and wherein the first CoS level is different from the second CoS level.

8. The apparatus of claim 5 wherein at least one of the plurality of output queues is a high priority output queue.

9. The apparatus of claim 1 wherein the dequeue circuit is operable to dequeue data from a first queue and data from a second queue substantially in parallel.

10. The apparatus of claim 1 further comprising a switch fabric interface.

11. The apparatus of claim 1 wherein the dequeue circuit is further configured to perform at least one of subtracting a packet length from the deficit value, adding the quantum value to the deficit value, and setting the deficit value to zero substantially in parallel with dequeuing a packet.

12. The apparatus of claim 1 wherein the output queue is a first output port high priority queue, the apparatus further comprising:
    a plurality of first output port low priority queues;
    a second output port high priority queue; and
    a plurality of second output port low priority queues;
        wherein the dequeue circuit operates to service the first output port high priority queue and the second output port high priority queue according to a simple round-robin algorithm until the first output port high priority queue and the second output port high priority queue are clear, and then operates to service at least one of: the plurality of first output port low priority queues, and the plurality of second output port low priority queues, according to a deficit round-robin algorithm.

13. The apparatus of claim 1 wherein output queue is a first output port high priority queue, the apparatus further comprising:
    a plurality of first output port low priority queues; wherein the dequeue circuit operates to dequeue a first quantum of data from the first output port high priority queue, and then operates to dequeue a second quantum of data from at least one of the plurality of first output port low priority queues according to a deficit round-robin algorithm.

14. A method of switching packets, said packets having a header portion and a tail portion, which comprises:
    switching said packets through a pipelined switch having a plurality of pipeline stage circuits connected in a sequence; and
    dequeuing a packet from an output queue using a round robin algorithm; wherein each said stage circuit begins an operation substantially simultaneously with each other said stage circuit and each said stage circuit passes data to a next stage circuit in said sequence when every said operation performed by all said stage circuits is completed, and wherein the output queue has an associated quantum value and an associated deficit value.

15. The method as recited in claim 14, wherein said round robin algorithm is a modified deficit round robin algorithm.

16. The method of claim 4 further comprising:
    performing, substantially in parallel with the dequeuing a packet, at least one of:
        subtracting a packet length from the deficit value;
        adding the quantum value to the deficit value; and
        setting the deficit value to zero.

17. The method of claim 14 wherein the output queue is a first output port high priority queue, the method further comprising:
    providing a plurality of first output port low priority queues;
    providing a second output port high priority queue;
    providing a plurality of second output port low priority queues;
    dequeuing data from the first output port high priority queue and the second output port high priority queue according to a simple round-robin algorithm; and
    dequeuing data from at least one of: the plurality of first output port low priority queues, and the plurality of second output port low priority queues, according to a deficit round-robin algorithm.

18. The method of claim 14 wherein the output queue is a first output port high priority queue, the method further comprising:

provided a plurality of first output port low priority queues;

dequeuing a first quantum of data from the first output port high priority queue; and dequeuing a second quantum of data from at least one of the plurality of first output port low priority queues according to a deficit round-robin algorithm.

19. An apparatus for switching packets, the packets having a header portion and a tail portion, the apparatus comprising:

a means for switching the packets through a plurality of stage circuits connected in a sequence;

a means for storing a packet, wherein the means for storing a packet has an associated quantum value and an associated deficit value; and a means for dequeuing the packet according to a round robin algorithm; wherein each of the plurality of stage circuits of the means for switching the packets begins an operation substantially simultaneously with each other and passes data to a next stage circuit when every operation performed by the plurality of stage circuits is completed.

20. The apparatus of claim 19, wherein the round robin algorithm is a modified deficit round robin algorithm.

21. The apparatus of claim 19 further comprising:

a means for performing, substantially in parallel with dequeuing a packet, at least one of:

subtracting a packet length from the deficit value;

adding the quantum value to the deficit value; and setting the deficit value to zero.

22. The apparatus of claim 19 wherein the means for storing a packet is a first output port high priority queue, the apparatus further comprising:

a means for providing a plurality of first output port low priority queues;

a means for providing a second output port high priority queue; and a means for providing a plurality of second output port low priority queues, wherein the means for dequeuing is further for dequeuing data from the first output port high priority queue and the second output port high priority queue according to a simple round-robin algorithm; and dequeuing data from at least one of: the plurality of first output port low priority queues, and the plurality of second output port low priority queues, according to a deficit round-robin algorithm.

23. The apparatus of claim 19 wherein the means for storing a packet is a output port high priority queue, the apparatus further comprising:

a means for providing a plurality of first output port low priority queues;

a means for dequeuing a first quantum of data from the first output port high priority queue; and a means for dequeuing a second quantum of data from at least one of the plurality of first output port low priority queues according to a deficit round-robin algorithm.

* * * * *

UNITED STATES PATENT AND TRADEMARK OFFICE
CERTIFICATE OF CORRECTION

| | |
|---|---|
| PATENT NO. | : 6,778,546 B1 |
| DATED | : August 17, 2004 |
| INVENTOR(S) | : Epps et al. |

It is certified that error appears in the above-identified patent and that said Letters Patent is hereby corrected as shown below:

Column 46,
Line 47, after "claim", please delete "4" and insert -- 14 --

Column 48,
Line 22, after "packet is a", please insert -- first --

Signed and Sealed this

Third Day of May, 2005

JON W. DUDAS
*Director of the United States Patent and Trademark Office*